(12) United States Patent
Harasawa et al.

(10) Patent No.: US 12,415,308 B2
(45) Date of Patent: Sep. 16, 2025

(54) STRUCTURAL BODY MANUFACTURING METHOD AND PANEL

(71) Applicant: KYORAKU CO., LTD., Kyoto (JP)

(72) Inventors: Yuki Harasawa, Yamato (JP); Tadatoshi Tanji, Yamato (JP); Tatsuya Fukuda, Kakamigahara (JP); Takurou Matsuda, Kakamigahara (JP); Sho Nakajima, Kakamigahara (JP); Shingo Nagashima, Kakamigahara (JP)

(73) Assignee: KYORAKU CO., LTD., Kyoto (JP)

( * ) Notice: Subject to any disclaimer, the term of this patent is extended or adjusted under 35 U.S.C. 154(b) by 164 days.

(21) Appl. No.: 18/546,468

(22) PCT Filed: Feb. 18, 2022

(86) PCT No.: PCT/JP2022/006665
§ 371 (c)(1),
(2) Date: Aug. 15, 2023

(87) PCT Pub. No.: WO2022/181487
PCT Pub. Date: Sep. 1, 2022

(65) Prior Publication Data
US 2024/0131777 A1 Apr. 25, 2024
US 2024/0227277 A9 Jul. 11, 2024

(30) Foreign Application Priority Data

Feb. 26, 2021 (JP) ................................. 2021-030769
Feb. 26, 2021 (JP) ................................. 2021-030774
(Continued)

(51) Int. Cl.
*B29C 51/26* (2006.01)
*B29C 51/32* (2006.01)

(52) U.S. Cl.
CPC ............ *B29C 51/268* (2013.01); *B29C 51/32* (2013.01)

(58) Field of Classification Search
CPC ... B29C 51/105; B29C 51/265; B29C 51/006; B29C 51/32; B29C 37/02; B29C 51/10;
(Continued)

(56) References Cited

U.S. PATENT DOCUMENTS

| 4,845,785 A | 7/1989 | Allen |
| 2020/0039139 A1 | 2/2020 | Yamasaki et al. |

(Continued)

FOREIGN PATENT DOCUMENTS

| EP | 3705261 A1 | 9/2020 |
| JP | H05229367 A | 9/1993 |

(Continued)

OTHER PUBLICATIONS

Office Action issued on Nov. 5, 2024, in corresponding Japanese Application No. 2021-138343, 10 pages.
(Continued)

*Primary Examiner* — Monica A Huson
(74) *Attorney, Agent, or Firm* — Maier & Maier, PLLC

(57) ABSTRACT

A method of manufacturing a structure is provided in which a burr portion can be more reliably cut. In a burr portion shaping step, the burr portion is sucked to an engaging portion by a suction part to shape the burr portion along the engaging portion, and in a cutting step, ae movable portion is moved relative to first and second split molds with the burr portion being shaped along the engaging portion, thereby the burr portion is cut from a molded main body along a cutting line.

19 Claims, 41 Drawing Sheets

(30) Foreign Application Priority Data

Aug. 26, 2021 (JP) ................ 2021-138343
Nov. 26, 2021 (JP) ................ 2021-192085

(58) Field of Classification Search
CPC . B29C 51/36; B29C 51/268; B29C 2793/009; B29D 7/00

See application file for complete search history.

(56) References Cited

U.S. PATENT DOCUMENTS

| | | | |
|---|---|---|---|
| 2021/0178653 A1* | 6/2021 | Shimada | B29C 49/70 |
| 2021/0221033 A1 | 7/2021 | Hato et al. | |

FOREIGN PATENT DOCUMENTS

| | | | |
|---|---|---|---|
| JP | H1163597 A | 3/1999 | |
| JP | 2008012871 A | 1/2008 | |
| JP | 2009202233 A | 9/2009 | |
| JP | 2011115980 A | 6/2011 | |
| JP | 2016083859 A | 5/2016 | |
| JP | 2018122462 A | 8/2018 | |
| JP | 2019051649 A | 4/2019 | |
| JP | 2020019190 A | 2/2020 | |
| JP | 2020179528 A | 11/2020 | |
| WO | 2020026928 A1 | 2/2020 | |

OTHER PUBLICATIONS

Extended Search Report issued on Jul. 5, 2024, in corresponding European Application No. 22759523.8, 9 pages.

Office Action issued Aug. 20, 2024, in corresponding Japanese Application No. 2021-138343, 8 pages.

International Search Report issued on May 17, 2022, in corresponding International Application No. PCT/JP2022/006665; 6 pages.

* cited by examiner

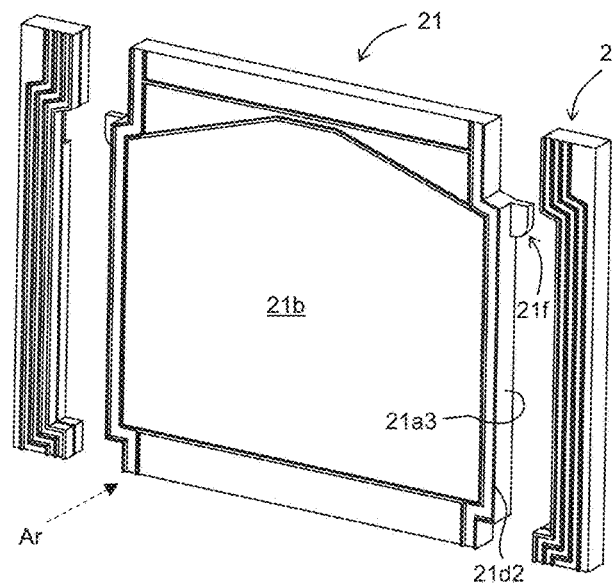
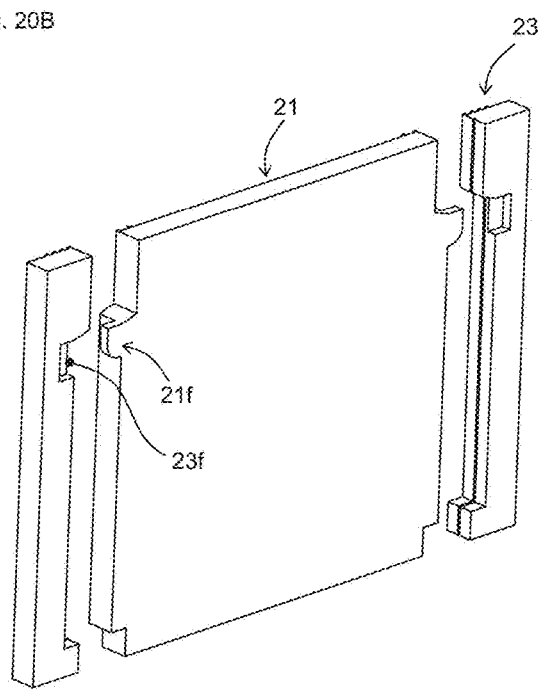
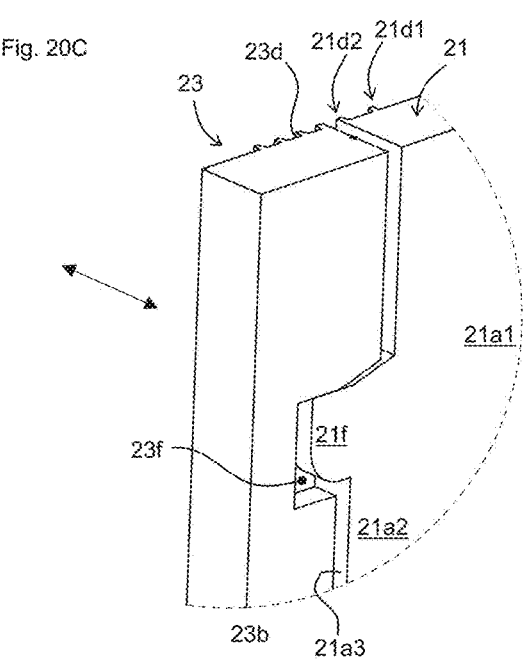

Fig. 29
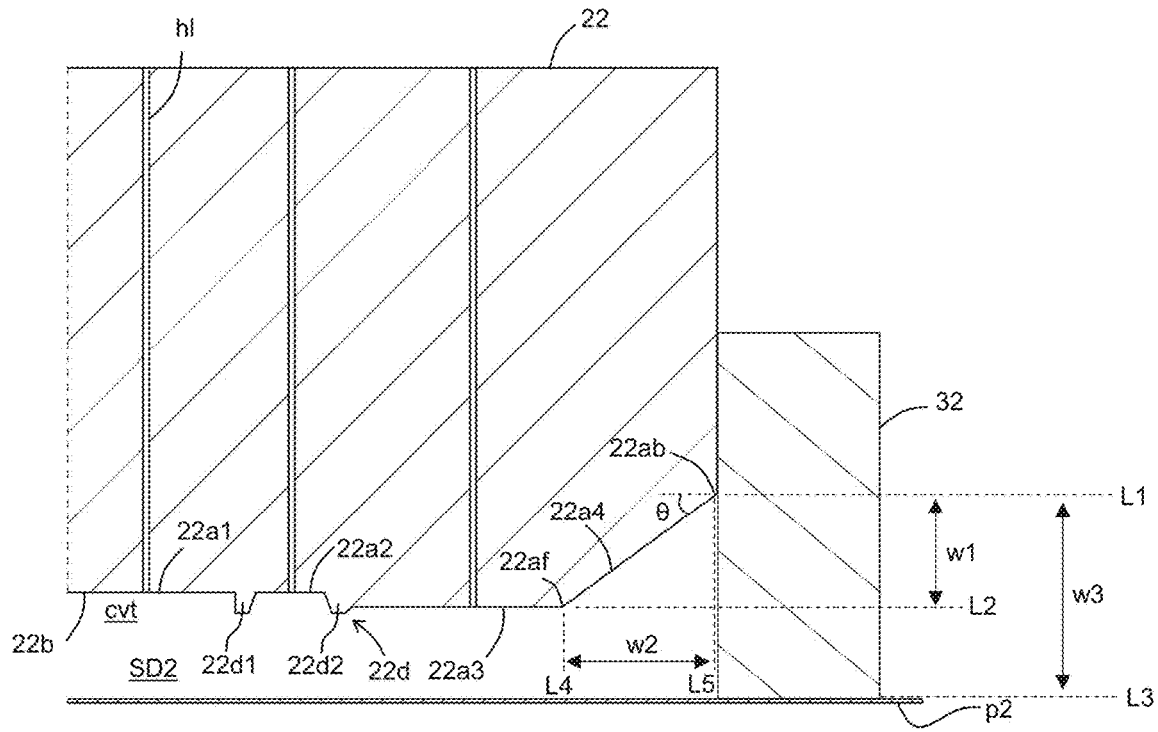
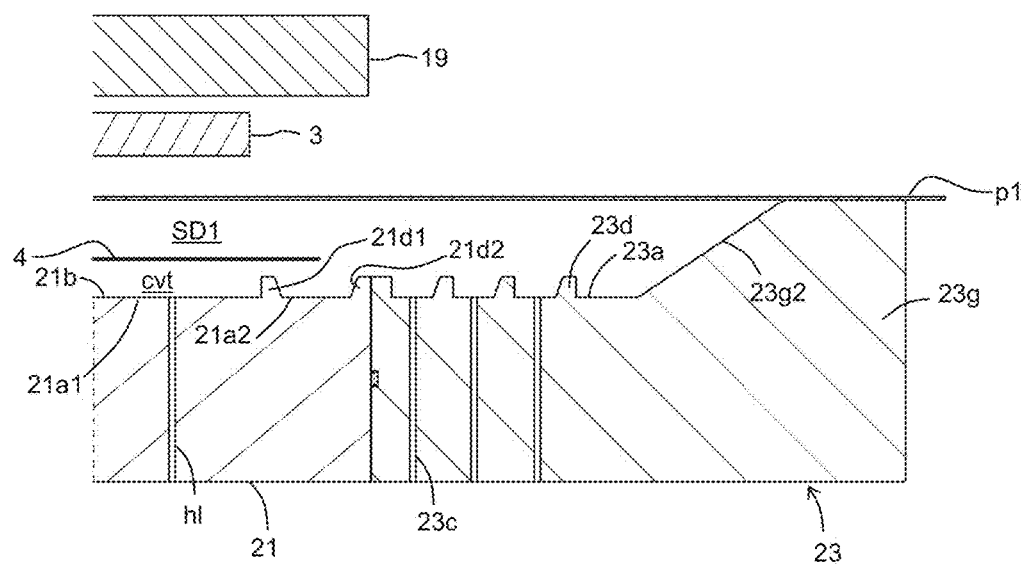

Fig. 30
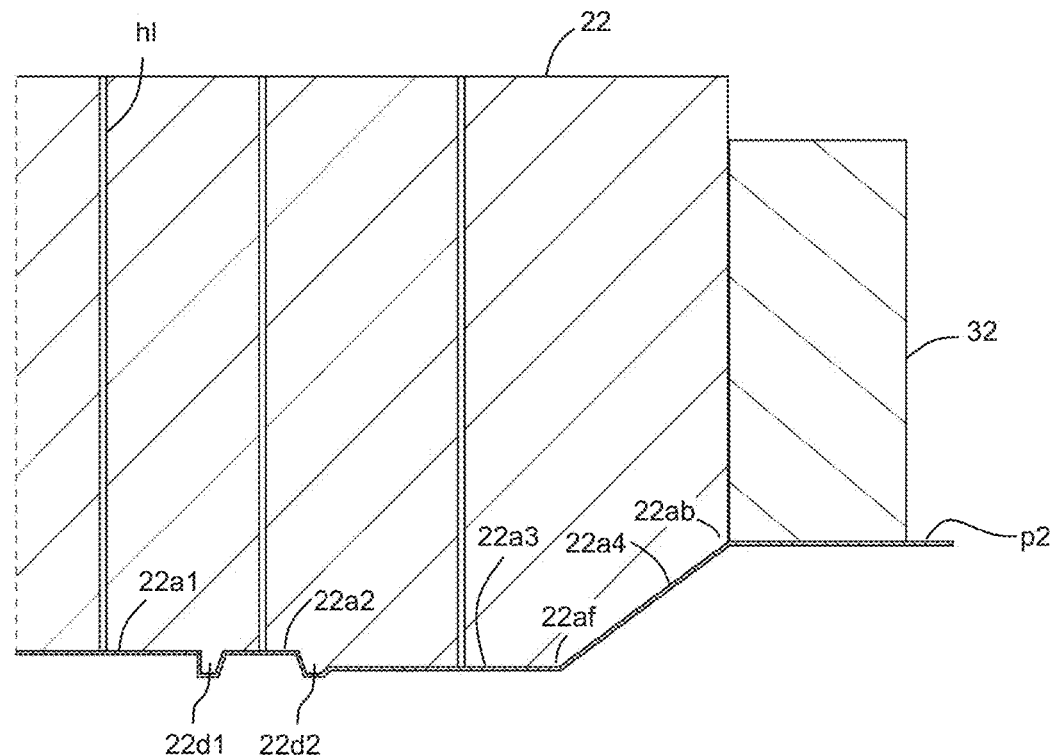
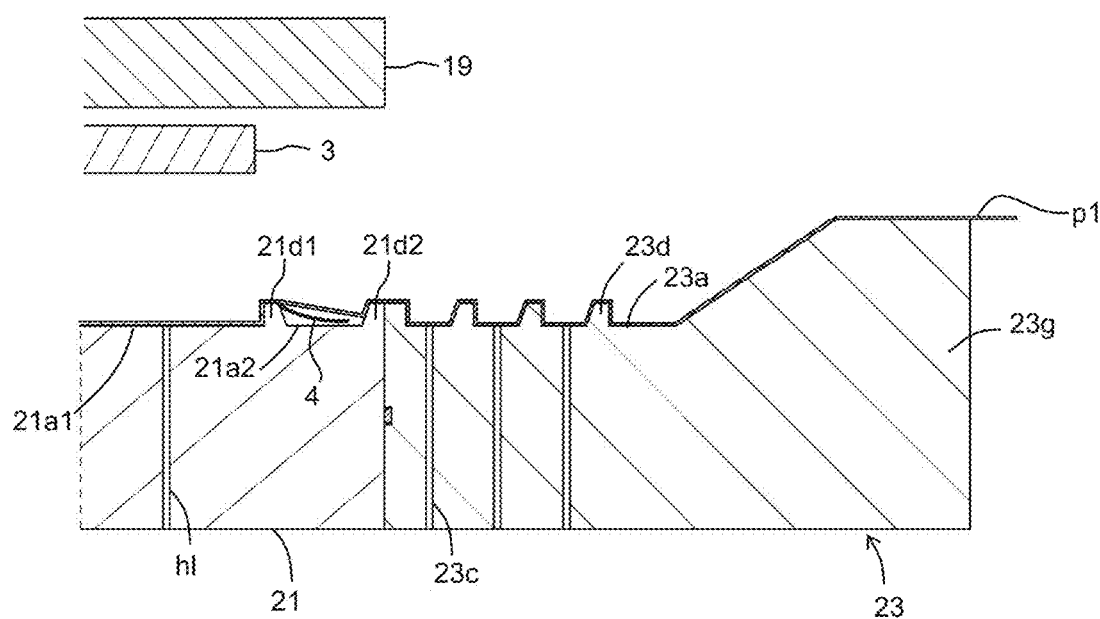

Fig. 31
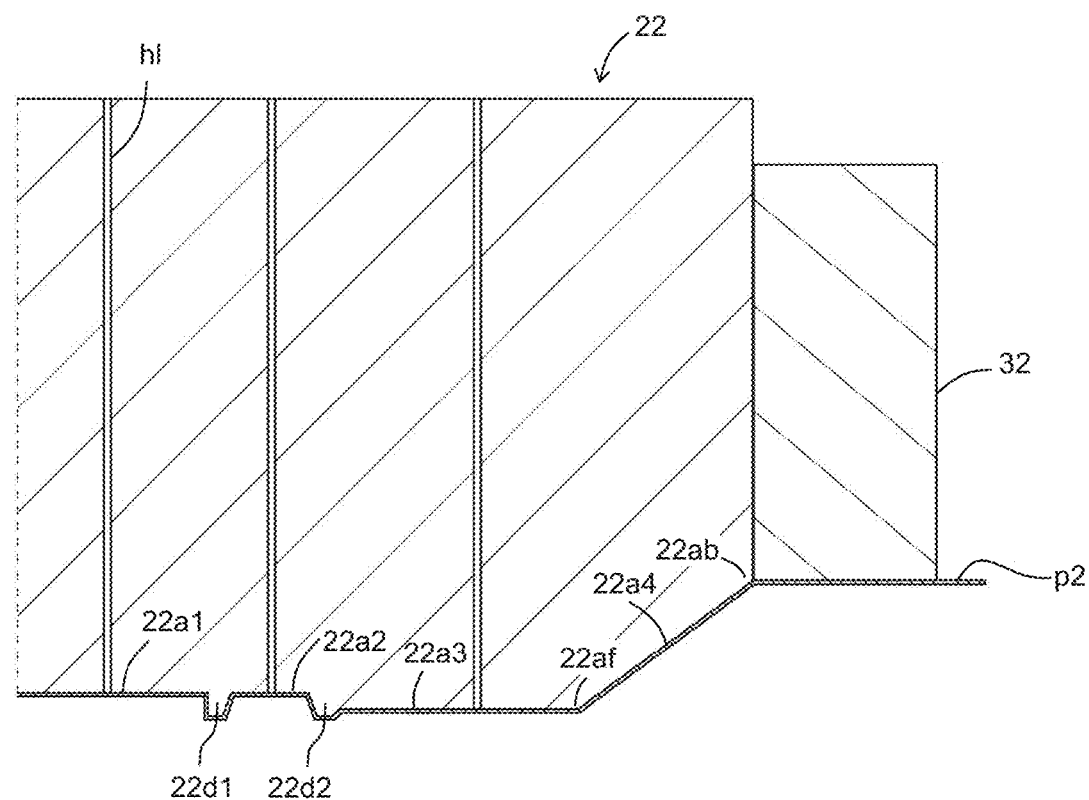
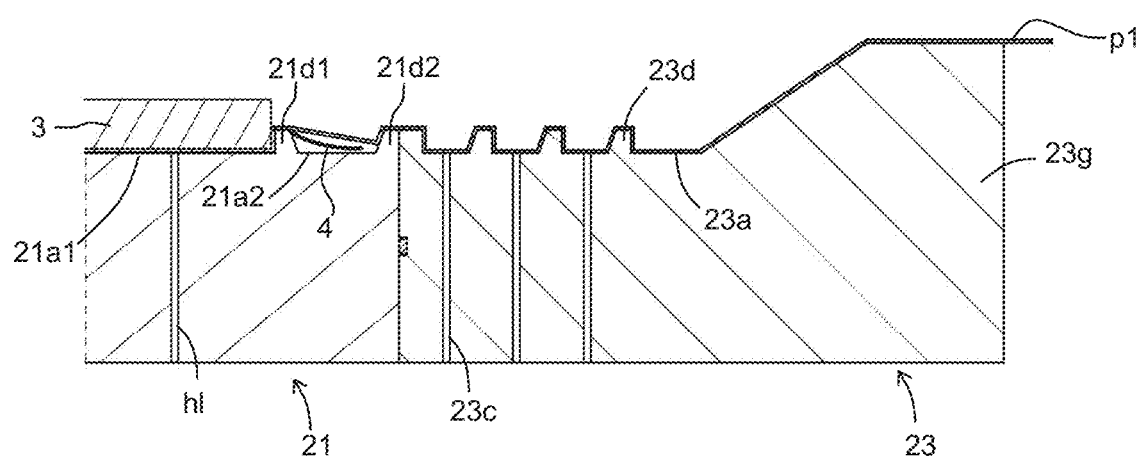

STRUCTURAL BODY MANUFACTURING METHOD AND PANEL

TECHNICAL FIELD

This invention relates to a method of manufacturing a structure and to a panel that can be bent at the hinge.

BACKGROUND ART

Common to First and Second Viewpoints

Patent Literature 1 discloses a method of molding a resin panel using a mold, wherein the mold has a pinch-off portion surrounding a cavity. In the molding method in Patent Literature 1, placed in the cavity are a core member consisting of, for example, a foamed body, a resin sheet covering the core member, and a skin material made of, for example, non-woven fabric, and these members are molded together in the cavity. The molded body produced as described above includes a molded main body molded in the cavity, and a burr portion placed outside the cavity.

Patent Literature 1 discloses a method for cutting the burr portion using a movable portion provided on the mold. The movable portion of Patent Literature 1 is driven away from the mold to cut the burr portion from the resin sheet that constitutes the molded main body.

Third Viewpoint

Patent Literature 2 discloses a method of manufacturing a resin structure using a mold and an outer frame arranged around the mold. The outer frame of Patent Literature 2 moves forward so as to protrude from the mold, contacts a hung resin sheet, and is capable of suctioning the resin sheet. When the outer frame sucks the resin sheet, the space (cavity) between the resin sheet and the mold becomes a closed space. Therefore, by reducing the pressure in this space, the resin sheet can be shaped along the mold.

Fourth Viewpoint

Patent Literature 3 discloses a resin panel with a thin hinge.

CITATION LIST

Patent Literature

[Patent Literature 1] WO-A-2020/026928
[Patent Literature 2] JP-A-2018-122462
[Patent Literature 3] JP-A-2019-051649

SUMMARY OF INVENTION

Technical Problem

First Viewpoint

Depending on the configuration of the burr portion (e.g., material, shape, and surface area, etc.), the movable portion of Patent Literature 1 may have difficulty engaging the burr portion. In such cases, the burr portion does not move with the movable portion when the movable portion is driven, increasing the possibility that the burr portion will not be cut from the resin sheet.

The present invention has been made in view of such circumstances, and an objective thereof is to provide a method of manufacturing a structure, in which a burr portion can be more reliably cut off.

Second Viewpoint

In Patent Literature 1, the pinch-off portion is formed at the edge of the mold, and the movable portion is butted against the pinch-off portion when the movable portion is in the initial position.

Therefore, in Patent Literature 1, a cutting line of the burr portion is the position corresponding to the pinch-off portion. Although the shape of the pinch-off portion is determined according to the shape of the molded body, when the movable portion is not smoothly connected to a portion where the movable portion and the pinch-off portion are butted against each other, the cutting line may be distorted, making it difficult to cut the burr portion.

The present invention has been made in view of such circumstances, and an objective thereof is to provide a method of manufacturing a structure to suppress a burr portion from becoming difficult to cut.

Third Viewpoint

In order to properly shaping the resin sheet along the mold, the outer frame should be retracted to some extent from a forward position. Depending on the amount of retraction of the outer frame and the shape of the mold, the resin sheet may have difficulty following a mold surface, causing the resin sheet to peel off from the mold surface and outer frame, resulting in molding defects.

The present invention has been made in view of such circumstances, and the objective thereof is to provide a method for manufacturing a structure to suppress molding defects.

Fourth Viewpoint

One possible approach is to make the hinge unit thinner so that it can be easily bent. However, it is difficult to manufacture such a thin hinge with high yield, and slight manufacturing variations can cause problems such as unwanted pinch-off at the hinge. There are limitations to the approach of pursuing such a thinner hinge.

The present invention has been made in view of such circumstances, and the objective thereof is to provide a panel having a hinge with improved bendability.

Solution to Problem

First Viewpoint

According to the present invention, provided is a method for manufacturing a structure, comprising: a molding step; a burr portion shaping step; and a cutting step, wherein, in the molding step, a molded body is molded using a mold, the mold includes a movable portion and a pair of first and second split molds, each of the first and second split molds includes a cavity and a pinch-off portion, the movable portion is provided to be movable relative to the first and second split molds, and the movable portion includes a suction part and an engaging portion, the molded body includes a molded main body, a cutting line, and a burr portion, the molded main body is molded in the cavity in the molding step, the cutting line is squashed by the pinch-off portion in the molding step; and the burr portion is connected to the molded main body via the cutting line, and is provided on the movable portion, in the burr portion shaping step, the burr portion is shaped along the engaging portion by suctioning the burr portion to the engaging portion via the suction part, in the cutting step, the burr portion is cut from the molded main body along the cutting line by moving the movable portion relative to the first and second split molds with the burr portion shaped along the engaging portion.

In the burr portion shaping step, the burr portion is suctioned to the engaging portion of the movable portion via the suction part. As a result, the burr portion is shaped along the movable portion and the burr portion engages the movable portion more securely. Therefore, when the movable portion is moved relative to the first and second split molds, the burr portion is restrained from sliding against the movable portion, and the burr portion moves to follow the movable portion, resulting in the burr portion being more securely cut from the molded main body.

Hereinafter, various embodiments of the present invention will be described.

Preferably, provided is the method wherein the first split mold includes an end face portion, the movable portion includes a butting surface portion, and in the burr portion shaping step, the butting surface portion is butted against the end face portion.

Preferably, provided is the method wherein the mold further includes a sealing member, and the sealing member is attached to the end face portion or the butting surface portion.

Preferably, provided is the method wherein the first split mold includes a first outer portion, the pinch-off portion of the first split mold is formed on the first outer portion, and the end face portion is formed on the first outer portion, the second split mold includes a second outer portion, and the pinch-off portion of the second split mold is formed on the second outer portion, and the second outer portion is positioned to face the first outer portion in a direction in which the first and second split molds open and close.

Preferably, provided is the method wherein the molded body includes a resin sheet and a skin material, and the skin material is disposed on an outer side of the resin sheet.

Preferably, provided is the method wherein each of the first and second split molds includes a reduced pressure suction hole, the reduced pressure suction hole communicates with the cavity, and the reduced pressure suction hole is formed to shape the resin sheet along the first and second split molds, with the first and second split molds shaping the resin sheet, the skin material in the cavity is provided along the first split mold, and the reduced pressure suction hole is not formed in the first outer portion of the first split mold.

Preferably, provided is the method wherein a skin material escape space is formed between the first outer portion and the second outer portion, and in the molding step, an edge of the skin material is disposed in the skin material escape space.

Second Viewpoint

According to the present invention, provided is a method for manufacturing a structure, comprising: a molding step; an engaging step; and a cutting step, wherein, in the molding step, a molded body is molded using a mold, the mold includes a movable portion and a pair of first and second split molds, each of the first and second split molds includes a cavity, an inner pinch-off portion, and an outer pinch-off portion, the inner pinch-off portion is connected to the cavity, the outer pinch-off portion is located further away from the cavity than the inner pinch-off portion, the movable portion is provided to be movable relative to the first and second split molds, and the movable portion includes an engaging portion, the molded body includes a molded main body, an outer line portion, and an outer burr portion, the molded main body includes an inner line portion and an inner burr portion, the molded main body is molded in the cavity in the molding step, the inner line portion is squashed by the inner pinch-off portion in the molding step, the inner burr portion is formed between the inner line portion and the outer line portion, the outer line portion is squashed by the outer pinch-off portion in the molding step, the outer burr portion is connected to the outer line portion, in the engaging step, the outer burr portion is engaged with the engaging portion of the movable portion, and in the cutting step, the outer burr portion is cut from the inner burr portion along the outer line portion by moving the movable portion relative to the first and second split molds with the outer burr portion engaged with the engaging portion.

In the present invention, each of the first and second split molds has an inner pinch-off portion connected to the cavity and an outer pinch-off portion located farther from the inner pinch-off portion with respect to the cavity. Here, the outer pinch-off portion is a portion that is not connected to the cavity and that defines the unwanted inner and outer burr portions. Therefore, the outer pinch-off portion is not subject to the same restrictions as the inner pinch-off portion, such as conforming to the shape of the periphery of the molded main body. Thus, in the present invention, the pinch-off portion can be easily set to a shape that takes into account the connection with the movable portion to the extent that the restrictions are suppressed, and as a result, the burr portion can be suppressed from being difficult to cut.

Hereinafter, various embodiments of the present invention will be described.

Preferably, provided is the method wherein, when the first split mold and the movable portion are viewed in plan view, the outer pinch-off portion is formed along the engaging portion.

Preferably, provided is the method wherein, a surface of a top portion of the outer pinch-off portion is aligned with the surface of a top portion of the engaging portion.

Preferably, provided is the method wherein the movable portion further includes a suction part, and in the engaging step, the outer burr portion is suctioned to the engaging portion via the suction part, the outer burr portion is shaped along the engaging portion, and thereby the outer burr portion is engaged along the engaging portion.

Preferably, provided is the method wherein the first split mold includes an end face portion, the movable portion includes a butting surface portion, and in the engaging step, with the butting surface portion butted against the end face portion, the outer burr portion is suctioned to the engaging portion via the suction part.

Preferably, provided is the method wherein the mold further includes a sealing member, and the sealing member is attached to the end face portion or the butting surface portion.

Preferably, provided is the method wherein the first split mold includes a first outer portion, the first outer portion includes the inner pinch-off portion and the outer pinch-off portion of the first split mold, and the first outer portion includes the end face portion, the second split mold includes a second outer portion, and the second outer portion includes the inner pinch-off portion and the outer pinch-off portion of the second split mold, and the second outer portion is positioned to face the first outer portion in a direction in which the first and second split molds open and close.

Preferably, provided is the method wherein the molded body includes a resin sheet and a skin material, and the skin material is disposed on an outer side of the resin sheet.

Preferably, provided is the method wherein each of the first and second split molds includes a reduced pressure suction hole, the reduced pressure suction hole communicates with the cavity, and the reduced pressure suction hole is formed to shape the resin sheet along the first and second split molds, with the first and second split molds shaping the resin sheet, the skin material in the cavity is provided along the first split mold, and the reduced pressure suction hole is not formed in the first outer portion of the first split mold.

Preferably, provided is the method wherein a skin material escape space is formed between the first outer portion and the second outer portion, and in the molding step, an edge of the skin material is disposed in the skin material escape space.

Third Viewpoint

According to the present invention, provided is a method for manufacturing a structure using a mold and an outer frame, the method comprising: a hanging step; a suction step, and a shaping step, wherein, in the hanging step, a molten resin sheet is hung in front of the mold, the mold includes a cavity, a pinch-off portion, and a chamfer portion, the chamfer portion is provided between the outer frame and the pinch-off portion and is formed so that the distance between the chamfer portion and the hung resin sheet increases in a direction from the pinch-off portion to the outer frame, in the suction step, the outer frame is advanced and the resin sheet is suctioned by the outer frame to form a closed space between the outer frame, the resin sheet, and the mold, the outer frame is positioned around the mold and is configured to suck the resin sheet, in the shaping step, the outer frame is backed and the closed space is depressurized to shape the resin sheet by the cavity, and the resin sheet moves with the outer frame as the outer frame is backed and is positioned along the chamfer portion.

In the present invention, since the mold includes the chamfer portion, when the resin sheet moves with the outer frame in the shaping step, the resin sheet is smoothly placed along the chamfer portion. This prevents the resin sheet from peeling off from the mold or the outer frame, thereby avoiding molding defects.

Hereinafter, various embodiments of the present invention will be described.

Preferably, provided is the method wherein the chamfer portion includes a tapered surface.

Preferably, provided is the method wherein a slope angle of the tapered surface is equal to or less than 60 degrees.

Preferably, provided is the method wherein, in the shaping step, the outer frame is backed up to a position of a rear edge portion of the chamfer portion.

Preferably, provided is the method wherein, in the shaping step, distance in which the outer frame is backed is within a range from 30 mm to 80 mm.

Preferably, provided is the method wherein the method further using a movable portion, and the method further comprises a molding step, the mold includes first and second split molds, the movable portion is configured to move relative to the first split mold to cut a portion of the resin sheet, and is provided around the first split mold, the second split mold includes the chamfer portion, and the outer frame is positioned around the second split mold, and in the molding step, the first and second split molds are closed, and when the molding step is completed, at least a portion of the movable portion is positioned closer to the outer frame than a position of a front edge portion of the chamfer portion.

Preferably, provided is the method wherein the chamfer portion has a width in a direction in which the mold opens and closes, and the width is within a range from 10 mm to 63 mm.

Preferably, provided is the method wherein the chamfer portion has a width in a direction from the pinch-off portion to the outer frame, and the width is within a range from 5.7 mm to 70 mm.

Fourth Viewpoint

According to the present invention, provided is a panel comprising: a resin panel body, wherein the resin panel body includes a first body portion, a second body portion, and a hinge, the first and second body portions and the hinge are integrated, the hinge includes a hinge part and a slit, the hinge part connects the first body portion and the second body portion in a rotatable manner, and the slit is provided next to the hinge part and separates the first body portion from the second body portion.

In the present invention, the slit can improve the bendability of the hinge.

Hereinafter, various embodiments of the present invention will be described. The embodiments described hereinafter can be combined with each other.

Preferably, the panel further comprising a skin material, wherein the skin material is attached on the first body portion and the second body portion across the hinge portion.

Preferably, $L_S/L_O$ is within a range from 0.50 to 0.99, $L_O$ is a total length over both ends of the hinge, and $L_S$ is a total length of the slit.

Preferably, the hinge part includes extremity hinge parts, and the extremity hinge parts are provided at both ends of the hinge, respectively.

Preferably, the hinge part includes a middle hinge part, and the middle hinge part is provided between the extremity hinge parts.

BRIEF DESCRIPTION OF DRAWINGS

In FIG. 3, a drive mechanism 24 shown in FIG. 5 is omitted.

FIG. 12 corresponds to the A-A end in FIG. 3.

FIG. 13 is an end view corresponding to area A of FIG. 12.

FIG. 14 illustrates the movable portion 23 moving away from the first split mold 21 and an outer burr portion 5bc2 being cut from the inner burr portion 5bc1.

In FIG. 16, in the first and second viewpoints, the outer burr portion 5bc2 is pulled by the movable portion 23 and torn along a right line 5cr and a left line 5cl. FIG. 16 illustrates a schematic front view of a state in which, in the third viewpoint, the outer burr portion 5bc2 of the molded body 5 is cut off from the inner burr portion 5bc1 by the implementation of the first cutting step.

FIG. 17 illustrates a state at which the first cutting step starts.

FIG. 19 shows a cross-sectional view in a plane passing through the hinge of the resin panel and parallel to the direction of extension of the hinge.

FIG. 20A is an exploded view of the first split mold 21 and the movable portion 23 for modification 2 of the embodiments of the first and second viewpoints. FIG. 20B is an exploded perspective view from a different direction from FIG. 20A. FIG. 20C illustrates a state in which the movable portion 23 is supported by the supporting portion 21f.

In FIGS. 28 to 34, the first and second split molds 21, 22, etc. are illustrated with their end faces cut in a horizontal plane passing through left and right points P1 of FIG. 24.

FIG. 26 illustrates a state where a skin material attaching step is completed and a hanging step is being carried out, in the embodiments of the third viewpoint.

FIG. 27 illustrates a state where a suction step is being carried out in the embodiments of the third viewpoint.

FIG. 28 illustrates a horizontal end view of the first and second split molds 21, 22, etc. of FIG. 27.

FIG. 29 is an enlarged view of the area A of FIG. 28. In FIG. 29, dashed lines L1, L5 correspond to a position of a rear edge portion 22ab, dashed lines L2, L4 correspond to a position of a front edge portion 22af, and a dashed line L3 corresponds to a position of a front edge surface of the outer frame 32.

FIG. 30 illustrates a shaping step for the third viewpoint.

FIG. 31 illustrates a state where a core member welding step of the embodiments of the third viewpoint is performed.

FIG. 32 illustrates a state where a molding step of the embodiment of the third viewpoint is performed.

FIG. 33 is an enlarged view of a principal portion of the first and second split molds 21, 22, etc. illustrated in FIG. 32. In FIG. 33, the dashed line T1 corresponds to a position of the front edge portion of the outer frame 32, the dashed line T2 corresponds to a position of a front edge portion of a suction part 23g, and the dashed line T3 corresponds to a position of an opposing surface portion 23a.

FIG. 34 illustrates a state where the first cutting step of the embodiments of the third viewpoint is performed. FIG. 34 illustrates the movable portion 23 moving away from the first split mold 21 and the outer burr portion 5bc2 being cut from the inner burr portion 5bc1.

DESCRIPTION OF EMBODIMENTS

Hereinafter, various embodiments of the present invention will be described. Various features described in the following embodiments can be combined with each other. In addition, an invention can be established independently for each of the features.

Common to First and Second Viewpoints

1. Resin Panel 1

Figure 1A:
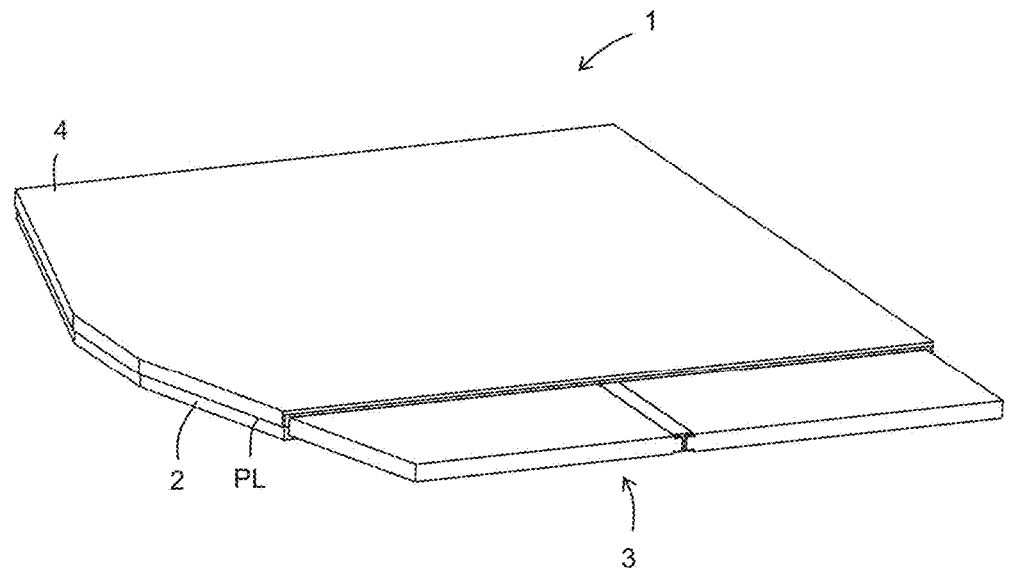
FIG. 1A is a perspective view of a resin panel 1 of embodiments of the first through third viewpoints.
Figure 1B:
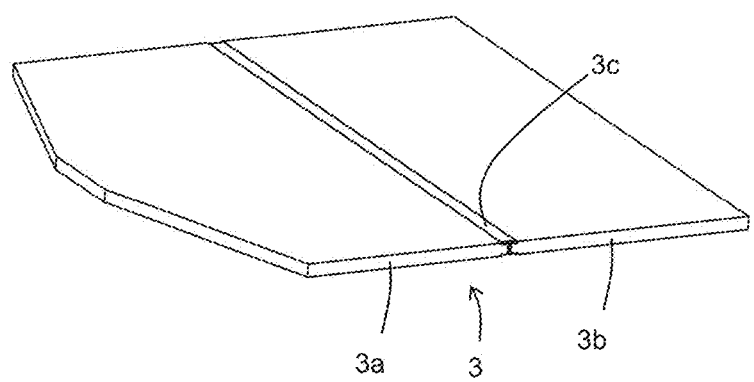
FIG. 1B is a perspective view of a core member 3 of the embodiments of the first through third viewpoints.
Figure 2A:
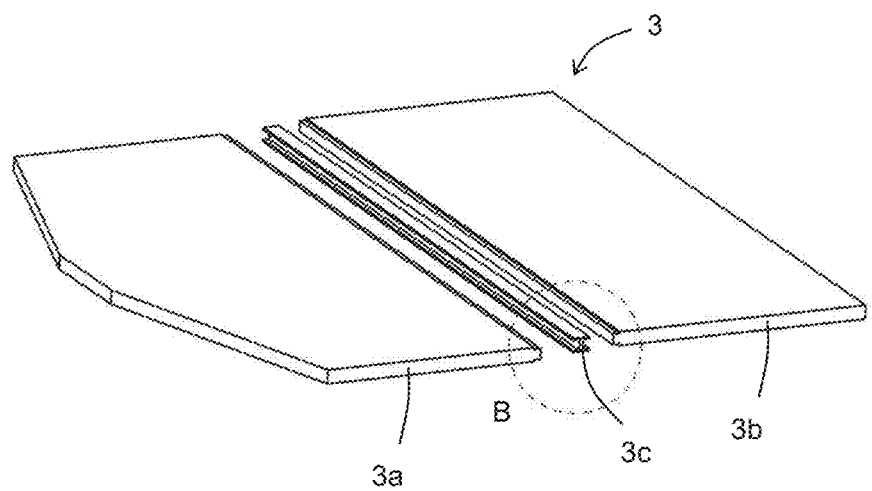
FIG. 2A is an exploded perspective view of the core member 3 according to the embodiments of the first through third viewpoints.
Figure 2B:
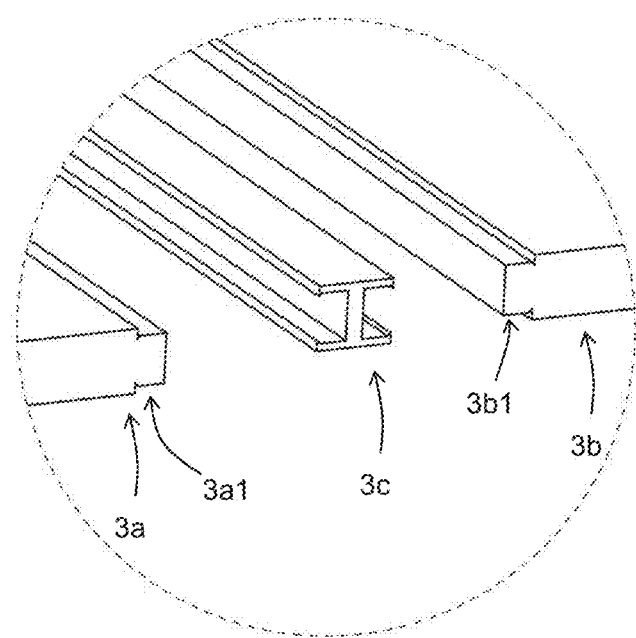
FIG. 2B is an enlarged view of area B of FIG. 2A.
Figure 2C:
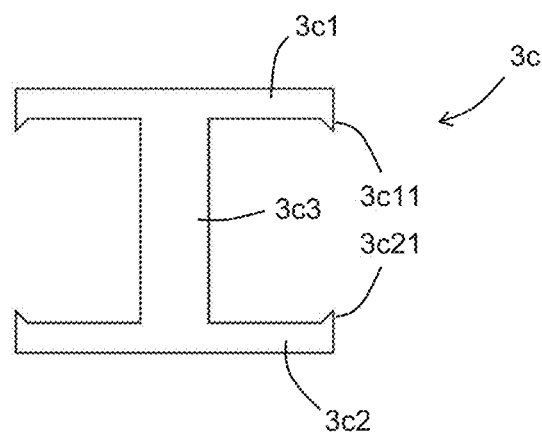
FIG. 2C is an end view of a reinforcing member 3c.

As illustrated in FIG. 1A and FIG. 1B, a resin panel 1 (an example of a "structure") of one embodiment of the present invention is a panel covered with a resin molded body 2 and has a rectangular shape in plan view.

As illustrated in FIG. 1A to FIG. 2C, the resin panel 1 includes a hollow resin molded body 2 and a core member 3, wherein the core member 3 is placed within the resin molded body 2. A skin material 4 is attached to one side of the resin molded body 2 so as to extend to a parting line PL. The skin material 4 is, for example, a non-woven fabric, and is integrally molded into the resin molded body 2 during the molding process.

Both sides of the core material 3 are in close contact with the resin molded body 2. The core material 3 includes base bodies 3a, 3b and a reinforcing member 3c connecting them.

The reinforcing member 3c is an elongated member having a constant cross section. The base bodies 3a, 3b are made of, for example, a foam. The reinforcing member 3c is substantially H-shaped and includes an upper wall 3c1, a lower wall 3c2, and a pillar portion 3c3 connecting them. Projections 3c11 projecting toward the lower wall 3c2 are provided at both ends of the upper wall 3c1 in the width direction. Projections 3c21 projecting toward the upper wall 3c1 are provided at both ends of the lower wall 3c2 in the width direction. The projections 3c11, 3c21 are engaged with the base bodies 3a, 3b, so that the base bodies 3a, 3b and the reinforcing member 3c are integrated. Ends of the base bodies 3a, 3b are provided with recessed portions 3a1, 3b1 formed one step lower, and the upper wall 3c1 and the lower wall 3c2 are accommodated in the recessed portions 3a1, 3b1, so that upper and lower surfaces of the base bodies 3a, 3b and the reinforcing member 3c are substantially flush with each other.

2. Manufacturing Method for Resin Panel 1

Figure 3:
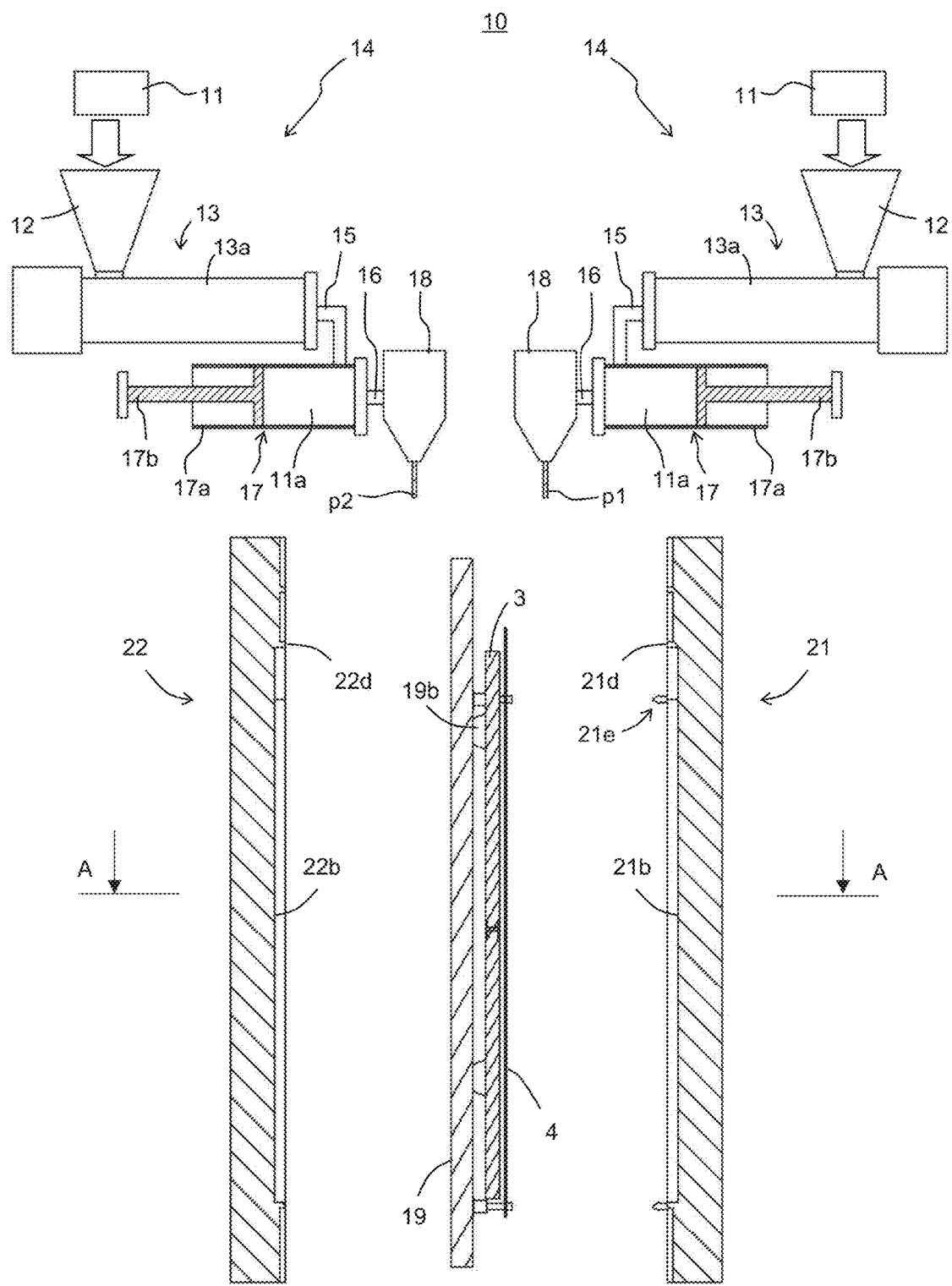
FIG. 3 is a front view of a molding machine 10 of the embodiments of the first and second viewpoint (first and second split molds 21, 22 and their nearby components are cross-sectional views).

2-1. Description of Manufacturing Apparatus
As shown in FIG. 3, the manufacturing method of the embodiment uses a molding machine 10 and an insertion apparatus 19 to form the molded body 5 shown in FIG. 15. As illustrated in FIGS. 3 to 9, the molding machine 10 includes a pair of sheet forming devices 14, first and second split molds 21, 22, a movable portion 23, and a drive mechanism 24.

2-1-1. Configuration of Sheet Forming Device 14
As illustrated in FIG. 3, each sheet forming device 14 has a hopper 12, an extruder 13, an accumulator 17, and a T-die 18. The extruder 13 and the accumulator 17 are connected via a connecting tube 15. The accumulator 17 and the T-die 18 are connected via a connecting tube 16. Details of each component will be described below.

<Hopper 12, Extruder 13>
The hopper 12 is used to feed raw resin 11 into a cylinder 13a of the extruder 13. The form of the raw resin 11 is not particularly limited and is usually in the form of pellets. The raw resin is, for example, a thermoplastic resin, such as polyolefin, and examples of the polyolefin include low-density polyethylene, linear low-density polyethylene, high-density polyethylene, polypropylene, ethylene-propylene copolymer, and a mixture thereof. The raw resin 11 may contain recycled raw material produced by pulverizing a burr portion in the pulverizer. The raw resin 11 is fed into the cylinder 13a from the hopper 12 and is heated and melted in the cylinder 13a to become molten resin. Further, the raw resin is further conveyed toward a tip of the cylinder 13a by the rotation of a screw pump arranged inside the cylinder 13a. The screw pump is arranged inside the cylinder 13a, and the molten resin is kneaded and conveyed by its rotation. A gear device is provided at a proximal end of the screw pump, and the screw pump is rotationally driven by the gear device.

<Accumulator 17, T-Die 18>
The raw resin is extruded from a resin extrusion port of the cylinder 63a and is injected into the accumulator 17 through the connecting pipe 15. The accumulator 17 includes a cylinder 17a and a piston 17b slidable inside the cylinder, and molten resin 11a can be stored in the cylinder 17a. The piston 17b is moved after a predetermined of the molten resin 11a is stored in the cylinder 17a, so that the molten resin 11a is extruded and hung down from a slit provided in the T-die 18 through the connecting pipe 16 to form first and second resin sheets p1, p2 in a molten state.

Figure 11:
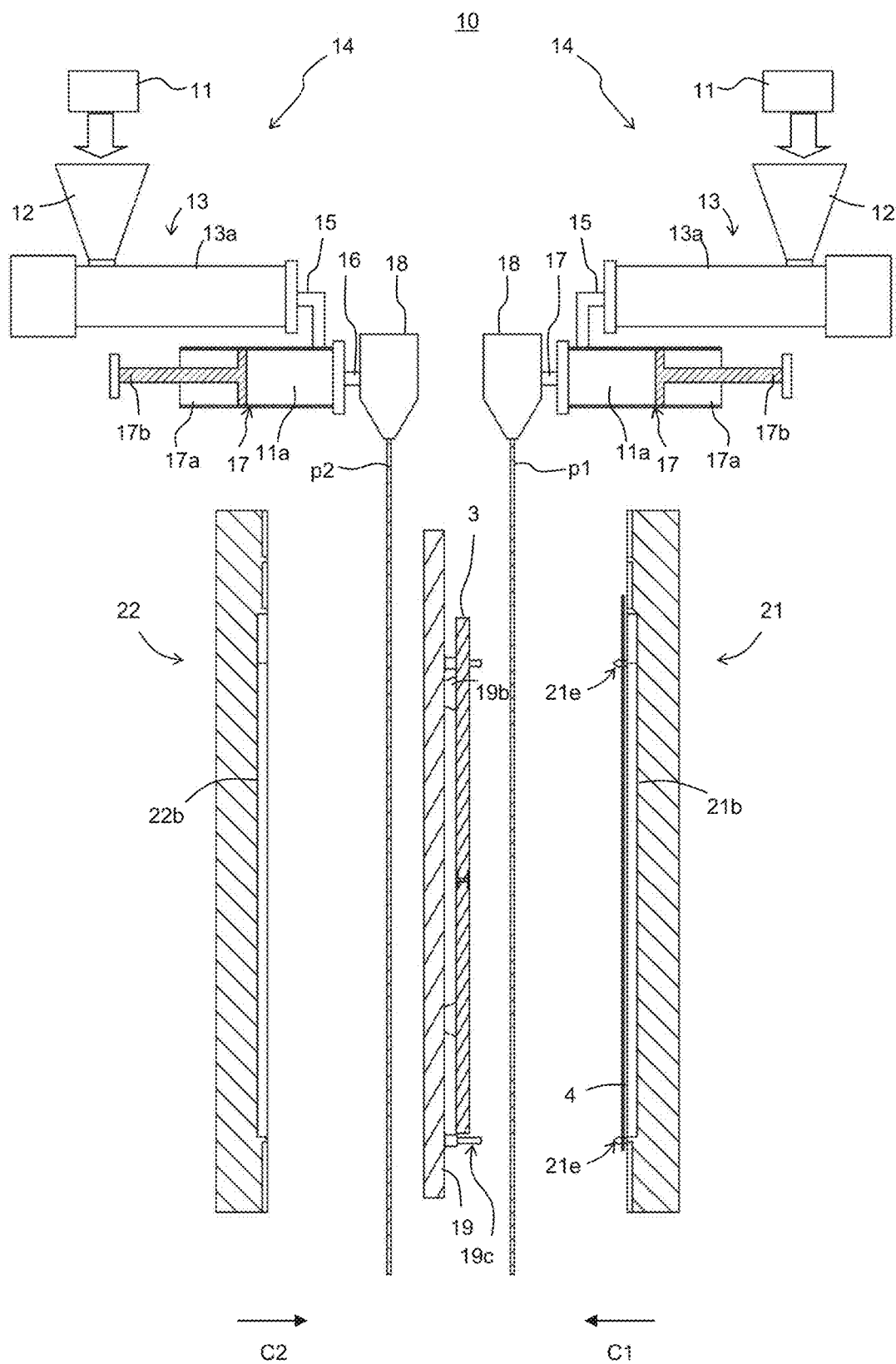
FIG. 11 is an illustration corresponding to FIG. 3 to explain a molding step of the embodiments of the first and second viewpoints.

2-1-2. First and Second Split Molds 21, 22
As illustrated in FIG. 11, the resin sheets p1, p2 are led between the first and second split molds 21, 22. The first and second split molds 21, 22 can be split at a parting surface where the molds are in contact with each other when the molds are closed, and the molded body 5 is formed by the first and second split molds 21, 22. In other words, in a molding step, the molded body 5 is molded using a pair of the first and second split molds 21, 22 that can be split. In the embodiment, a skin material escape space sp (see FIG. 13) is also formed between the first and second split molds 21, 22. In the skin material escape space sp, an end portion of the skin material 4 is placed in the molding step.

Figure 12:
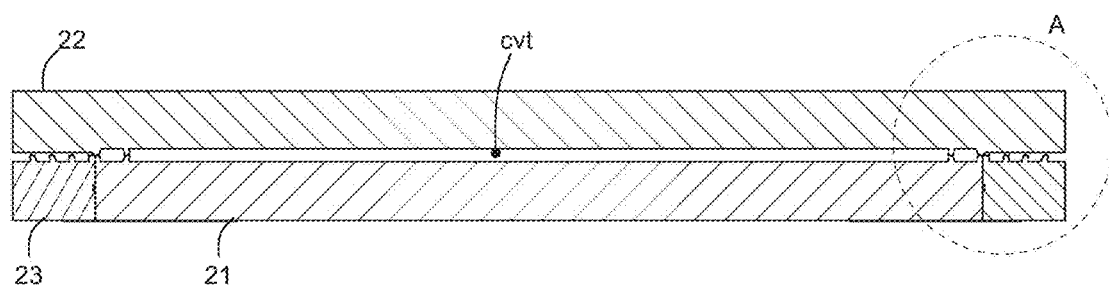
FIG. 12 is an end view of the first and second split molds 21, 22 closed and the movable portion 23 in the initial position in the embodiments of the first and second viewpoints.

<First Split Mold 21>
The first split mold 21 has a main body 21a1, a pair of first outer portions 21a2, and end face portions 21a3, as illustrated in FIG. 7, FIG. 8, FIG. 13, and FIG. 14. The main body 21a1 has a cavity cvt (see FIG. 12). When the first and second split molds 21, 22 are closed, the cavity cvt is a closed space formed between the first and second split molds 21, 22, and is a space in which a molded body is molded. The first outer portion 21a2 is connected to ends (left and right ends) of the main body 21a1 in a lateral width direction. In this regard, the lateral width direction is orthogonal to an opening and closing direction of the first and second split molds 21, 22 and is orthogonal to a vertical direction. The end face portion 21a3 has a surface against which the movable portion 23 is butted. In the embodiment, the end face portion 21a3 is a side surface of the first outer portion 21a2.

The first split mold 21 is provided with a large number of decompression suction holes h1 (see FIG. 13), and the resin sheet p1 can be suctioned under reduced pressure to be formed into a shape along an inner surface 21b of the first split mold 21. In this regard, the inner surface 21b faces the cavity cvt.

The first split mold 21 includes a pinch-off portion 21d, and the pinch-off portion 21d surrounds the cavity cvt. The pinch-off portion 21d is a projection formed to protrude from the side of the first split mold 21 to the side of the second split mold 22. The pinch-off portion 21d has an inner pinch-off portion 21d1 and an outer pinch-off portion 21d2.

Figure 13:
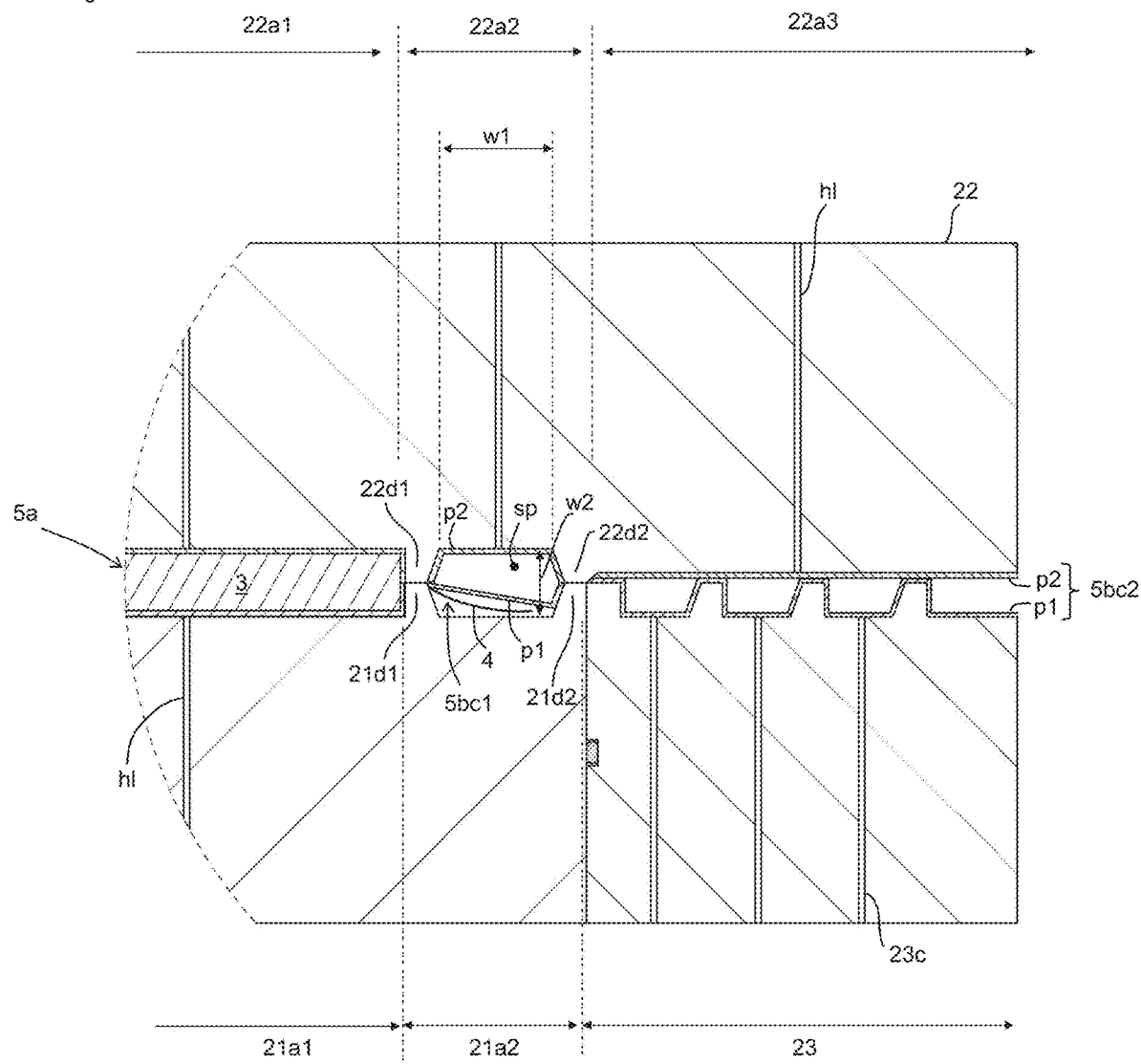
FIG. 13 illustrates a state in the embodiments of the first and second viewpoints, after an engaging step (a burr portion shaping step) and at the start of the first cutting step.

As illustrated in FIG. 13, the inner pinch-off portion 21d1 and the outer pinch-off portion 21d2 are formed in the first outer portion 21a2.

The inner pinch-off portion 21d1 faces the cavity cvt. The inner pinch-off portion 21d1 is formed in a shape corresponding to the shape of the resin panel 1. Specifically, in the embodiment, the inner pinch-off portion 21d1 has a top portion, and a surface of the top portion is flat. In the embodiment, the inner pinch-off portion 21d1 extends in a line having straight lines connected with each other at bent points.

The outer pinch-off portion 21d2 is located further away from the cavity cvt than the inner pinch-off portion 21d1. The outer pinch-off portion 21d2 is shaped to match a shape of the movable portion 23. Specifically, the outer pinch-off portion 21d2 is formed to match a shape of the engaging portion 23d (see FIG. 8) of the movable portion 23 that is closest to the first split mold 21 (hereinafter referred to as the closest engaging portion 23d), which will be described later. The outer pinch-off portion 21d2 is formed so that when the first split mold 21 and the movable portion 23 are viewed in plan view (when the first split mold 21 and the movable portion 23 are viewed from the direction of arrow C2 in FIG. 11), the outer pinch-off portion 21d2 matches the closest engaging portion 23d. In other words, the outer pinch-off portion 21d2 is formed parallel to the closest engaging portion 23d when the first split mold 21 and the movable portion 23 are viewed in plan view. This avoids distorting a cutting line of a burr portion and prevents the burr portion from being difficult to cut.

In this regard, the embodiment is described as if the closest engaging portion 23d is located at the end of an opposing surface portion 23a of the movable portion 23, which is described below, but is not limited thereto. In the drive direction of the movable portion 23, the closest engaging portion 23d may be positioned at an inner position than the end in the opposing surface portion 23a.

A surface of a top portion of the outer pinch-off portion 21d2 coincides with a surface of a top portion of this closest engaging portion 23d. In other words, if the surface of the top portion of the outer pinch-off portion 21d2 were extended, the extended surface would overlap with the surface of the top portion of the closest engaging portion 23d. Therefore, the surface of the top portion of the outer pinch-off portion 21d2 smoothly connects to the surface of the top portion of the closest engaging portion 23d. Thus, in the embodiment, the cutting line of the burr portion is further effectively avoided from being distorted, and the burr portion is effectively prevented from being difficult to cut.

In this regard, in the embodiment, the shape of the inner pinch-off portion 21d1 corresponds to the closest engaging portion 23d, and thus the outer pinch-off portion 21d2 is parallel to the inner pinch-off portion 21d1. However, the shape of the outer pinch-off portion 21d2 need not be limited to the shape of the inner pinch-off portion 21d1. In other words, the shape of the outer pinch-off portion 21d2 can be defined according to the shape of the movable portion 23. In other words, the shape of the inner pinch-off portion 21d1 is limited by the shape of the resin panel 1, while the shape of the outer pinch-off portion 21d2 is not limited by the shape of the resin panel 1, but can be adapted to the shape of the movable portion 23.

The first split mold 21 includes a male projection 21e. The male projection 21e is provided at a position facing a female projection 19c of the insertion apparatus 19 which is described later. The male projection 21e can be slid with respect to the first split mold 21 to be accommodated in the first split mold 21.

<Second Split Mold 22>

The second split mold 22 has a main body 22a1, a pair of second outer portions 22a2, and a pair of opposing portions 22a3, as illustrated in FIG. 13. The main body 22a1 has a cavity cvt (see FIG. 12). The second outer portion 22a2 is connected to ends (i.e. left and right ends) of the main body 22a1 in the lateral width direction. Each opposing portion 22a3 is connected to end of each second outer portion 22a2 in the lateral width direction. The opposing portion 22a3 is positioned to oppose the movable portion 23.

The second split mold 22 is provided with a large number of decompression suction holes h1 (see FIG. 13), and the resin sheet p2 can be suctioned under reduced pressure to be formed into a shape along an inner surface 22b of the second split mold 22. In this regard, the inner surface 22b faces the cavity cvt.

The second split mold 22 includes a pinch-off portion 22d, and the pinch-off portion 22d surrounds the cavity cvt. The pinch-off portion 22d is a projection formed to protrude from the side of the second split mold 22 to the side of the first split mold 21. The pinch-off portion 22d has an inner pinch-off portion 22d1 and an outer pinch-off portion 22d2. As illustrated in FIG. 13, the inner pinch-off portion 22d1 and the outer pinch-off portion 22d2 are formed in the second outer portion 22a2.

The inner pinch-off portion 22d1 and the outer pinch-off portion 22d2 are similar to the inner pinch-off portion 21d1 and outer pinch-off portion 21d2, respectively.

The inner pinch-off portion 22d1 faces the cavity cvt. The inner pinch-off portion 22d1 is formed in a shape corresponding to the shape of the resin panel 1. Specifically, the inner pinch-off portion 22d1 has a top portion, and a surface of the top portion is flat. The inner pinch-off portion 22d1 extends in a line having straight lines connected with each other at bent points.

The outer pinch-off portion 22d2 is located further away from the cavity cvt than the inner pinch-off portion 22d1. Similar to the outer pinch-off portion 21d2, the outer pinch-off portion 22d2 is shaped to match the shape of the movable portion 23. A surface of a top portion of the outer pinch-off portion 22d2 coincides with the surface of the top portion of this closest engaging portion 23d. Therefore, the surface of the top portion of the outer pinch-off portion 22d2 smoothly connects to the surface of the top portion of the closest engaging portion 23d.

<Skin Material Escape Space sp>

The skin material escape space sp is space where a redundant portion of the skin material 4 is placed. The skin material escape space sp is also space where an end portion of the skin material 4 is placed. The skin material escape space sp is formed between the first and second split molds 21, 22. Specifically, the skin material escape space sp is space between the first outer portion 21a2 and the second outer portion 22a2, and is space between the inner pinch-off portion 21d1 and the inner pinch-off portion 22d1 and the outer pinch-off portion 21d2 and the outer pinch-off portion 22d2.

The skin material 4 used in the molding step is larger than the size of the cavity cvt. Therefore, a part of the skin material 4 becomes the redundant portion during the molding step. In this regard, the redundant portion of the skin material 4 is cut off by the operator in a subsequent step. The raw material resin 11 forming the burr portion can be reused, but if the redundant portion of the skin material 4 adheres to the resin sheet p1 corresponding to the raw material resin 11, the redundant portion may become firmly bonded to the resin sheet p1, making it difficult to peel off the skin material 4 from the resin sheet p1. If the burr portion cannot be peeled off, the burr portion is discarded and the resin thereof cannot be reused. Therefore, in the embodiment, the skin material escape space sp is provided with the first and second split molds 21, 22.

In the case where the thickness of the resin sheet p1 and the thickness of the resin sheet p2 are within a range from 0.6 (mm) to 1.7 (mm), respectively, a width dimension w1 of the skin material escape space sp and a depth dimension w2 of the skin material escape space sp shown in FIG. 13 are explained herein.

The width dimension w1 is preferably set to 15.0, 15.5, 16.0, 16.5, 17.0, 17.5, 18.0, 18.5, 19.0, 19.5, 20.0, 20.5, 21.0, 21.5, 22.0, 22.5, 23.0, 23.5, 24.0, 24.5, 25.0 (mm). The width dimension w1 may be within a range between any two of the values exemplified herein.

The depth direction w2 of the skin material escape space sp is preferably set to 4.0, 4.2, 4.4, 4.6, 4.8, 5.0, 5.2, 5.4, 5.6, 5.8, 6.0, 6.2, 6.4, 6.6, 6.8, 7.0, 7.2, 7.4, 7.6, 7.8, 8.0 (mm), and the depth dimension w2 may be within a range between any two of the values exemplified herein.

By setting the width dimension w1 of the skin material escape space sp and the depth dimension w2 of the skin material escape space sp in this manner, adhesion between the skin material 4 and the resin sheet p1 can be suppressed.

The first outer portion 21a2 is not provided with the decompression suction holes h1. In other words, although the decompression suction holes h1 are formed to communicate the cavity cvt of the first and second split molds 21, 22, the decompression suction holes h1 are not provided in the first outer portion 21a2. This effectively suppresses adhesion of the skin material 4 and the resin sheet p1. In this regard, in the embodiment, the second outer portion 22a2 is described as being provided with the decompression suction holes h1, but it is not limited thereto and may not be provided.

2-1-3. Configuration of Movable Portion 23

The movable portion 23 has the function of engaging the burr portion and cutting the burr portion. The movable portion 23 is movable relative to the first and second split molds 21, 22. As illustrated in FIG. 9A to FIG. 10B, and FIG. 13, the movable portion 23 is provided on the side of the first outer portion 21a2 of the first split mold 21. The movable portion 23 has the opposing surface portion 23a, a butting surface portion 23b, a suction part 23c, the engaging portion 23d, and a sealing member 23e.

As illustrated in FIG. 13, the opposing surface portion 23a is provided to opposite the opposing portion 22a3 of the second split mold 22. The opposing surface portion 23a has a plurality of the engaging portions 23d.

Figure 14:
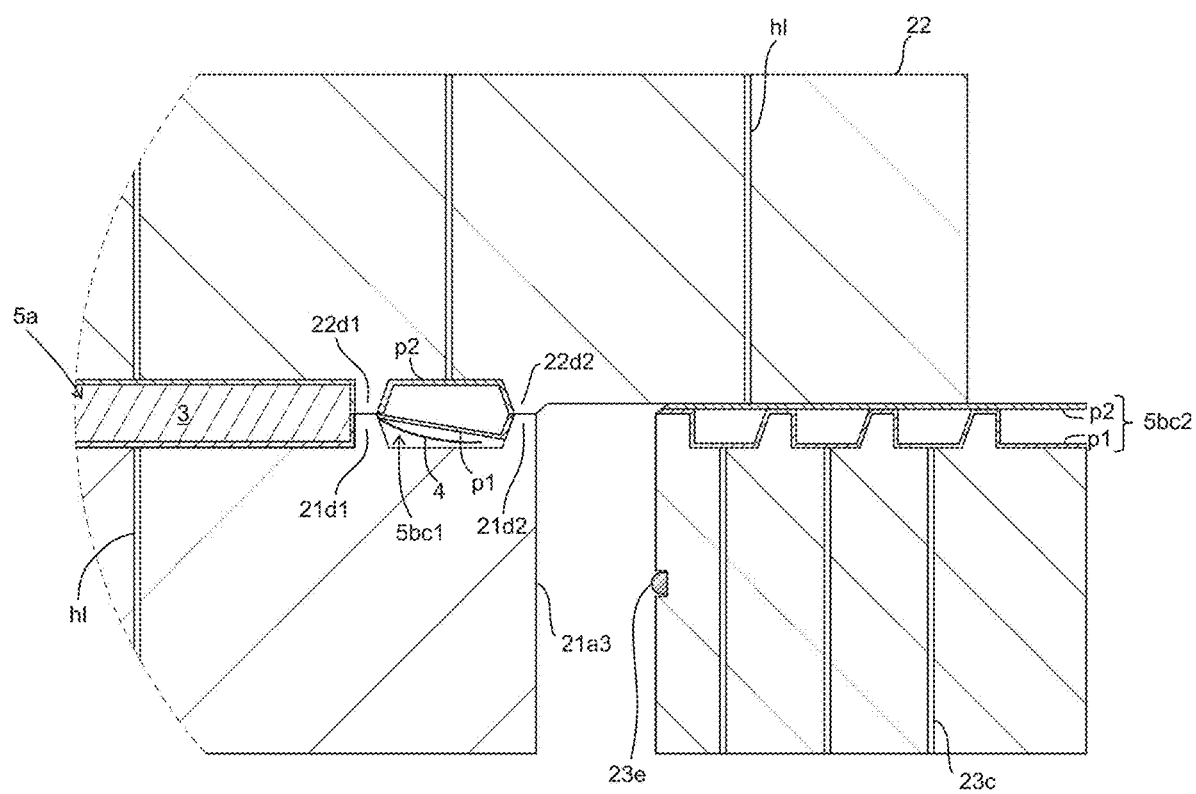
FIG. 14 is an illustration of the operation of the first cutting step of the embodiments of the first and second viewpoints.

As illustrated in FIG. 14, the butting surface portion 23b is formed to be able to butt against the end face portion 21a3 of the first split mold 21. The butting surface portion 23b is formed along the end face portion 21a3. Therefore, when reduced pressure is generated by sucking air through the decompression suction hole h1 with the butting surface portion 23b butting against the end face portion 21a3, it is possible to prevent air from flowing from a gap between the butting surface portion 23b and the end face portion 21a3 into space where resin is to be shaped. In this regard, the space where the resin is to be shaped is, for example, the cavity cvt, the gap between the burr portion and the surface of the engaging portion 23d, and the like.

As illustrated in FIG. 13, the suction part 23c is a hole formed in the opposing surface portion 23a and opens to an area where engaging portion 23d is formed. When reduced pressure is generated by sucking air through the suction part 23c, the burr portion (an outer burr portion 5bc2) is shaped along the engaging portion 23d. This allows the burr portion (the outer burr portion 5bc2) to more securely hook onto the movable portion 23 and prevents the burr portion from sliding against the movable portion 23 when the movable portion 23 is moved. As a result, in the embodiment, when the movable portion 23 is moved, the burr portion follows the movable portion 23 properly and the burr portion can be cut more reliably.

For example, if reduced pressure is generated with the suction part 23c when the resin sheet p1 is being shaped in the cavity cvt, wrinkles or the like may occur in the resin sheet p1 and the formability may be degraded. Therefore, a decompression suction system in the suction part 23c is independent of a decompression suction system of the decompression suction holes h1 of the first split mold 21. This makes it possible to separately control timing at which the suction part 23c performs decompression suction and timing at which the decompression suction hole h1 performs decompression suction, thereby avoiding loss of formability.

The engaging portion 23d has the function for engaging with the burr portion. The engaging portion 23d is a protrusion formed to project toward the second split mold 22. Since a plurality of the engaging portions 23d are formed on the opposing surface portion 23a, the opposing surface portion 23a has an uneven shape in the region where the engaging portions 23d are formed. In this regard, the embodiment is described as if the suction part 23c is open in the opposing surface portion 23a in the area between two adjacent engaging portions 23d, but is not limited to this. The suction part 23c may be open on the surface of the engaging portion 23d.

Figure 9A:
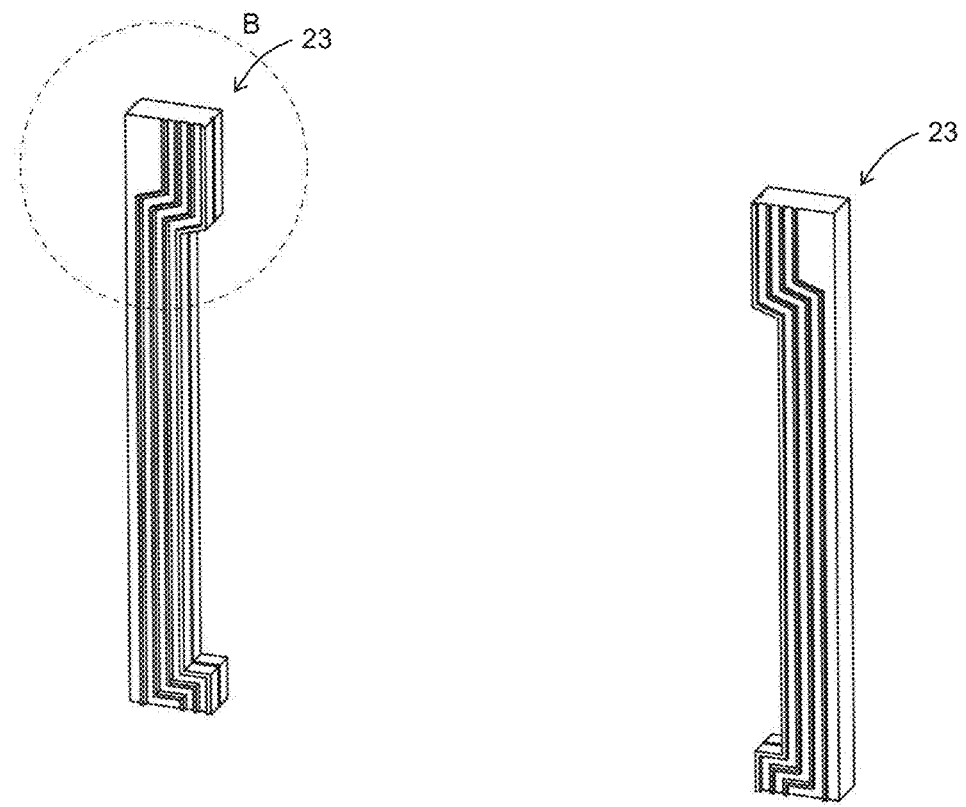
FIG. 9A is a perspective view of a pair of movable portions 23 of the embodiments of the first and second viewpoints.
Figure 9B:
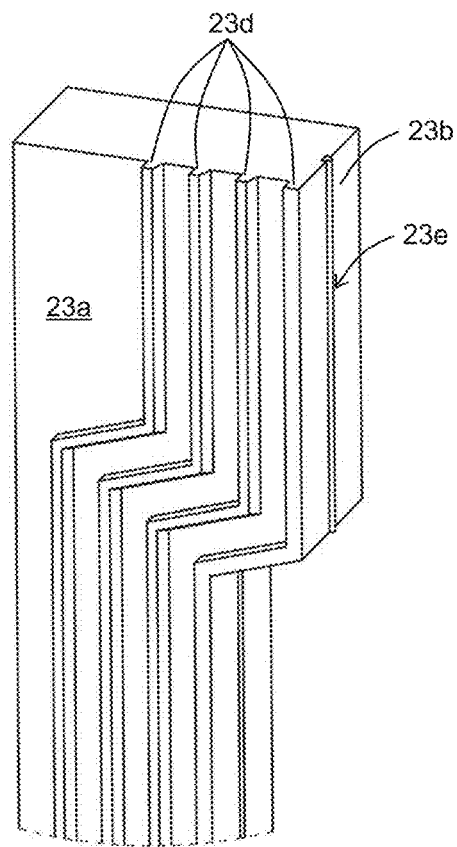
FIG. 9B is an enlarged view of area B of FIG. 9A.

As illustrated in FIG. 9B, the sealing member 23e is attached to the butting surface portion 23b. Specifically, a groove is formed in the butting surface portion 23b, and the sealing member 23e is attached within the groove. This effectively prevents air from flowing from between the butting surface portion 23b and the end face portion 21a3 into space where the resin described above is to be shaped. In this regard, although the embodiment describes the sealing member 23e as being attached to the butting surface portion 23b, it is not limited to this, and the sealing member 23e may be attached to the end face portion 21a3 of the first split mold 21.

2-1-4. Configuration of Drive Mechanism 24

Figure 5:
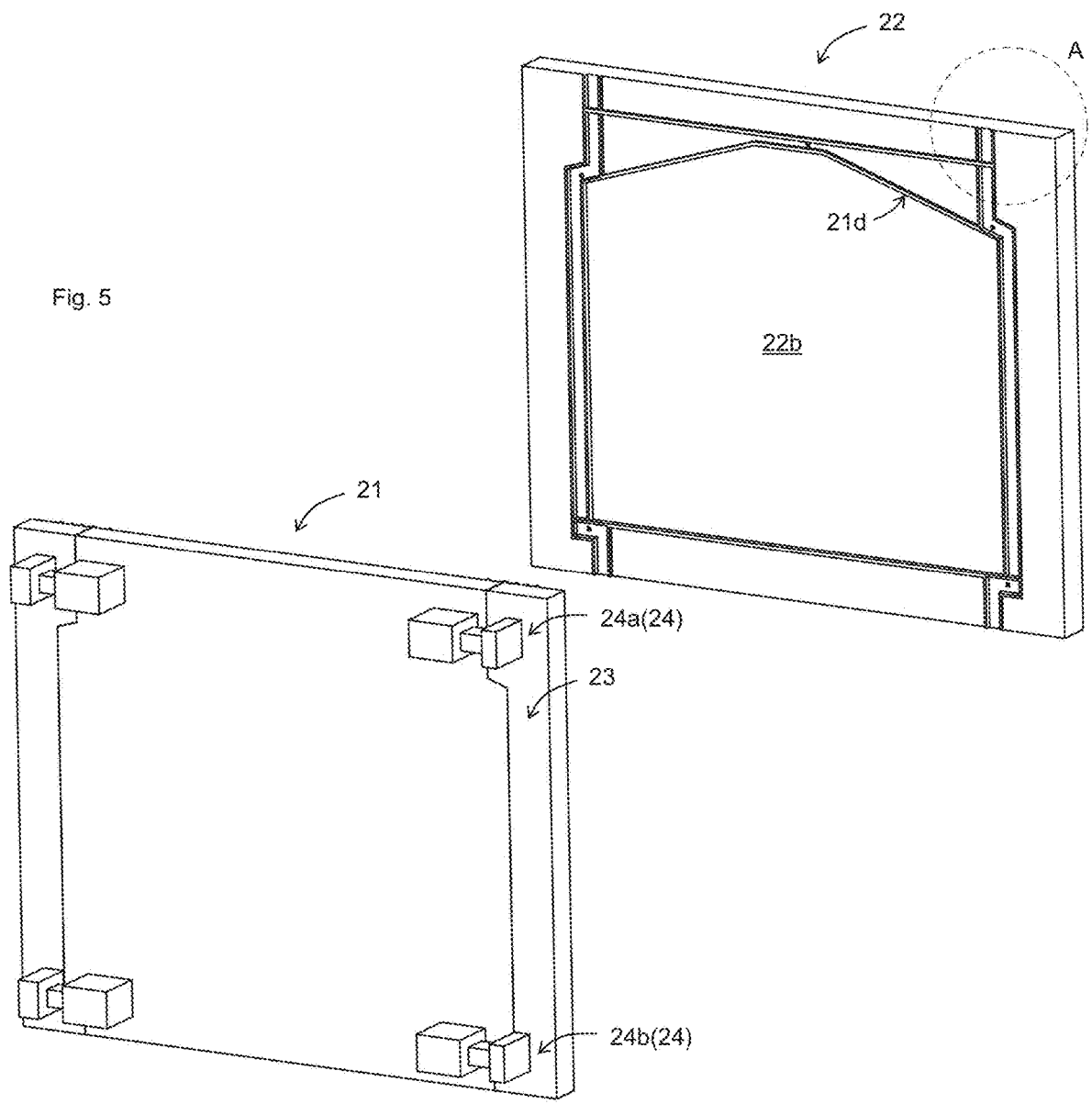
FIG. 5 illustrates a perspective view of the first and second split molds 21, 22 in a state in which the molds are open, in the embodiments of the first and second viewpoints.
Figure 6:
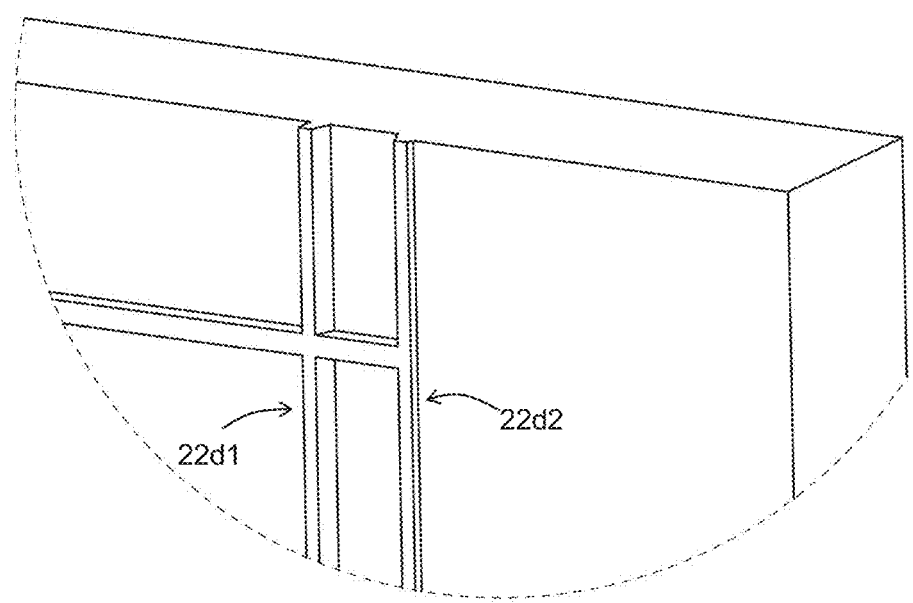
FIG. 6 is an enlarged view of area A of FIG. 5.
Figure 7:
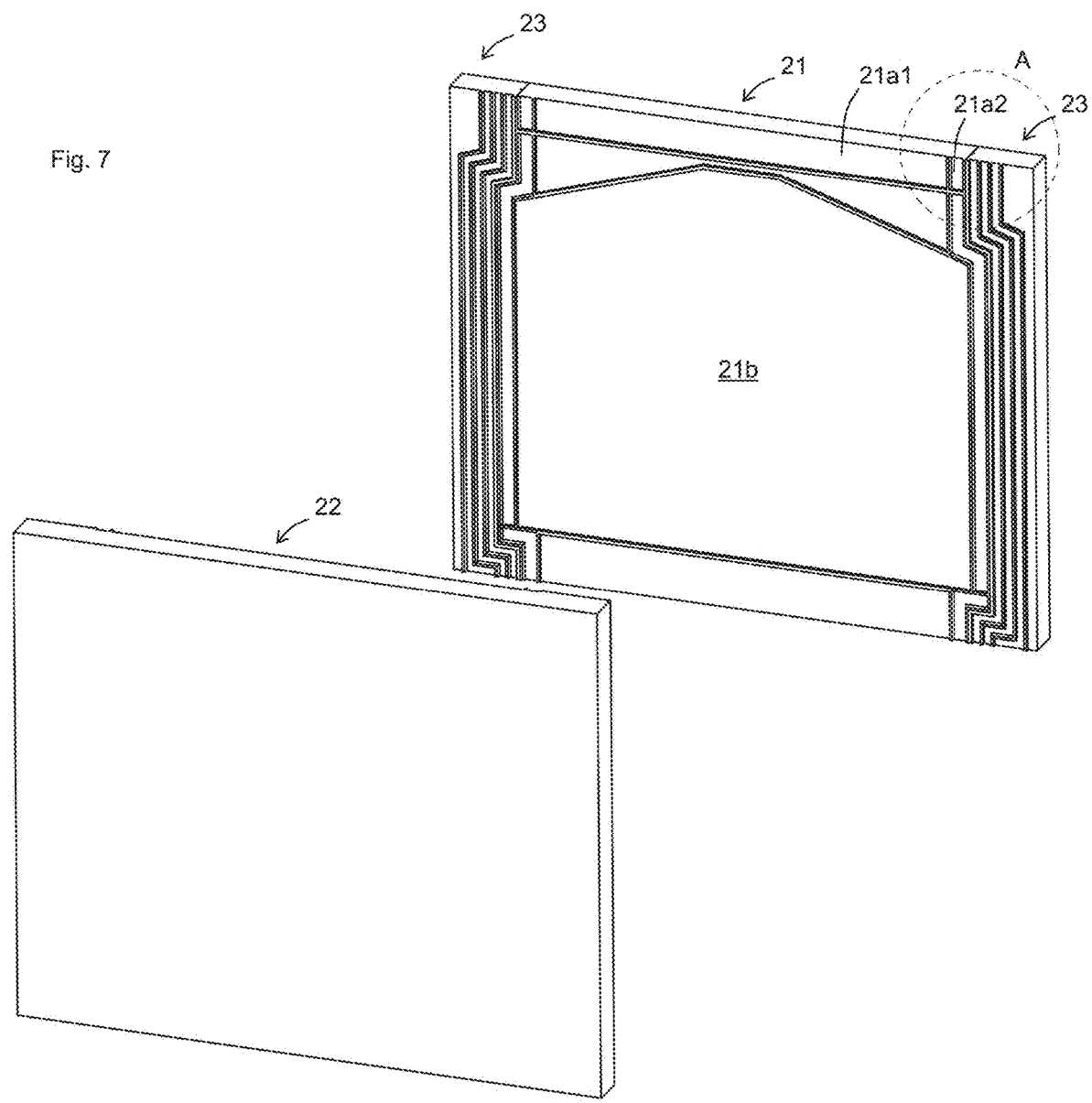
FIG. 7 is a perspective view of the first and second split molds 21, 22 seen from a different direction from that shown in FIG. 5.
Figure 8:
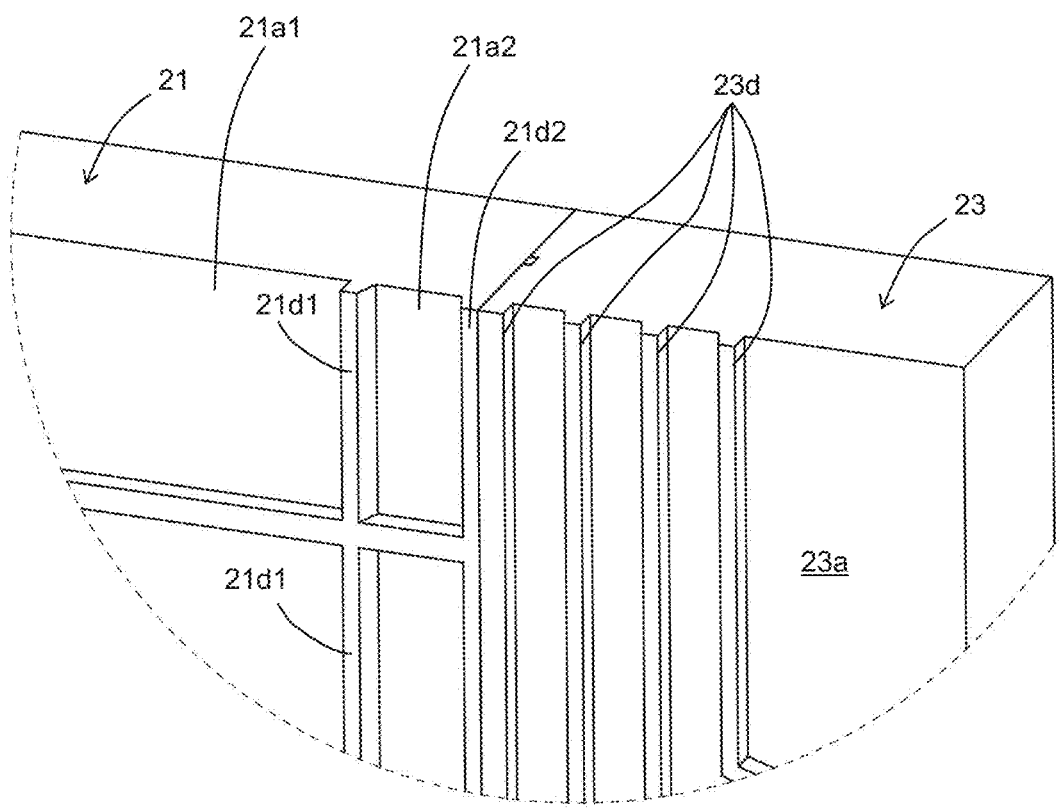
FIG. 8 is an enlarged view of area A of FIG. 7.

As illustrated in FIG. 5, the drive mechanism 24 is located at a rear face of the first split mold 21. The drive mechanism 24 is configured to move the movable portion 23. The drive mechanism 24 has a pair of upper drive mechanisms 24a and a pair of lower drive mechanisms 24b, as illustrated in FIG. 5. Each upper drive mechanism 24a and each lower drive mechanism 24b can be configured of cylinders, for example. Each upper drive mechanism 24a and each lower drive mechanism 24b are provided across the first split mold 21 and the movable portion 23, and each upper drive mechanism 24a and each lower drive mechanism 24b are fixed to the first split mold 21 and the movable portion 23. The cylinder of each upper drive mechanism 24a and the cylinder of each lower drive mechanism 24b are extended to move the movable portion 23.

Figure 10A:
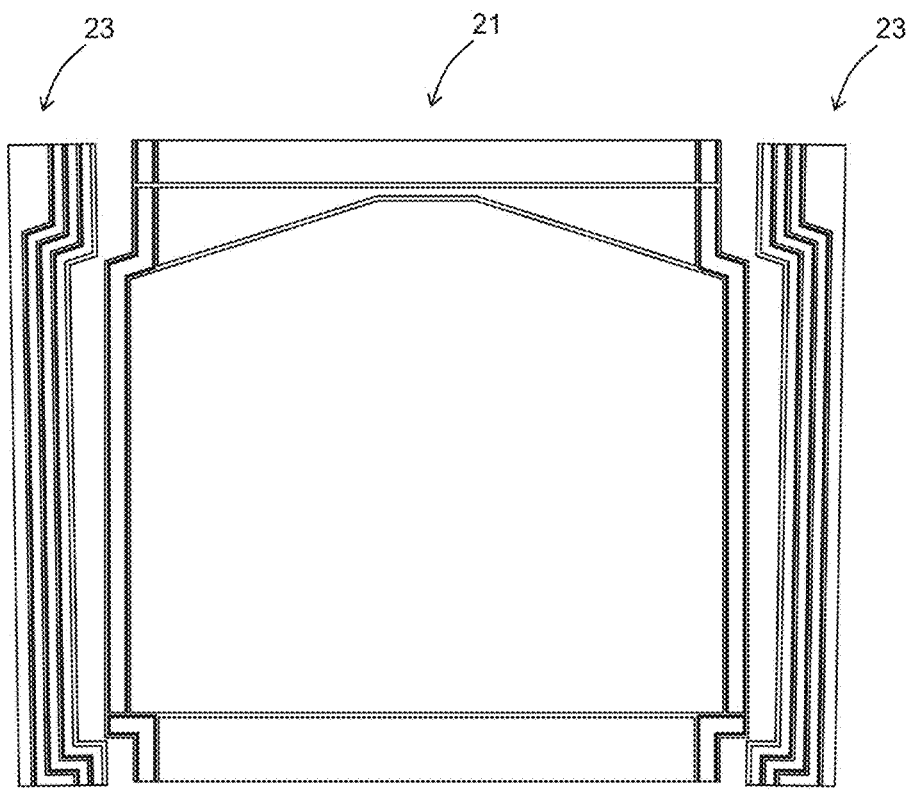
FIG. 10A and FIG. 10B are front views showing the operation of the movable portion 23 when performing a first cutting step of the embodiments of the first and second viewpoints.
Figure 10B:
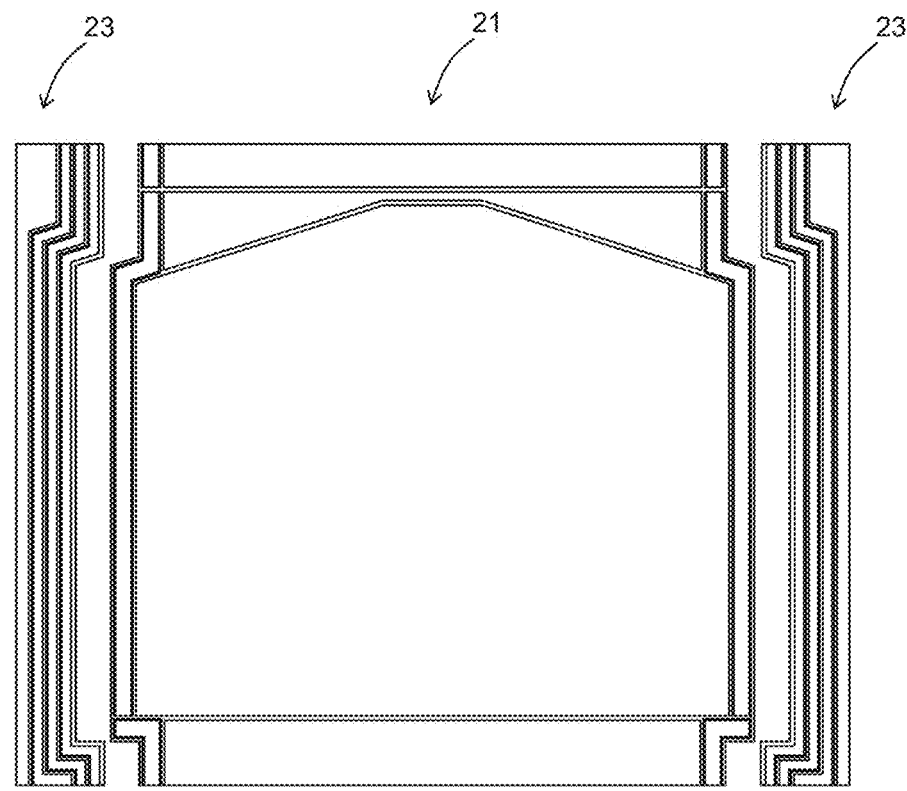

Each upper drive mechanism 24a and each lower drive mechanism 24b can be controlled independently. Thus, the drive mechanism 24 can move the upper part of the movable portion 23 and then move the lower part of the movable portion 23, as illustrated in FIGS. 10A and 10B. This allows the force to tear the burr portion to be localized, and the movable portion 23 can tear the burr portion smoothly.

2-1-5. Insertion Apparatus 19

Figure 4A:
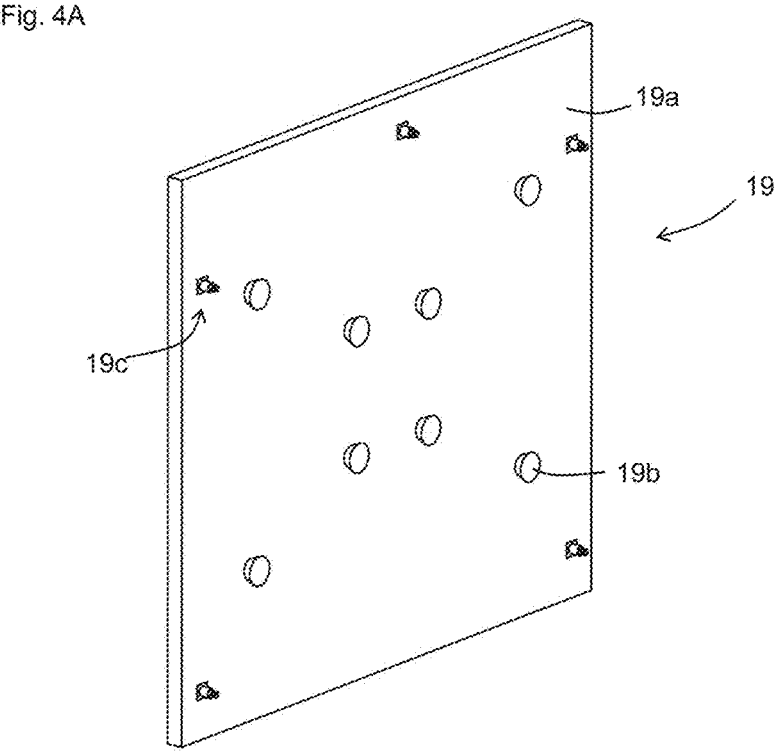
FIG. 4A is a perspective view of an inserting device 19 of the embodiments of the first and second viewpoints.
Figure 4B:
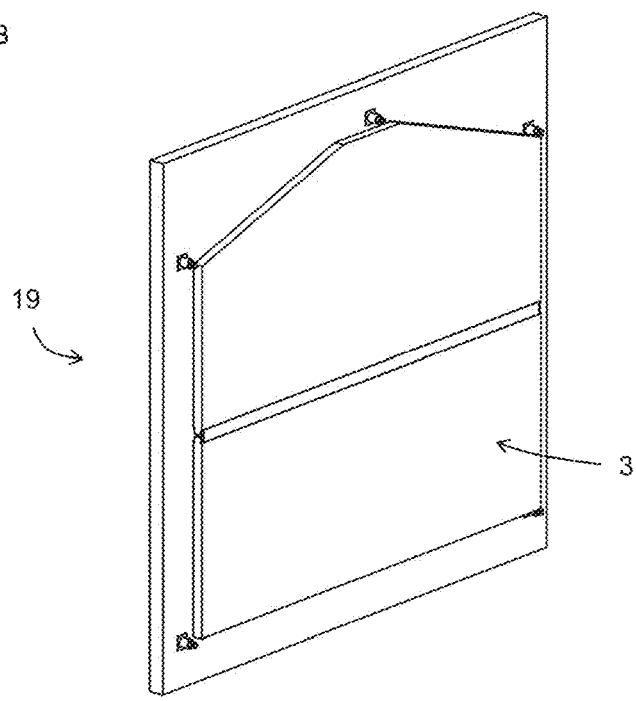
FIG. 4B illustrates the core member 3 being attached to the inserting device 19.

The insertion apparatus 19 is movable by a drive mechanism not shown in the figure. As illustrated in FIG. 4A, the insertion apparatus 19 has a base 19a, suction pads 19b, and female projections 19c. Each component is held by the base 9a. The suction pad 9b is used to suction and hold the core member 3. The female projection 19c can hold the skin material 4 and is used to attach the skin material 4 to the first split mold 21.

2-2. Molded Body 5

The resin panel 1 is obtained by removing the burr portion of the molded body 5 (see FIG. 15), which is described below. In other words, the molded body 5 is a molded body after being molded in the molding step but before the burr portion is removed.

Figure 15:
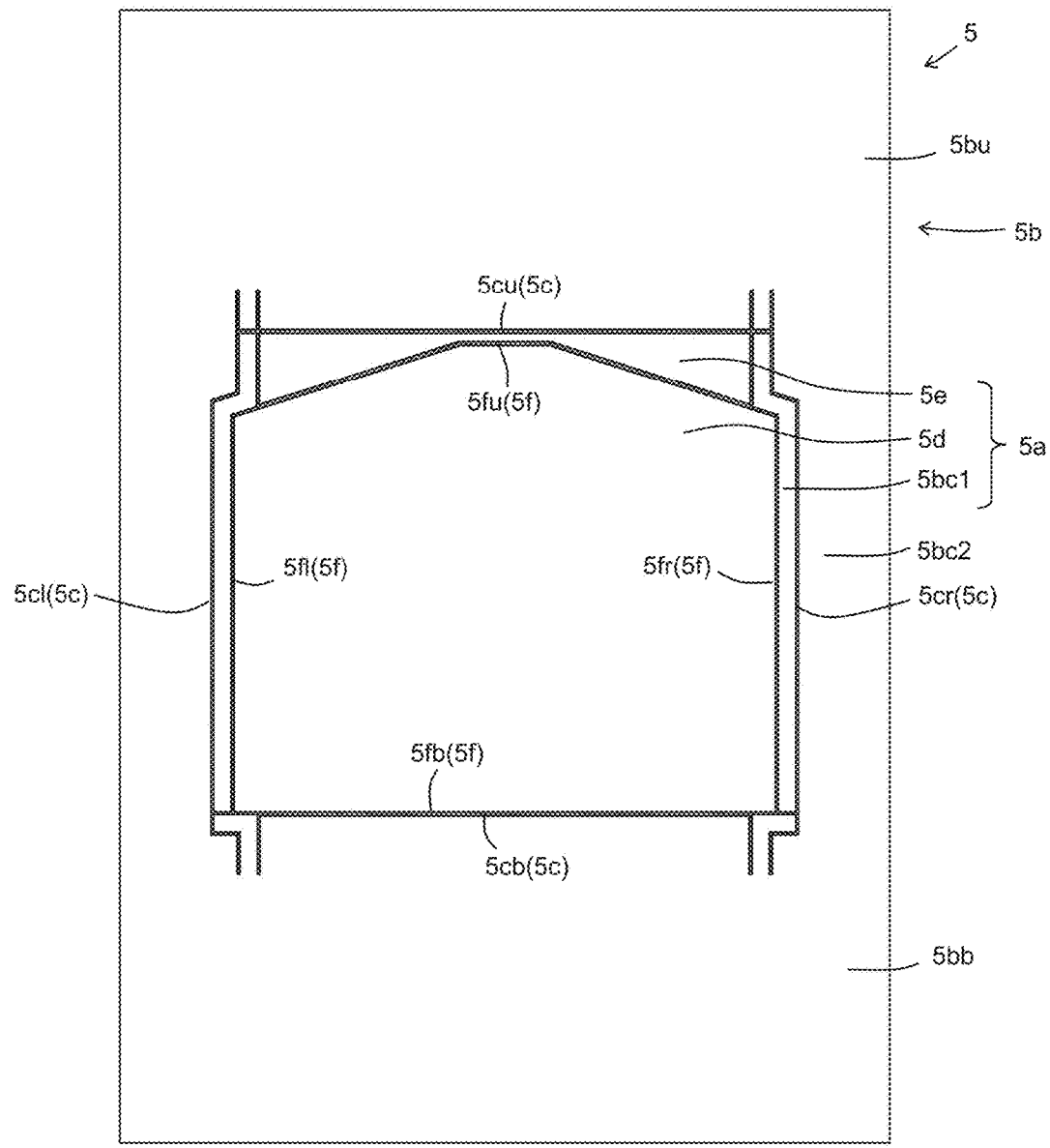
FIG. 15 is a front view of a molded body 5 of the embodiments of the first to third viewpoints.

As illustrated in FIG. 15, the molded body 5 includes a molded main body 5a and a large burr portion 5b such that the molded main body 5a and the large burr portion 5b are connected to each other via a cutting line 5c surrounding the molded main body 5a. The cutting line 5c corresponds to a portion squashed by the pinch-off portions 21d, 22d. By cutting the molded body 5 along the cutting line 5c around the entire circumference of the molded main body 5a, the molded body 5 can be separated into the molded main body 5a and the large burr portion 5b.

Figure 16:
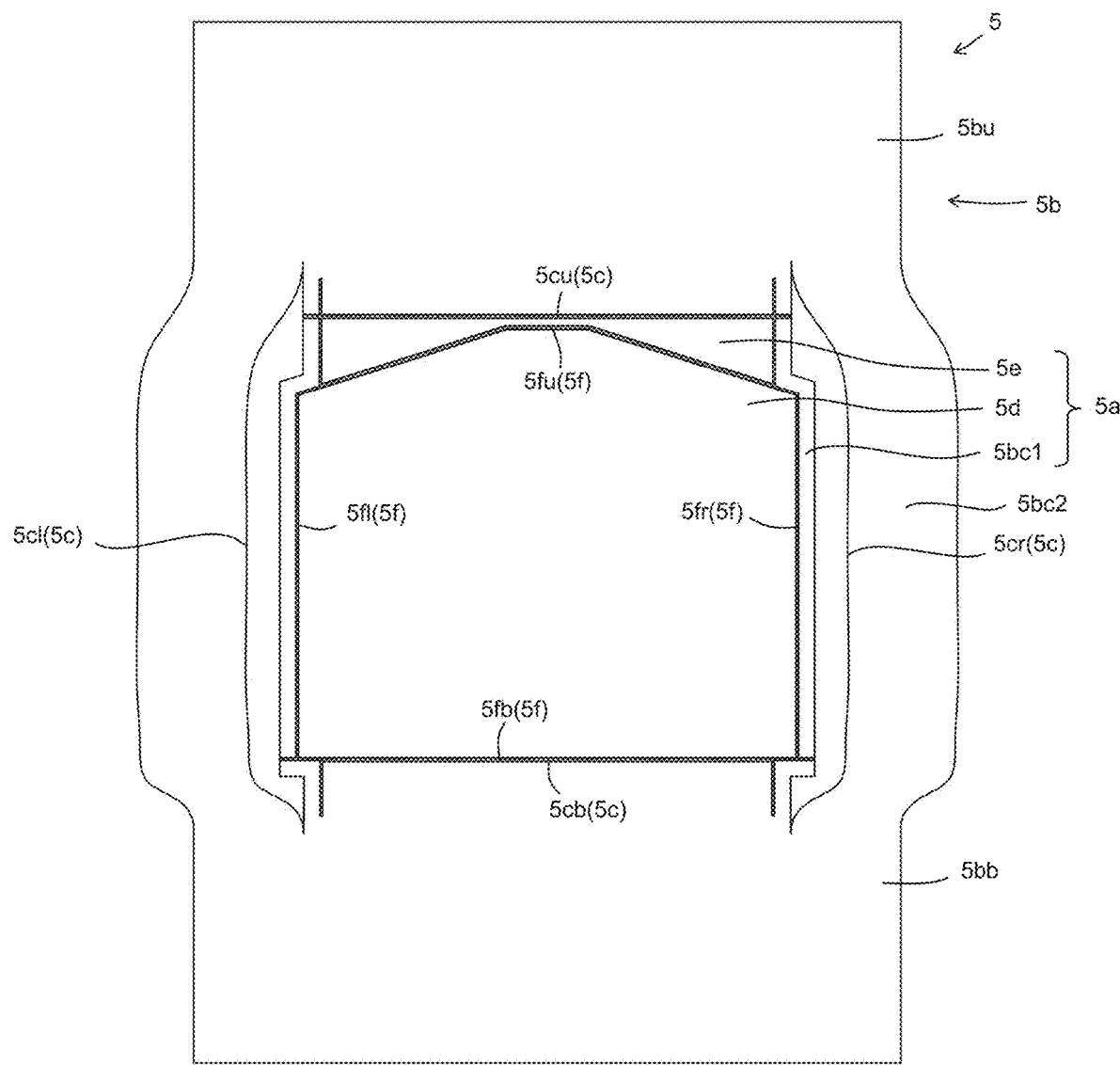
FIG. 16 shows a schematic front view in which, in the first and second viewpoints, the outer burr portion 5bc2 of the molded body 5 in FIG. 13 is cut off from an inner burr portion 5bc1.

As illustrated in FIG. 15 and FIG. 16, the molded main body 5a includes a portion corresponding to the resin panel 1 described earlier (a molded member 5d), and a small burr portion 5e and an inner burr portion 5bc1 that are connected to the corresponding portion. In other words, the resin panel 1 can be obtained by removing the small burr portion 5e and the inner burr portion 5bc1 from the molded main body 5a.

The large burr portion 5b also includes an upper burr portion 5bu located above the molded main body 5a, a lower burr portion 5bb located below the molded main body 5a, and the outer burr portion 5bc2 located between the upper burr portion 5bu and the lower burr portion 5bb. The outer burr portion 5bc2 is connected to the inner burr portion 5bc1 before being cut by the movable portion 23.

As illustrated in FIG. 13, the inner burr portion 5bc1 consists of the resin sheets p1, p2 and the skin material 4. On the other hand, the outer burr portion 5bc2 consists of the resin sheets p1, p2. In other words, the outer burr portion 5bc2 does not include the skin material 4. In other words, the skin material 4 is arranged so that the edge of the skin material 4 is positioned between the inner pinch-off portions 21d1, 22d1 and the outer pinch-off portions 21d2, 22d2.

The cutting line 5c includes a left line 5cl (an example of an outer line portion), a right line 5cr (an example of the outer line portion), an upper line 5cu, and a bottom line 5cb. The left line 5cl, the right line 5cr, the upper line 5cu, and the bottom line 5cb are located on a left side, a right side, an upper side, and a lower side of the molded main body 5a, respectively, when the molded body 5 is viewed from a mold closing direction (direction along an arrow C2 in FIG. 11) of the second split mold 22 illustrated in FIG. 11.

The embodiment includes a first cutting step in which the molded body 5 is cut along the right line 5cr and the left line 5cl by the first and second split molds 21, 22 and the movable portion 23. Then, after the molded body 5 is removed from the first and second split molds 21, 22, a second cutting step is performed to cut the molded body 5 along the remainder of the cutting line 5c (i.e., the upper line 5cu and the bottom line 5cb).

The molded main body 5a consists of the molded member 5d (corresponding to the resin panel 1), the small burr portion 5e, and the inner burr portion 5bc1 connected via a parting line 5f. In other words, the molded main body 5a has the molded member 5d, the small burr portion 5e and the inner burr portion 5bc1, and a part of the parting line 5f (a left line 5fl and a right line 5fr). Therefore, the small burr portion 5e and the inner burr portion 5bc1 can be separated from the molded member 5d by cutting the molded main body 5a along the parting line 5f all the way around the molded member 5d.

The parting line 5f has the left line 5fl (an example of an inner line portion), the right line 5fr (an example of the inner line portion), an upper line 5fu, and a bottom line 5fb. The left line 5fl, the right line 5fr, the upper line 5fu, and the bottom line 5fb are located on the left side, the right side, the upper side, and the lower side of the molded main body 5a, respectively, when the molded body 5 is viewed from the mold closing direction (arrow C2) of the second split mold 22 illustrated in FIG. 11.

In this regard, in the embodiment, the bottom line 5cb of the cutting line 5c overlaps the bottom line 5fb of the parting line 5f.

The upper line 5cu of the cutting line 5c is located adjacent to a top portion of the upper line 5fu of the parting line 5f. Therefore, the molded member 5d and the small burr portion 5e are connected via the upper line 5fu.

Furthermore, the left line 5cl and the right line 5cr of the cutting line 5c are located adjacent to lateral sides of the left line 5fl and the right line 5fr of the parting line 5f, respectively. Therefore, the molded member 5d and the inner burr portion 5bc1 are connected via the left line 5fl and the right line 5fr.

The upper line 5fu of the parting line 5f is not straight. This makes it necessary, for example, for the operator to cut the molded body 5 along the upper line 5fu using a cutter. Therefore, in the embodiment, the upper line 5cu formed in a straight line is provided adjacent to an upper side of the upper line 5fu. In the embodiment, the bottom line 5fb of the parting line 5f is also straight. These straight lines can be cut by using a cutter of a burr portion cutting device. Thus, after the left line 5cl and the right line 5cr are cut, the upper line 5cu and the bottom line 5cb are cut, and then the molded main body 5a is separated from the large burr portion 5b.

2-3. Description of Each Step of the Manufacturing Method

The manufacturing method of the resin panel 1 of this embodiment includes a skin material attachment step, a hanging step, a resin sheet shaping step, a core member welding step, the molding step, an engagement step, the first cutting step, a molded body removal step, the second cutting step, and a post-process.

2-3-1. Skin Material Attachment Step

In the skin material attachment step, the skin material 4 is attached to the first split mold 21. Specifically, the female projection 19c is inserted in advance into a through-hole formed in the skin material 4, and the skin material 4 is held by the insertion apparatus 19, as illustrated in FIG. 3. In the skin material attachment step, the female projection 19c and the male projection 21e are made to face each other, then both are engaged, and in this state, the skin material 4 is moved to the male projection 21e by pushing the skin material 4 toward the male projection 21e. As a result, the skin material 4 is attached to the first split mold 21, as illustrated in FIG. 11.

2-3-2. Hanging Step

In the hanging step, as illustrated in FIG. 11, the resin sheets p1, p2 extruded from the T-die 18 are hung between the first and second split molds 21, 22. The resin sheet p1 is hung between the core member 3 and the skin material 4. The resin sheet p2 is hung between the insertion apparatus 19 and the second split mold 22. In the embodiment, direct vacuum molding is performed using the resin sheets p1, p2 as they are extruded from the T-die 18, so the resin sheets p1, p2 are not cooled to room temperature and solidified before molding, and the solidified resin sheets p1, p2 are not heated before molding.

2-3-3. Resin Sheet Shaping Step

In the resin sheet shaping step, the resin sheet p1 and a protruding portion (e.g., the pinch-off portion) of the first split mold 21 are made to closely contact in advance, and a closed space is formed between the resin sheet p1 and the first split mold 21. The same applies to the resin sheet p2 and the second split mold 22. In this regard, to form the closed space, an outer frame (not shown) that is separate from the first and second split molds 21, 22 can be used. Each outer frame is placed around the periphery of the first and second split molds 21, 22. Each outer frame is movable in the opening and closing direction of the first and second split molds 21, 22, and is provided with decompression suction holes. The outer frame of the first split mold 21 closely contacts the resin sheet p1 by suctioning it, and the closed space is formed between the first split mold 21, the resin sheet p1 and the outer frame. The same is applied to the outer frame of the second split mold 22.

In the resin sheet shaping step, air in the closed space is suctioned to generate reduced pressure through the decompression suction holes h1 of the first and second split molds 21 and 22, and the resin sheets p1, p2 are shaped along the first and second split molds 21 and 22. In the first split mold 21, the resin sheet p1 is shaped to follow the shape of the inner surface 21b of the cavity. The resin sheet p2 is shaped to follow the inner surface 22b of the cavity. The timing for shaping the resin sheets p1, p2 may be different from each other. For example, the resin sheet p2 may be shaped after the core member welding step, or the resin sheet p2 may be shaped during a mold clamping step.

In this regard, no decompression suction holes h1 are formed in the first outer portion 21a2. Therefore, even if the resin sheet shaping step is performed, adhesion between the skin material 4 and the resin sheet p1 is suppressed. Therefore, when the inner burr portion 5bc1 is removed from the molded body main body 5a, the resin of the inner burr portion 5bc1 can be reused.

2-3-4. Core Member Welding Step

In the core member welding step, the core member 3 is welded to the resin sheet p1. As illustrated in FIG. 11, the insertion apparatus 19 lets the skin material 4 be attached to the first split mold 21, thereby leaving the core member 3 in the insertion apparatus 19. In this state, the core member 3 can be welded to the resin sheet p1 by moving the insertion apparatus 19 toward the resin sheet p1. After the core member 3 is welded to the resin sheet p1, the insertion apparatus 19 is moved to a position outside movement paths of the first and second split molds 21, 22.

The timing for placing the core member 3 between the resin sheets p1, p2 is not limited, and the core member 3 may be placed between the resin sheets p1, p2 during the hanging step or the shaping step. The core member 3 may be welded to the resin sheet p2 first.

2-3-5. Molding Step

In the molding step, the first and second split molds 21, 22 are closed by moving them in the direction of arrows C1, C2 in FIG. 11. As a result, the resin sheets p1, p2 are squashed and welded together in the area corresponding to the pinch-off portion 21d and the pinch-off portion 22d to form the molded body 5 illustrated in FIG. 15.

2-3-6. Engaging Step (Burr Portion Shaping Step)

In the engaging step, the outer burr portion 5bc2 of the molded body 5 is shaped along the movable portion 23 and the outer burr portion 5bc2 is engaged with the movable portion 23 (burr portion shaping step). In other words, in the engaging step, as illustrated in FIG. 13, the outer burr portion 5bc2 is suctioned towards the engaging portion 23d via the suction part 23c, so that the outer burr portion 5bc2 of the resin sheet p1 is shaped along the engaging portion 23d.

In this regard, with the first and second split molds 21, 22 closed in the molding step, the resin (i.e. the resin sheets p1, p2) forming the outer burr portion 5bc2 are welded to each other (see FIG. 13). In this state, the engaging step (the burr portion shaping step) is performed, which causes the non-welded portions of the resin sheets p1, p2 to be easily spaced apart, and as a result, the outer burr portion 5bc2 is made hollow. As a result, even if the resin sheets p1, p2 are thin, the outer burr portion 5bc2 (of the resin sheet p1) will have clearly formed unevenness along the engaging portion 23d, and the engaging portion 23d will easily catch the outer burr portion 5bc2 (of the resin sheet p1). As a result, the movable portion 23 can effectively tear the outer burr portion 5bc2 from the inner burr portion 5bc1.

As mentioned above, the resin sheets p1, p2 constituting the outer burr portion 5bc2 are welded together. This increases the rigidity of the outer burr portion 5bc2, and as a result, the force of the engaging portion 23d pulling the outer burr portion 5bc2 is more easily transmitted to the outer burr portion 5bc2, making it easier to tear the outer burr portion 5bc2 from the inner burr portion 5bc1.

2-3-7. First Cutting Step

After the engaging step, the molded main body 5a has been accommodated in the first and second split molds 21, 22, and the large burr portion 5b has been engaged with the engaging portion 23d provided in the movable portion 23 of the first split mold 21. In this state, as illustrated in FIG. 10a, when an upper side of the movable portion 23 is tilted away from the main body 22a1, the molded body 5 begins to be cut from its upper side along the left line 5cl and the right line 5cr of the cutting line 5c. Next, as illustrated in FIG. 10B, when the movable portion 23 is moved so that the lower side of the movable portion 23 is away from the first split mold 21, the tear of the molded body 5 proceeds downward and afterwards the first cutting step is completed (see FIG. 15).

2-3-8. Molded Body Removal Step

In the molded body removal step, the first and second split molds 21, 22 are opened while the burr portions, such as the upper burr portion 5bu for example, are clamped by a clamping device, which is not shown in the figure. The molded body 5 is then transported by the clamping device to a desired location for implementing the next step. As illustrated in FIG. 16, the molded body 5 is cut along the left line 5cl and the right line 5cr of the cutting line 5c.

On the other hand, the molded body 5 is not cut along the upper line 5cu and the bottom line 5cb of the cutting line 5c. If the molded body 5 were cut along any of the upper line 5cu and the bottom line 5cb, the molded main body 5a would tend to swing against the large burr portion 5b, making it difficult to handle. However, in the embodiment, the molded body 5 is easy to handle because the molded body 5 is cut along only the left line 5*cl* and right line 5*cr* at this stage.

2-3-9. Second Cutting Step

In the second cutting step, the molded body 5 is separated into the molded main body 5*a* and the large burr portion 5*b* by cutting the molded body 5 along the upper line 5*cu* and the bottom line 5*cb*. A cutting device can be used for the second cutting step, and the cutting device can, for example, detect positions of the upper line 5*cu* and the bottom line 5*cb* and automatically cut the cutting line.

2-3-10. Post Process

In the post process, the small burr portion 5*e* and the inner burr portions 5*bc*1 are removed to obtain the resin panel 1. This process can be performed by an operator.

3. Effects of the Embodiment 3-1. Decompression and Suction Function of Movable Portion 23

In the engaging step (the burr portion shaping step) in the embodiment, the outer burr portion 5*bc*2 is sucked onto the engaging portion 23*d* of the movable portion 23 using the suction part 23*c*. As a result, the outer burr portion 5*bc*2 is shaped along the movable portion 23, and the outer burr portion 5*bc*2 is more securely engaged with the movable portion 23. Therefore, when the movable portion 23 is moved relative to the first and second split molds 21, 22, the outer burr portion 5*bc*2 is prevented from sliding against the movable portion 23, and the outer burr portion 5*bc*2 moves to follow the movable portion 23. As a result, the outer burr portion 5*bc*2 is more securely cut from the molded main body 5*a*.

3-2. Double Pinch-Off Portion

In the embodiment, the first and second split molds 21, 22 have a double pinch-off structure. That is, the first and second split molds 21, 22 have the inner pinch-off portions 21*d*1, 22*d*1 connected to the cavity cvt, and the outer pinch-off portions 21*d*2, 22*d*2 provided at positions farther from the cavity cvt than the inner pinch-off portions 21*d*1, 22*d*1, respectively. Here, the inner pinch-off portions 21*d*1, 22*d*1 must be shaped to correspond to the shape of the molded main body 5*a*. On the other hand, the outer pinch-off portions 21*d*2, 22*d*2 are positioned to demarcate the inner burr portion 5*bc*1 and the outer burr portion 5*bc*2. The inner burr portion 5*bc*1 and the outer burr portion 5*bc*2 are both to be cut and are unnecessary for the product. In other words, the outer pinch-off portions 21*d*2, 22*d*2 are not connected to the cavity cvt, and they demarcate the inner burr portion 5*bc*1 and the outer burr portion 5*bc*2, which are unnecessary for the product. Therefore, the outer pinch-off portions 21*d*2, 22*d*2 are not subject to the same restrictions as the inner pinch-off portions 21*d*1, 22*d*1, such as conforming to the shape of the molded main body 5*a*. Therefore, in the embodiment, the shape of the outer pinch-off portions 21*d*2, 22*d*2 can be easily set to a shape that takes into account the connection with the movable portion 23. In other words, the cutting line of the burr portions can be avoided from being distorted, and the burr portions can be restrained from being difficult to cut.

Figure 19:
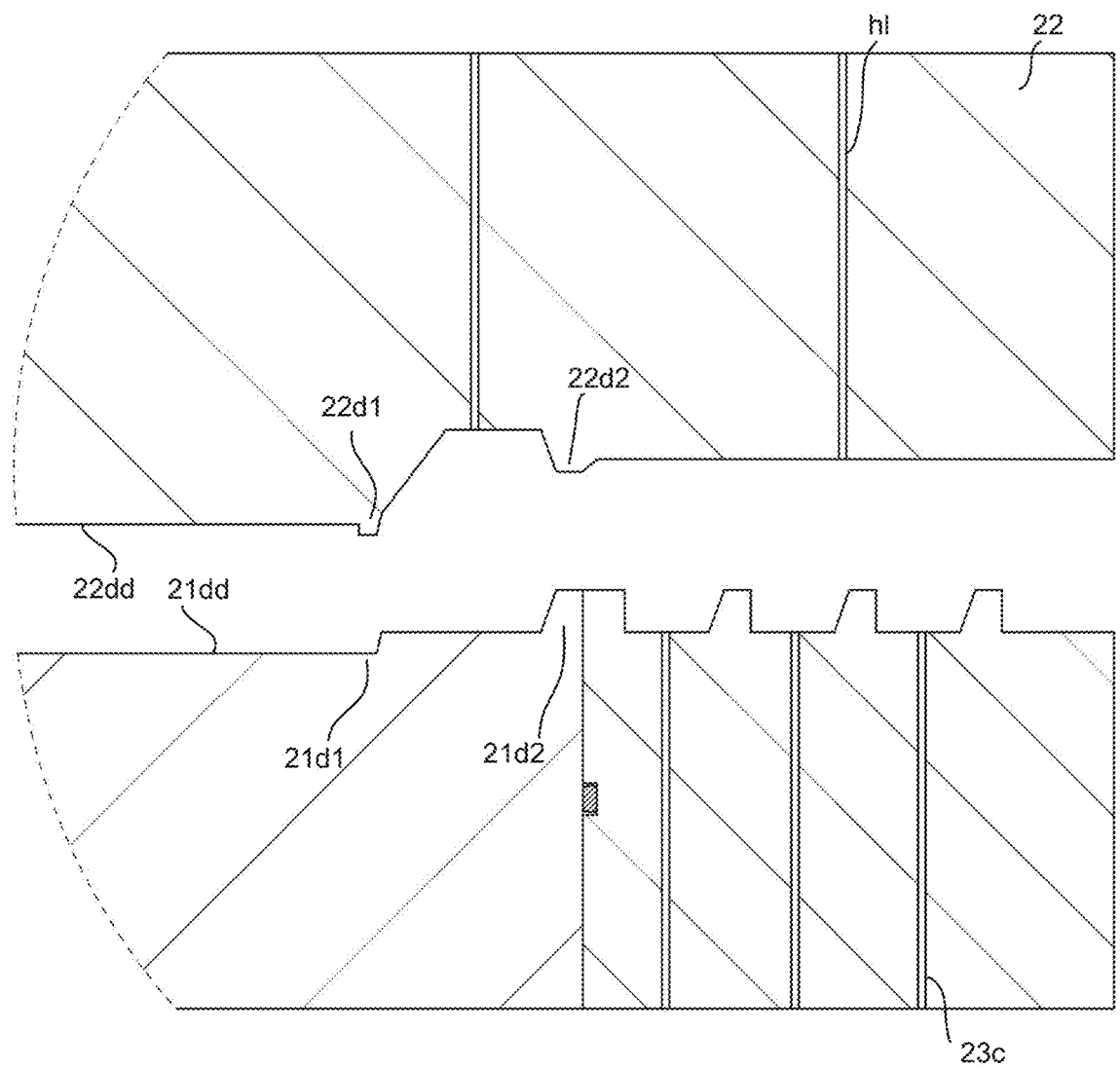
FIG. 19 is a cross-sectional view of the first and second split molds 21, 22 used in manufacturing a resin panel having a hinge in the embodiments of the first and second viewpoints.

In the embodiment, each of the inner pinch-off portions 21*d*1, 22*d*1 is described as having a flat surface at its top portion, but is not limited to this. The inner pinch-off portions 21*d*1, 22*d*1 may extend so that the surfaces of their top portions are uneven (wavy). In describing the shape of such inner pinch-off portions 21*d*1, 22*d*1, a resin panel of a different shape than the resin panel described in the embodiment is used as an example. That is, the resin panel may be, for example, a hinge formed of a resin sheet squashed by a mold between two base bodies 3*a*, 3*b* covered with the resin sheet. Here, the hinge is a thin-walled portion formed of the resin sheets p1, p2 squashed by pinch-off portions 21*dd*, 22*dd* (see FIG. 19) of the first and second split molds 21, 22, and the resin panel can be bent at this hinge. The hinge is formed so that the hinge is closer to one side of the resin panel in the thickness direction. In this form of the resin panel, a parting line in the base bodies 3*a*, 3*b* is formed at the center of the resin panel in the thickness direction, whereas a parting line in the hinge is the hinge itself, which is closer to one side of the resin panel in the thickness direction. In other words, the parting line of the resin panel has a portion having a complicated structure and connecting the base bodies 3*a*, 3*b* and the hinge. In other words, to produce such a resin panel, the pinch-off portions 21*d*, 22*d* of the first and second split molds 21, 22 have a complicated structure. Specifically, as illustrated in FIG. 19, in the cross section of the first and second split molds 21, 22 at a position of the hinge, the inner pinch-off portion 22*d*1 has a projecting portion and the inner pinch-off portion 21*d*1 has a recessed portion.

This embodiment is suitable for resin panels having such a hinge. If a resin panel having the above-described hinge is manufactured with a conventional mold that is not provided with the outer pinch-off portions 21*d*2, 22*d*2, the cutting line of the burr portions at the hinge will be distorted, and mold design will be complicated. In contrast, in the embodiment, the shape of the outer pinch-off portions 21*d*2, 22*d*2 can be determined without being restricted by the shape of the inner pinch-off portions 21*d*1, 22*d*1. Therefore, in the embodiment, the cutting line of the burr portions can be avoided from being distorted, and the burr portions can be prevented from being difficult to cut. In addition, since configurations of the first and second split molds 21, 22 can be avoided from becoming intricate and complicated, it is easier to design the mold.

In the conventional manufacturing method, the movable portion is configured to cut a portion corresponding to a connecting area between the molded main body 5*a* and the inner burr portion 5*bc*1 in the embodiment. In such a manufacturing method, if the portion is not cut completely, the resin sheet may peel off or turn over from the portion when the molded main body is taken out from the mold, resulting in a defective molded main body. Since the embodiment is configured to cut the connecting portion between the inner burr portion 5*bc*1 and the outer burr portion 5*bc*2, even if the outer burr portion 5*bc*2 cannot be completely cut from the inner burr portion 5*bc*1, the location where the peeling or turning over occurs is in the unwanted inner burr portion 5*bc*1. Therefore, the embodiment can avoid the molded main body from becoming defective, and the yield rate can be improved. In addition, as mentioned above, since the embodiment employs the double pinch-off structure, the burr portion itself is less likely to be cut, further increasing the effectiveness of the yield improvement.

A movable portion in conventional manufacturing methods also cuts a skin material. Here, even if a resin sheet can be cut, the skin material may not be cut. In such cases, when a molded main body is removed from a mold, the skin material may peel off from a part of the skin material that could not be cut, resulting in a defective molded main body.

In the embodiment, since the edge of the skin material 4 is inside the outer pinch-off portions 21*d*2, 22*d*2, the movable portion 23 is not configured to cut the skin material 4 itself. Therefore, the embodiment can avoid the molded main body 5a from becoming defective, and the yield rate can be improved.

In the case where the skin material 4 extends to the outer burr portion 5bc2, even if the skin material 4 is not cut by the movable portion 23, the part where peeling occurs is the unnecessary inner burr portion 5bc1. In other words, because the embodiment employs a double pinch-off structure, even if the skin material 4 extends to the outer burr portion 5bc2, the molded main body can avoid becoming defective and the yield rate can be improved.

4 Modifications

4-1 First Modification

Figure 17:
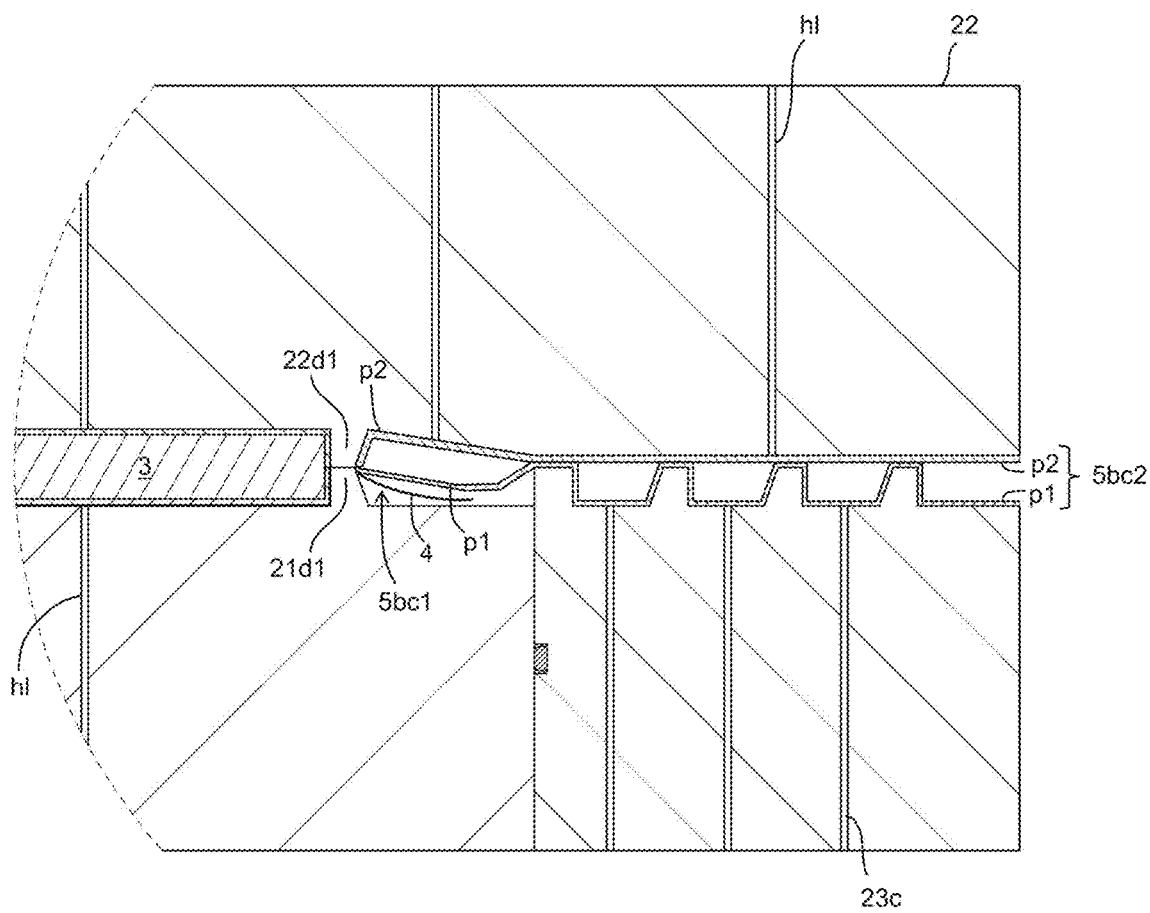
FIG. 17 is an end view of the first and second split molds 21, 22 for a modification of the embodiments of the first and second viewpoints.

As shown in FIG. 17, even if the outer pinch-off portions 21d2, 22d2 described in the embodiment are not provided in the first and second split molds 21, 22, the effect of the decompression suction function of the movable portion 23 described in the embodiments can be obtained. In other words, even in the embodiment shown in FIG. 17, the outer burr portion 5bc2 is more securely engaged with the movable portion 23 and the outer burr portion 5bc2 is more securely cut from the molded main body 5a.

Figure 18:
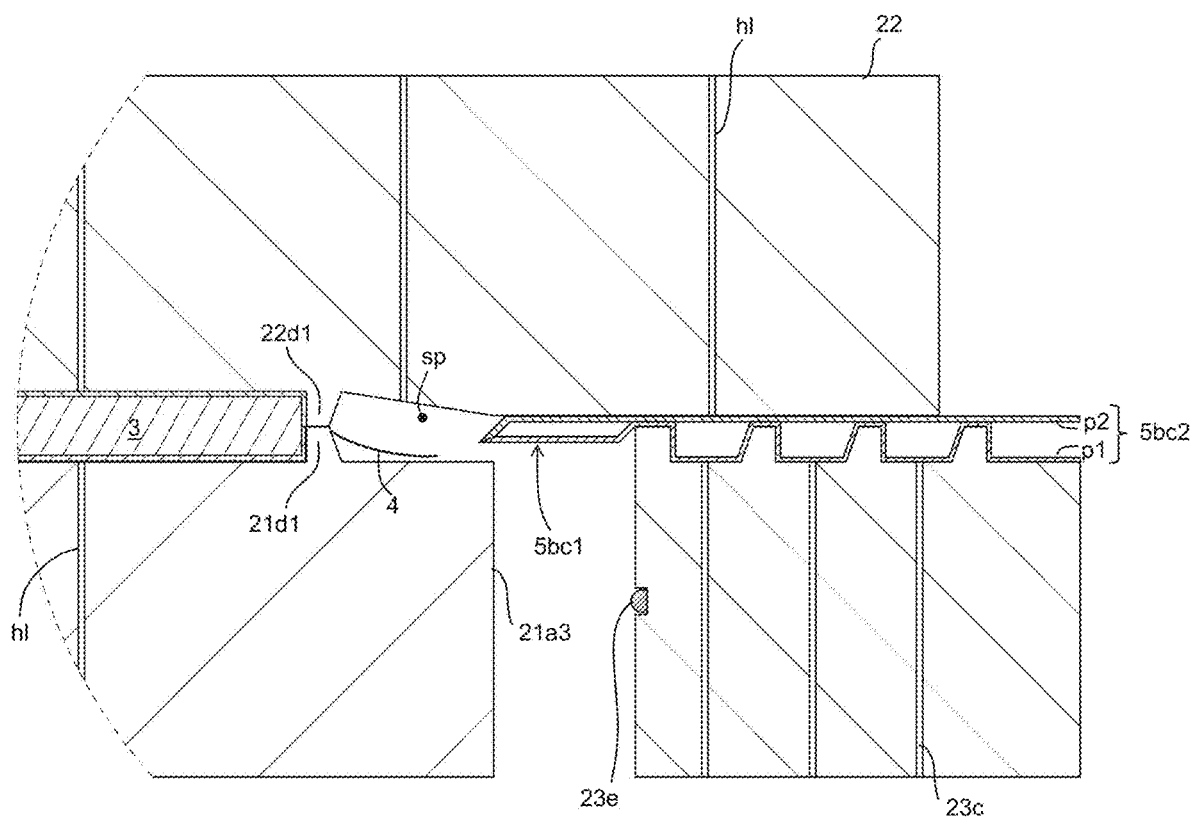
FIG. 18 is an illustration of the operation of the first cutting step in the modification of the embodiments of the first and second viewpoints.

In this First Modification, the outer pinch-off portions 21d2, 22d2 are not provided in the first and second split molds 21, 22, so as shown in FIG. 18, the inner burr portion 5bc1 and the outer burr portion 5bc2 are not cut in the cutting process, and the inner burr portion 5bc1 is cut from the molded main body 5a. At this time, since the decompression suction holes h1 are not formed in the first outer portion 21a2, adhesion of the resin sheet p1 and the skin material 4 is inhibited, and even if the movable portion 23 is driven, the skin material 4 is avoided being cut together with the burr portions. Therefore, when the resin is reused, it is possible to avoid the time and effort required to peel the skin material 4 from joined portions consisting of the cut inner burr portion 5bc1 and the cut outer burr portion 5bc2.

4-2 Second Modification

The first split mold 21 and the movable portion 23 are connected via the drive mechanism 24. Here, if a stroke of the drive mechanism 24 is large, or depending on the structure of the first split mold 21 and the movable portion 23, the movable portion 23 may drop out of the first split mold 21, making it difficult for the movable portion 23 to return to the initial position. For example, if the stroke of the drive mechanism 24 is large, the movable portion 23 loses contact with the first split mold 21 and the movable portion 23 drops out of the first split mold 21.

At this time, since the movable portion 23 is connected to the first split mold 21 via the drive mechanism 24, the movable portion 23 does not fall to the floor. However, when the drive mechanism 24 is driven to return the movable portion 23 to its original initial position, the movable portion 23 may interfere with the side of the first split mold 21, making it impossible to return the movable portion 23 to its initial position. In such a case, for example, the operator will need to move the movable portion 23 to the initial position each time it is dropped out.

In this Second Modification, as illustrated in FIG. 20A and FIG. 20B, the first split mold 21 has a supporting portion 21f and the movable portion 23 has a supported portion 23f. In this regard, in FIG. 20A and FIG. 20B, the drive mechanism 24 is omitted.

The supporting portion 21f is configured to prevent the movable portion 23 from falling out of the first split mold 21. The supporting portion 21f is formed to project from the first split mold 21 in the direction toward the movable portion 23. The supporting portion 21f is connected to a lateral side of the first split mold 21. Specifically, in this modification, the supporting portion 21f is connected to the first outer portion 21a2. When the first split mold 21 and the movable portion 23 are viewed from the front side (viewed from the arrow Ar direction in FIG. 20A), the supporting portion 21f is provided to project toward the movable portion 23 than the end face portion 21a3 of the first split mold 21. In other words, as viewed from the arrow Ar direction in FIG. 20A, the supporting portion 21f is provided to project toward the movable portion 23 than the outermost pinch-off portion (the outer pinch-off portion 21d2) in the width direction. In the thickness direction Dr of the first split mold 21, the supporting portion 21f is located at the rear side of the first split mold 21 rather than at the front side of the first split mold 21. Here, the front side of the first split mold 21 is, for example, the portion where the inner pinch-off portion 21d1, the outer pinch-off portion 21d2, and the inner surface 21b or the like are formed.

The supported portion 23f is configured to be supported by the supporting portion 21f. The supported portion 23f is a recess into which the supporting portion 21f is inserted. As illustrated in FIG. 20C, since the supporting portion 21f is inserted into the supported portion 23f, the supported portion 23f is supported on the top surface of the supporting portion 21f when the movable portion 23 is being driven. This prevents the movable portion 23 from falling out of the first split mold 21.

In this regard, since the movable portion 23 moves in a swinging manner as illustrated in FIG. 10A and FIG. 10B, the size of the supported portion 23f is larger than that of the supporting portion 21f. This avoids interference between the supporting portion 21f and the supported portion 23f when the movable portion 23 moves in the swinging manner, and thus the movable portion 23 moves smoothly.

This Second Modification is also applicable to the First Modification.

Third Viewpoint

1. Resin Panel 1

In the third viewpoint, the structure of the resin panel 1 (an example of a "structure") is the same as that of the resin panel 1 of the first and second viewpoints (see "1. Resin panel 1" of the first and second viewpoints). Therefore, the description thereof is omitted.

2. Manufacturing Method of Resin Panel 1

2-1. Description of the Manufacturing Device

Figure 21:
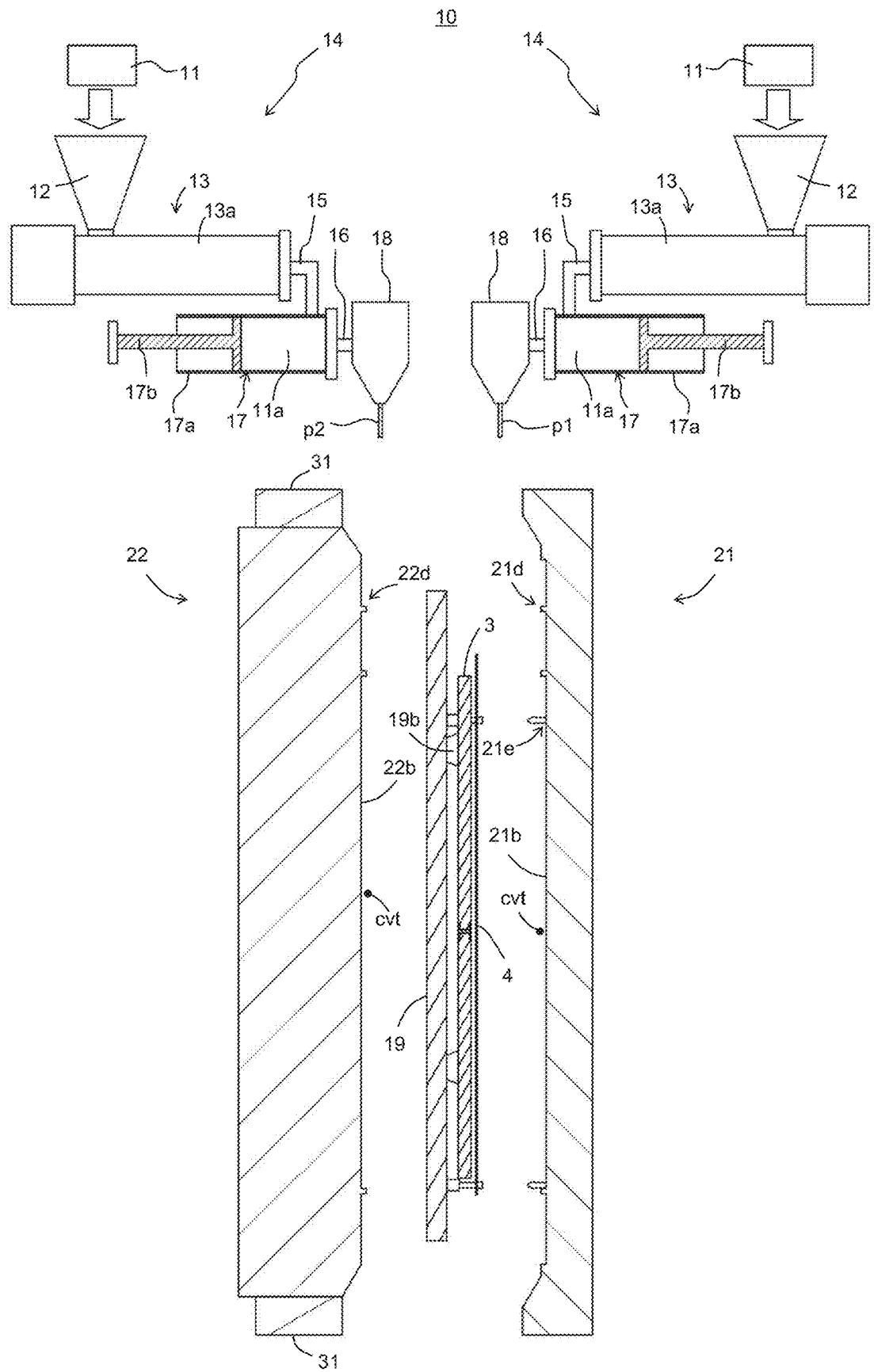
FIG. 21 is a front view of the molding machine 10 of the embodiments of the third viewpoint (the first and second split molds 21, 22, the outer frame 31, and the core member 3, etc. are illustrated in cross section).
Figure 22:
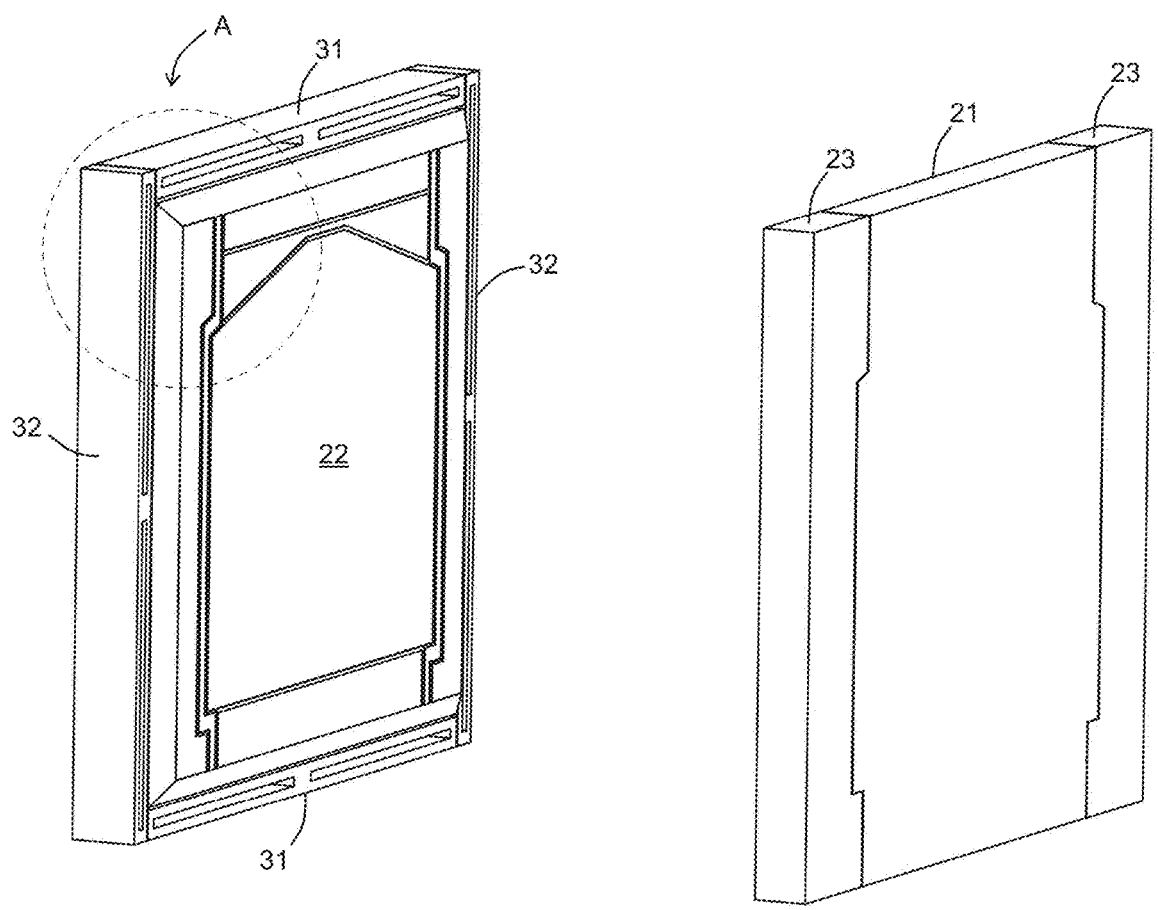
FIG. 22 is a perspective view of the first and second split molds 21, 22 and outer frames 31, 32, showing a state where the first and second split molds 21, 22 open in the embodiments of the third viewpoint.
Figure 25A:
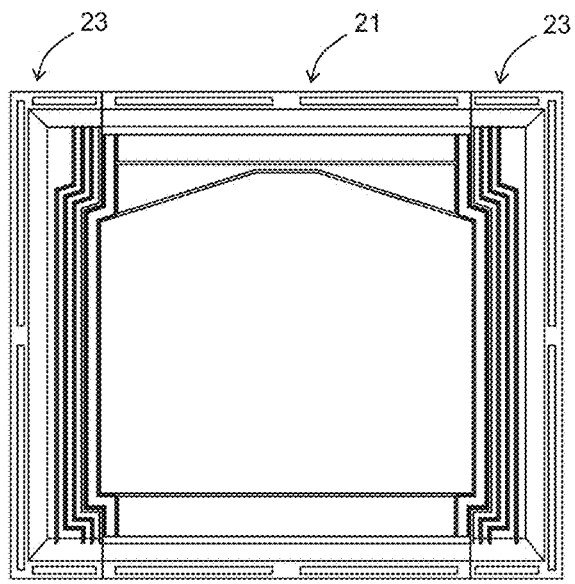
FIGS. 25A to 25C are front views showing the movement of the movable portion 23 when performing a first cutting step of the embodiments of the third viewpoint.
Figure 25B:
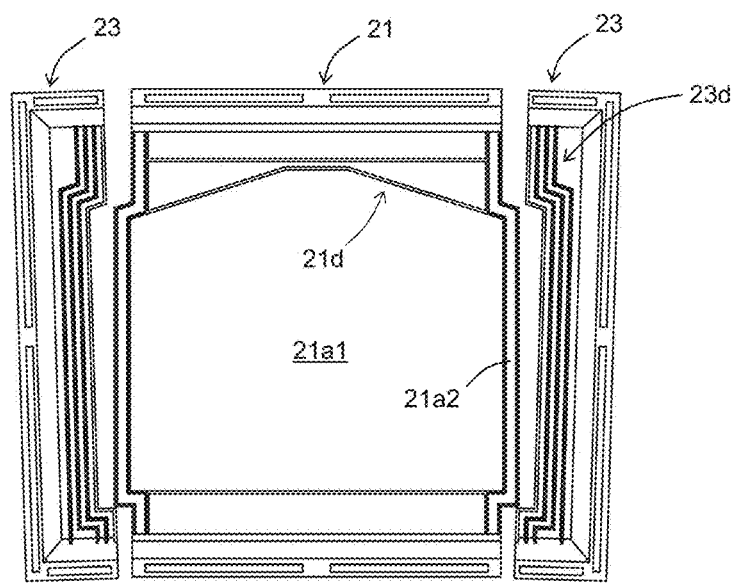
Figure 25C:
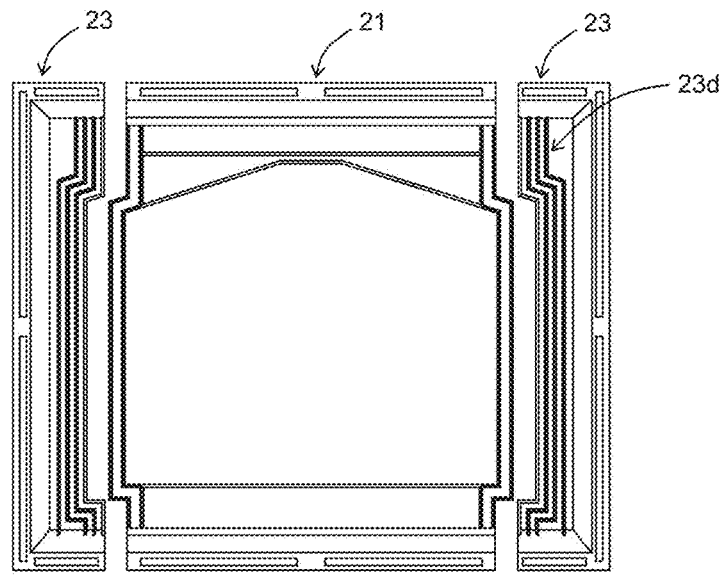

As illustrated in FIG. 21, the manufacturing method of the embodiments uses the molding machine 10 and the insertion apparatus 19 to form the molded body 5 illustrated in FIG. 15. As illustrated in FIG. 21 to FIG. 22, the molding machine 10 is equipped with the pair of the sheet forming devices 14, the mold (i.e. the first and second split molds 21, 22), outer frames 31, 32, and the movable portions 23. In this regard, although not illustrated, the molding machine 10 is also equipped with a drive mechanism (not shown in the figure, refer to the drive mechanism 24 in FIG. 5) that moves the movable portion 23 away from the first split mold 21 as illustrated in FIG. 25A to FIG. 25C. This drive mechanism is capable of moving an upper part of the movable portion 23 and then moving a lower part of the movable portion 23 as illustrated in FIG. 25B and FIG. 25C to smoothly tear off the burr portion (the part of the resin sheet).

2-1-1. Configuration of Sheet Forming Device 14

The sheet forming device 14 and resin used in the embodiment of the third viewpoint illustrated in FIG. 21 are the same as the sheet forming device 14 and the resin used in the embodiments of the first and second viewpoints (see "2-1-1. Configuration of Sheet Forming Device 14" in the first and second viewpoints). Therefore, the explanation is omitted.

2-1-2. Mold (First and Second Split Molds 21, 22) and Outer Frames 31, 32

Figure 26:
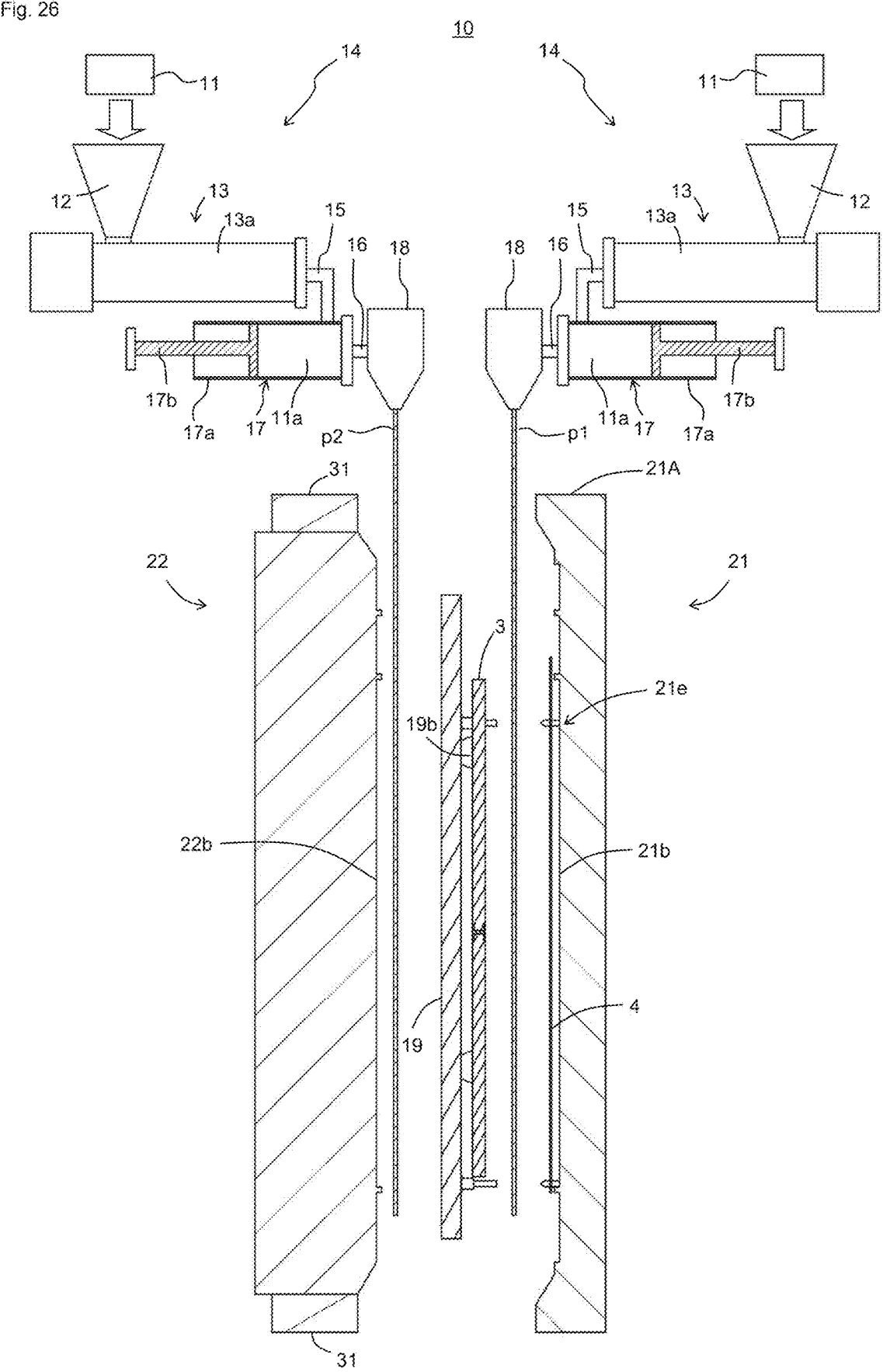
In FIG. 26 and FIG. 27, the first and second split molds 21, 22, etc. are illustrated with end planes cut in a vertical plane passing through upper and lower points P2 of FIG. 24.

As illustrated in FIG. 26, the resin sheets p1, p2 are led between the first and second split molds 21, 22. The first and second split molds 21, 22 can be split at the parting surfaces that are in contact when these molds are closed, and the molded body 5 (see FIG. 15) is formed by the first and second split molds 21, 22. In other words, in the molding step, the molded body 5 is molded using the pair of the first and second split molds 21, 22 that can be split. In the embodiment, the skin material escape space sp (see FIG. 33 and FIG. 34) is formed between the first and second split molds 21, 22. In the molding step, an end of the skin material 4 is placed in the skin material escape space sp.

<First Split Mold 21>

Figure 24:
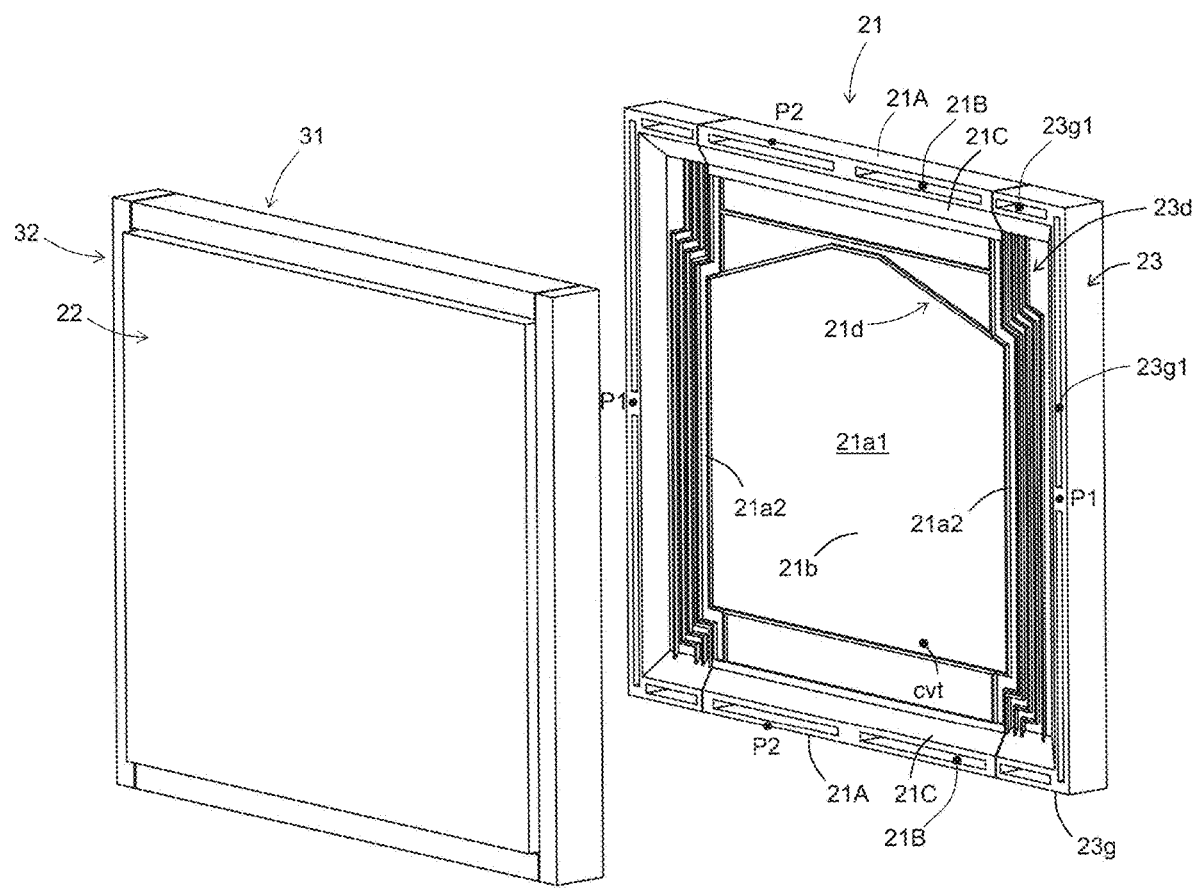
FIG. 24 is a perspective view of the first and second split molds 21, 22 and the outer frames 31, 32, viewed from a different direction than in FIG. 22.

The first split mold 21 has the main body 21a1, the pair of the first outer portions 21a2, and the end face portion 21a3 (see FIG. 34), as illustrated in FIG. 24. The main body 21a1 has the cavity cvt. When the first and second split molds 21, 22 are closed, the cavity cvt is a closed space formed between the first and second split molds 21, 22, and is a space in which a molded body is formed. The first outer portion 21a2 is connected to the ends (left and right ends) of the main body 21a1 in the lateral width direction. In this regard, the lateral width direction is perpendicular to the opening and closing direction of the first and second split molds 21, 22 and perpendicular to the vertical direction. The end face portion 21a3 has a surface against which the movable portion 23 is butted. In the embodiment, the end face portion 21a3 is formed on each side surface of the first outer portion 21a2.

The first split mold 21 is provided with a large number of decompression suction holes h1 (see FIG. 29), and the resin sheet p1 can be suctioned under reduced pressure to be formed into a shape along an inner surface 21b of the first split mold 21. In this regard, the inner surface 21b faces the cavity cvt as illustrated in FIG. 24.

As illustrated in FIG. 24, the first split mold 21 includes the pinch-off portion 21d, which surrounds the cavity cvt. The pinch-off portion 21d is a protrusion formed to project from the first split mold 21 side to the second split mold 22 side. As illustrated in FIG. 29, the pinch-off portion 21d has the inner pinch-off portion 21d1 and the outer pinch-off portion 21d2. The inner pinch-off portion 21d1 and the outer pinch-off portion 21d2 are formed on the first outer portion 21a2.

The inner pinch-off portion 21d1 is provided so as to face the cavity cvt. The inner pinch-off portion 21d1 is formed in a shape corresponding to the shape of the resin panel 1. Specifically, in the embodiment, the inner pinch-off portion 21d1 has a flat surface on the top face. In the embodiment, the inner pinch-off portion 21d1 extends in a line having straight lines connected with each other at bent points.

The outer pinch-off portion 21d2 is located further away from the cavity cvt than the inner pinch-off portion 21d1. The outer pinch-off portion 21d2 is shaped to match the shape of the movable portion 23. Specifically, the outer pinch-off portion 21d2 is formed to match the shape of the engaging portion 23d (see FIG. 24 to FIG. 25C) of the movable portion 23 that is closest to the first split mold 21 (hereinafter referred to as the closest engaging portion 23d), which will be described later. The outer pinch-off portion 21d2 is also formed to coincide with the closest engaging portion 23d when the first split mold 21 and the movable portion 23 are viewed in plan view. This avoids distorting a cutting line of a burr portion and prevents the burr portion from being difficult to cut.

As illustrated in FIG. 24, the first split mold 21 has a pair of suction parts 21A. The suction part 21A is provided at each of the top and bottom of the first split mold 21, respectively. The upper and lower suction parts 21A are connected to the upper and lower ends of the main body 21a1, respectively. The suction parts 21A are formed so that the suction parts 21A project from the first split mold 21 side toward the second split mold 22 side. As a result, when the first split mold 21 moves forward, the suction part 21A contacts the resin sheet p1 prior to the pinch-off portion 21d. Suction holes 21B are formed in the front edge portion of the suction part 21A, and the suction part 21A can suck the resin sheet p1 by sucking air through the suction holes 21B. As illustrated in FIG. 24, a slope surface 21C is formed on the suction part 21A, so that the resin sheet p1 can easily follow the surface of the first split mold 21 when the resin sheet p1 is shaped along the first split mold 21.

The first split mold 21 includes a male projection 21e, as illustrated in FIG. 21. The male projection 21e is provided at a position facing a female projection 19c of the insertion apparatus 19 which is described later. The male projection 21e can be slid with respect to the first split mold 21 to be accommodated in a hole (not shown in the figure) in the first split mold 21.

<Second Split Mold 22>

Figure 23:
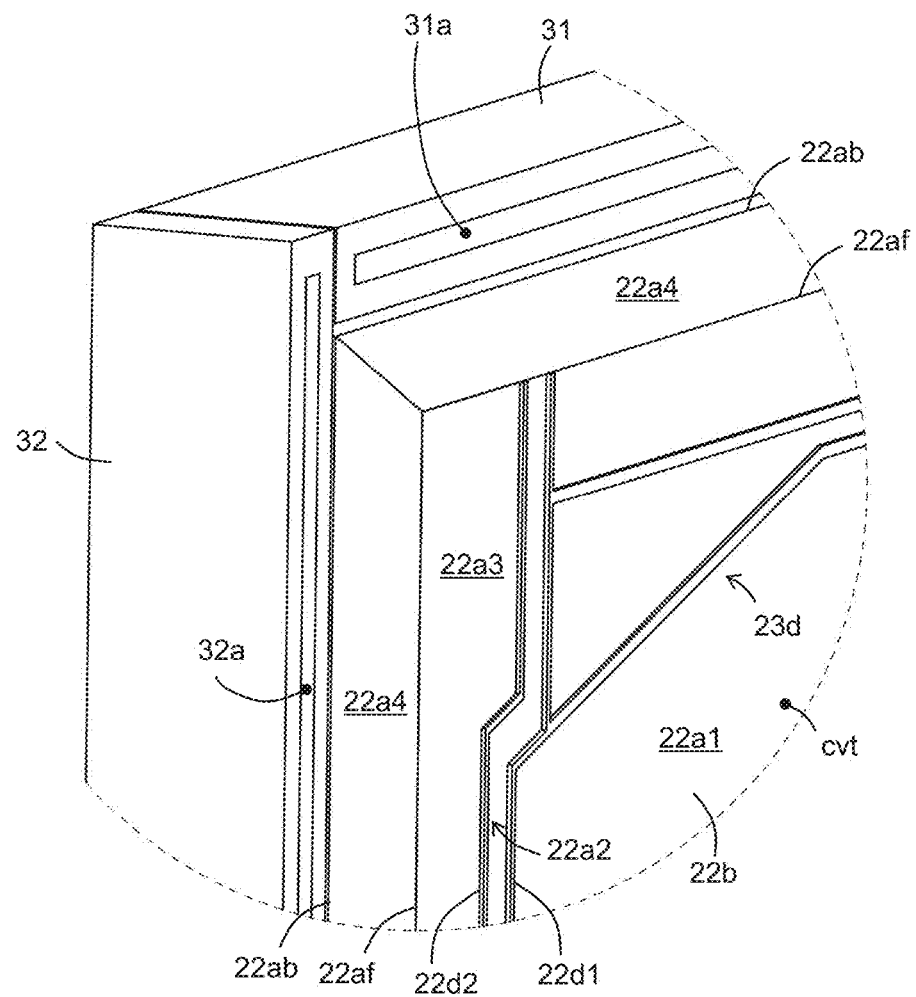
FIG. 23 is an enlarged view of area A of FIG. 22.

The second split mold 22 has the main body 22a1, the pair of the second outer portions 22a2, the pair of the opposing portions 22a3, and four chamfer portions 22a4, as illustrated in FIG. 22 and FIG. 23. The main body 22a1 has the cavity cvt. The second outer portion 22a2 is connected to ends (i.e. left and right ends) of the main body 22a1 in the lateral width direction. Each opposing portion 22a3 is connected to end of each second outer portion 22a2 in the lateral width direction. The opposing portion 22a3 is positioned to oppose the engaging portion 23d of the movable portion 23. Each opposing portion 22a3 has a flat surface and is connected to top and bottom chamfer portions 22a4 and one of left and right chamfer portions 22a4.

The chamfer portion 22a4 is formed on a periphery of the second split mold 22. In the embodiment, the second split mold 22 is square in plan view, and correspondingly, the chamfer portions 22a4 are provided on each of four sides of the second split mold 22. Each chamfer portion 22a4 has a front edge portion 22af and a rear edge portion 22ab. The front edge portion 22af is the portion of the chamfer portion 22a4 closest to the first split mold 21 in the opening and closing direction of the mold. The rear edge portion 22ab is the portion of the chamfer portion 22a4 that is farthest from the first split mold 21 in the opening and closing direction of the mold.

The left and right chamfer portions 22a4 are located between the outer frame 32 and the pinch-off portion (outer pinch-off portion 22d2). When looking at the left and right chamfer portions 22a4 when the resin sheet p2 is hanging, the distance between the left and right chamfer portions 22a4 and the hanging resin sheet p2 increases as the position advances from the outer pinch-off portion 22d2 to the outer frame 32. In the embodiment, each chamfer portion 22a4 is configured as a tapered surface (a slope surface). Specifically, the tapered surface (the slope surface) of the chamfer portion 22a4 is formed from the front edge portion 22af to the rear edge portion 22ab. In this regard, no suction holes for suctioning the resin sheet p2 are formed in the chamfer portion 22a4.

As illustrated in FIG. 29, a slope angle θ of the tapered surface of the chamfer portion 22a4 is preferably greater than 0 degrees and equal to or less than 60 degrees. Specifically, for example, the slope angle θ (degrees) is 5, 10, 15, 20, 25, 30, 35, 40, 45, 50, 55, or 60. The slope angle θ can also be defined within a range between any two of the values exemplified here (e.g., within a range from 5 degrees to 60 degrees).

As illustrated in FIG. 29, a width w1 of the chamfer portion 22a4 in the opening and closing direction of the mold is within a range from 10 mm to 63 mm, preferably. Specifically, for example, the width w1 (mm) is 10, 15, 20, 25, 30, 35, 40, 45, 50, 55, 60, or 63, and can also be defined within a range between any two of the values exemplified here.

As illustrated in FIG. 29, a width w2 of the chamfer portion 22a4 in the direction from the pinch-off portion 22d to the outer frame 31, 32 is within a range from 5.7 mm to 70 mm, preferably. More preferably, the width w2 is within a range from 12 mm to 40 mm. Specifically, for example, the width w2 (mm) is 5.7, 6, 8, 10, 12, 14, 16, 18, 20, 22, 24, 26, 28, 30, 32, 34, 36, 38, 40, 42, 44, 46, 48, 50, 52, 54, 56, 58, 60, 62, 64, 66, 68, or 70, and can also be defined within a range between any two of the values exemplified here.

In the embodiment, the second split mold 22 has a total of four chamfer portions 22a4 (the upper and lower chamfer portions 22a4 and the left and right chamfer portions 22a4). The configurations of these chamfer portions 22a4 (slope angle θ, width w1, and width w2) may be the same or different from each other as long as they satisfy the numerical values or the numerical ranges described above. For example, the configurations of the upper and lower chamfer portions 22a4 are the same as each other and the configurations of the left and right chamfer portions 22a4 are the same as each other, but the configuration of the upper and lower chamfer portions 22a4 may be different from the configuration of the left and right chamfer portions 22a4.

The second split mold 22 is provided with the large number of decompression suction holes h1 (see FIG. 29), and the resin sheet p2 can be suctioned under reduced pressure to be formed into the shape along the inner surface 22b of the second split mold 22. In this regard, the inner surface 22b faces the cavity cvt.

The second split mold 22 includes the pinch-off portion 22d, and the pinch-off portion 22d surrounds the cavity cvt. The pinch-off portion 22d is the projection formed to protrude from the side of the second split mold 22 to the side of the first split mold 21. The pinch-off portion 22d has the inner pinch-off portion 22d1 and the outer pinch-off portion 22d2. The inner pinch-off portion 22d1 and the outer pinch-off portion 22d2 are formed in the second outer portion 22a2.

The inner pinch-off portion 22d1 and the outer pinch-off portion 22d2 are similar to the inner pinch-off portion 21d1 and the outer pinch-off portion 21d2, respectively. The inner pinch-off portion 22d1 faces the cavity cvt. The inner pinch-off portion 22d1 is formed in the shape corresponding to the shape of the resin panel 1. Specifically, the inner pinch-off portion 22d1 has a top portion, and a surface of the top portion is flat. The inner pinch-off portion 22d1 extends in a line having straight lines connected with each other at bent points.

The outer pinch-off portion 22d2 is located further away from the cavity cvt than the inner pinch-off portion 22d1. The outer pinch-off portion 22d2 is shaped to match the shape of the movable portion 23.

<Outer Frames 31, 32>

As illustrated in FIG. 22 and FIG. 23, the outer frames 31, 32 are arranged around the second split mold 22. Specifically, the outer frame 31 is provided at the top and bottom of the second split mold 22, respectively, and the outer frame 32 is provided at the left and right sides of the second split mold 22, respectively. The outer frames 31, 32 are configured to be movable parallel to the opening and closing direction of the mold. In other words, the outer frames 31, 32 are configured to move forward and backward in the mold opening and closing direction. Suction holes 31a, 32a are formed on the front end faces of the outer frames 31, 32, respectively, and the outer frames 31, 32 can suction the resin sheet p2 by sucking air through the suction holes 31a, 32a.

The outer frames 31, 32 move forward to suck the resin sheet p2, but then, in the embodiment, the outer frames 31, 32 move backward. By moving backward, the resin sheet p2 is properly shaped along the second split mold 22, and the interference of the outer frames 31, 32 with the first split mold 21 and the movable portion 23 is avoided when the first and second split molds 21, 22 are closed.

Here, as illustrated in FIG. 29, the outer frame 32 is moved back to the rear edge portion 22ab of the chamfer portion 22a4. The same is applied to the outer frame 31. A backward distance w3 of the outer frames 31, 32 is within a range from 30 mm to 80 mm. The backward distance w3 (mm) of the outer frames 31, 32 is specifically 30, 35, 40, 45, 50, 55, 60, 65, 70, 75, or 80, for example, and may also be defined within a range between any two of the numerical values exemplified herein.

Figure 33:
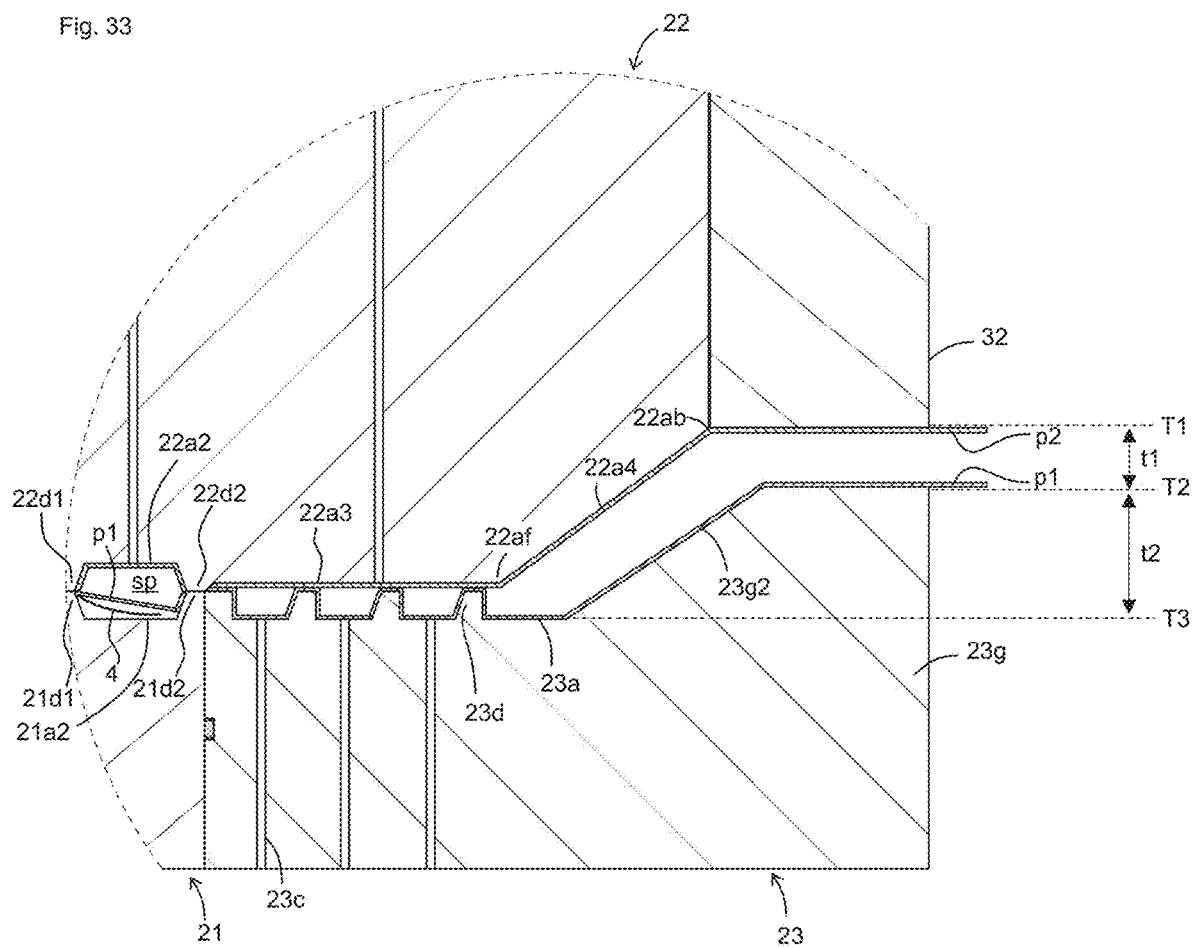

As illustrated in FIG. 33, when the outer frame 32 and a suction part 23g are closest to each other (at the completion in the molding step), a distance t1 between the front edge surface of the outer frame 32 and a front edge surface of the suction part 23g is preferably 5 mm or more. The distance t1 (mm) is specifically 5, 6, 7, 8, 9, 10, 11, 12, 13, 14, or 15, for example, and may also be defined within a range between any two of the values exemplified herein. In this regard, the same applies to the outer frame 31 and the suction part 21A. In other words, the distance between the front edge surface of the outer frame 31 and the front edge surface of the suction part 21A may be defined in the same manner as the distance t1 described above.

<Skin Material Escape Space sp>

Figure 34:
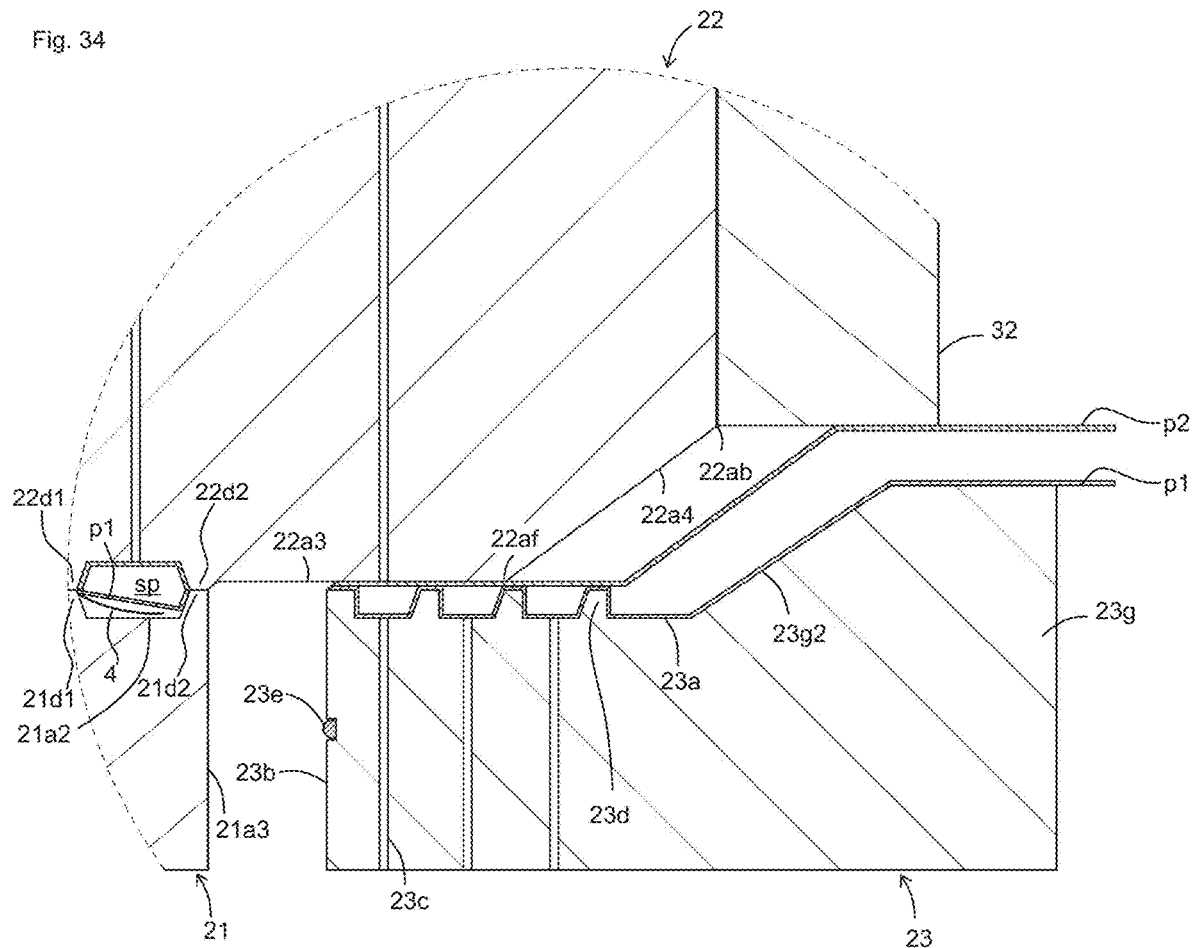

A skin material escape space sp illustrated in FIG. 33 and FIG. 34 of the embodiments of the third viewpoint is the same as the skin material escape space sp described in embodiments of the first and second viewpoints (see "<Skin material escape space sp>" in the first and second viewpoints), and therefore, the description is omitted.

2-1-3. Configuration of Movable Portion 23

The movable portion 23 has the function of engaging the burr portion and cutting the burr portion. The movable portion 23 is movable relative to the first split mold 21, as illustrated in FIG. 25A to FIG. 25c. The movable portion 23 is provided on the lateral side of the first outer portion 21a2 of the first split mold 21, as illustrated in FIG. 25B. The movable portion 23 has the opposing surface portion 23a, the butting surface portion 23b, the suction part 23c, the engaging portion 23d, the sealing member 23e, and the suction part 23g, as illustrated in FIG. 34.

The opposing surface portion 23a is provided to oppose the opposing portion 22a3 of the second split mold 22. The plurality of the engaging portions 23d are formed on the opposing surface portion 23a.

The butting surface portion 23b is formed to be able to butt against the end face portion 21a3 of the first split mold 21. The butting surface portion 23b is formed along the end face portion 21a3. Therefore, when reduced pressure is generated by sucking air through the decompression suction hole h1 with the butting surface portion 23b butting against the end face portion 21a3, it is possible to prevent air from flowing from the gap between the butting surface portion 23b and the end face portion 21a3 into space where resin is to be shaped. The sealing member 23e is also attached to the butting surface portion 23b. Specifically, the groove is formed in the butting surface portion 23b, and the sealing member 23e is attached within the groove. This effectively prevents air from flowing from between the butting surface portion 23b and the end face portion 21a3 into space where the resin is to be shaped. In this regard, the space where the resin is to be shaped is, for example, the cavity cvt, the gap between the burr portion and the surface of the engaging portion 23d, and the like.

The suction part 23c is the hole formed in the opposing surface portion 23a and opens to the area where engaging portion 23d is formed. When reduced pressure is generated by sucking air through the suction part 23c, the burr portion (the outer burr portion 5bc2) is shaped along the engaging portion 23d. This allows the burr portion (the outer burr portion 5bc2) to more securely hook onto the movable portion 23 and prevents the burr portion from sliding against the movable portion 23 when the movable portion 23 is moved. As a result, in the embodiment, when the movable portion 23 is moved, the burr portion follows the movable portion 23 properly and the burr portion can be cut more reliably.

The engaging portion 23d has the function for engaging with the burr portion. The engaging portion 23d is the protrusion formed to project toward the second split mold 22. Since the plurality of the engaging portions 23d are formed on the opposing surface portion 23a, the opposing surface portion 23a has the uneven shape in the region where the engaging portions 23d are formed. In this regard, the embodiment is described as if the suction part 23c is open in the opposing surface portion 23a in the area between two adjacent engaging portions 23d, but is not limited to this. The suction part 23c may be open on the surface of the engaging portion 23d.

The suction part 23g is provided on an end side of the movable portion 23 in a movable direction (a direction in which the movable portion 23 moves from a state in FIG. 25A to a state in FIG. 25C). The suction part 23g is formed to project from the movable portion 23 side toward the outer frame 32 side. As a result, when the movable portion 23 moves forward together with the first split mold 21, the front edge portion of the suction part 23g contacts the resin sheet p1 prior to the engaging portion 23d. In this regard, in the embodiment, the position of the front edge portion of the suction part 23g coincides with the position of the front edge portion of the suction part 21A of the first split mold 21. Suction holes 23g1 are formed in the front edge portion of the suction part 23g, and the suction part 23g is capable of sucking the resin sheet p1 by sucking air through the suction holes 23g1. As illustrated in FIG. 29, the suction part 23g has a slope surface 23g2, which facilitates the resin sheet p1 to follow the surface of the movable part 23 when the resin sheet p1 is shaped along the movable part 23. The slope surface 23g2 is connected to the opposing surface portion 23a.

As illustrated in FIG. 33, a projection amount t2 of the suction part 23g (a distance between the position of the front edge portion of the suction part 23g and the position of the opposing surface portion 23a in the opening and closing direction of the mold) is preferably 15 mm or more. The projection amount t2 (mm) is specifically 15, 16, 17, 18, 19, 20, 21, 22, 23, 24, 25, 26, 27, 28, 29, of 30, for example, and may also be defined within a range between any two of the values exemplified herein.

2-1-4. Insertion Apparatus 19

The configuration of the insertion apparatus 19 in the third viewpoint is the same as that of the insertion apparatus 19 in the first and second viewpoints, so its description is omitted.

2-2. Molded Body 5

The molded body 5 of the embodiments in the third viewpoint is similar to the molded body 5 of the embodiments in the first and second viewpoints (see "2-2. Molded Body 5" of the first and second viewpoints), so its description is omitted.

2-3. Explanation of Each Step of the Manufacturing Method

The manufacturing method of the resin panel 1 of this embodiment includes the skin material attachment step, the hanging step, a suction step, a shaping step, the core member welding step, a molding step, the first cutting step, the molded body removal step, the second cutting step, and the post process.

2-3-1. Skin Material Attachment Step

In the skin material attachment step, the female projection 19c is inserted in advance into the through hole formed in the skin material 4, and the skin material 4 is held in the insertion apparatus 19, as illustrated in FIG. 21. Since this step is the same as the "2-3-1. Skin Material Attachment Step" in the first and second viewpoints, the explanation is omitted hereafter.

2-3-2. Hanging Step

In the hanging step, the resin sheets p1, p2 extruded from the T-die 18 are hung between the first and second split molds 21, 22, as illustrated in FIG. 26. Since this step is the same as the "2-3-2. Hanging Step" in the first and second viewpoints, the explanation is omitted hereafter.

2-3-3. Suction Step

Figure 27:
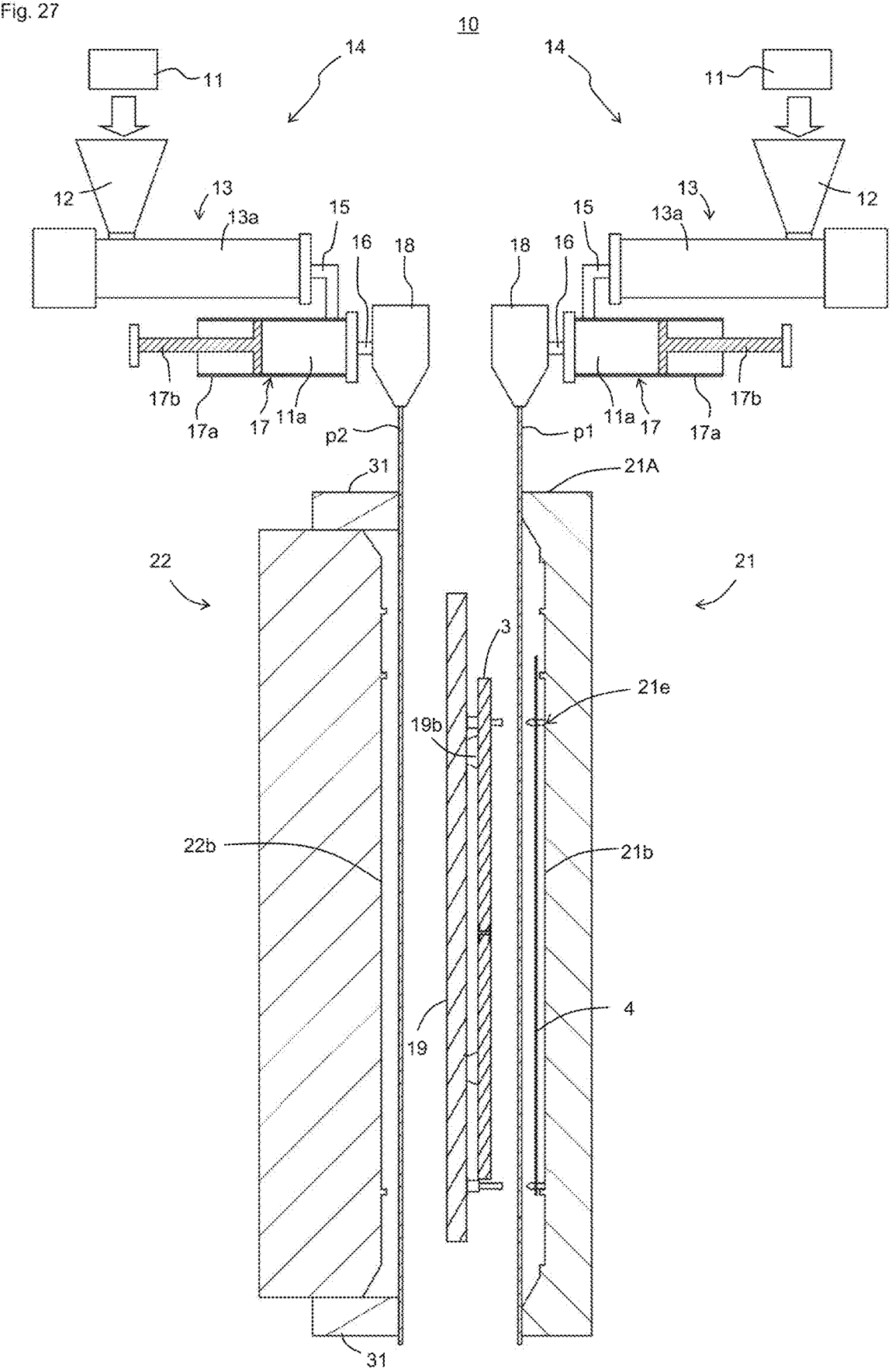
Figure 28:
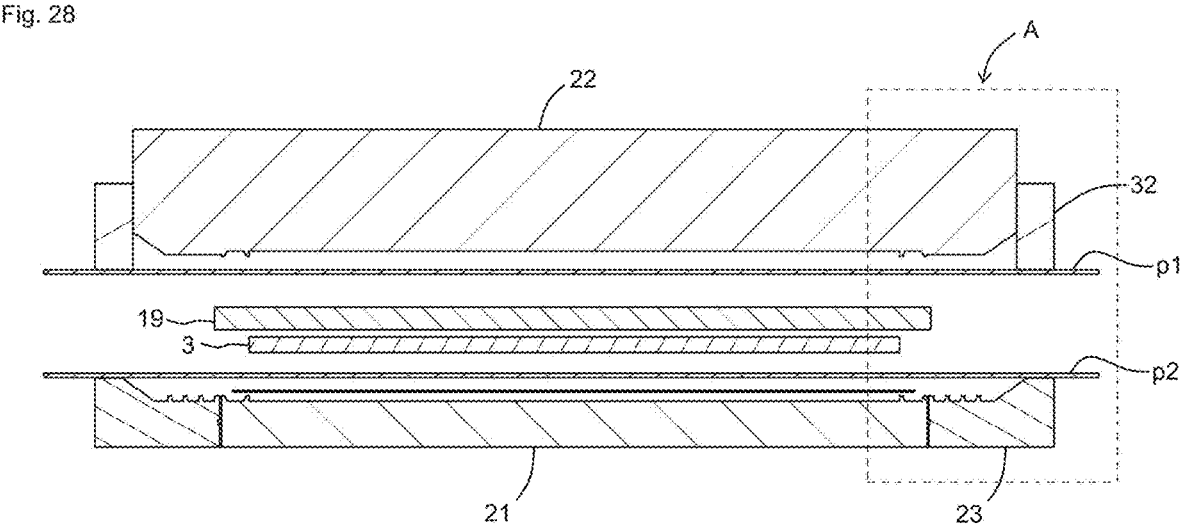
Figure 32:
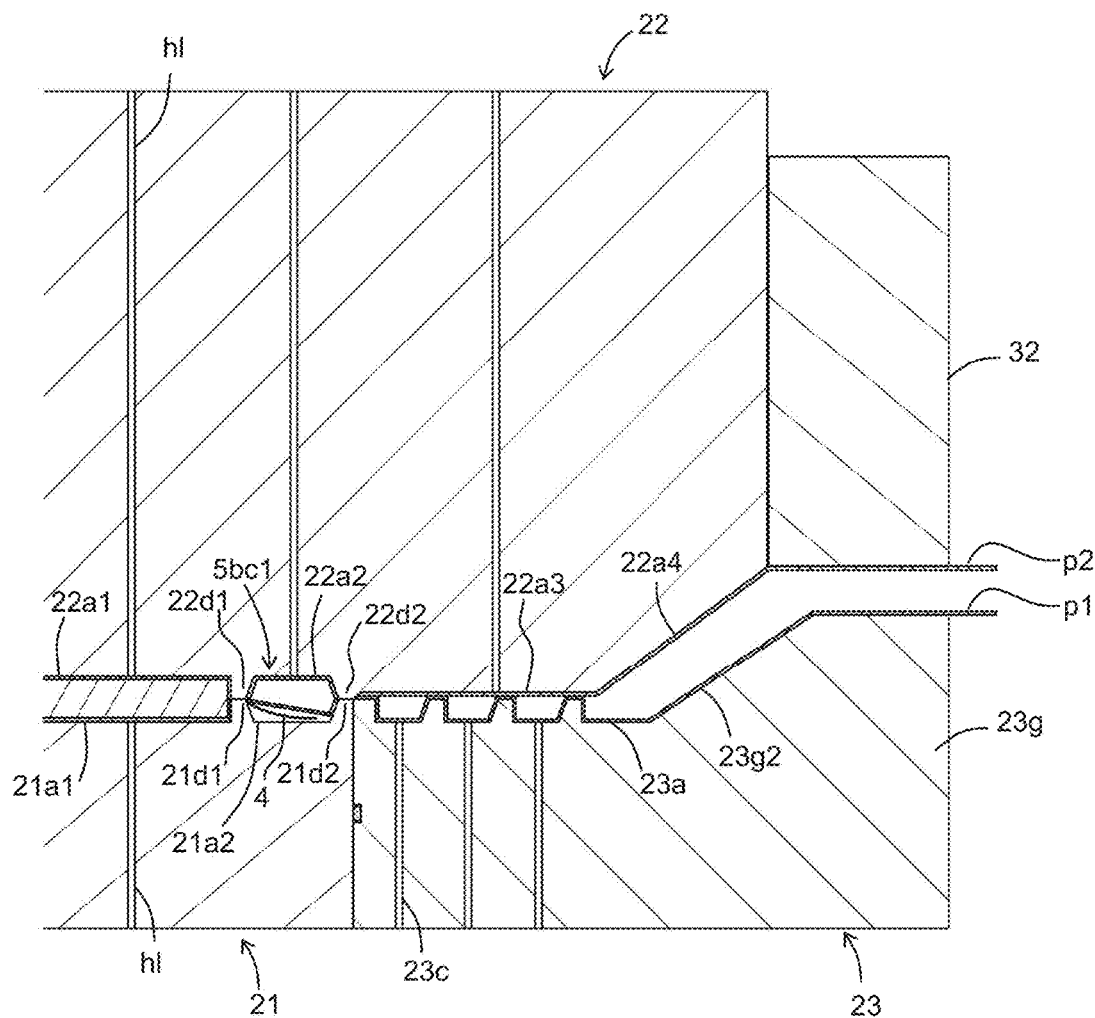

In the suction step, as illustrated in FIG. 27 to FIG. 29, the first split mold 21 and the movable portion 23 move forward together and the suction part 23g contacts the resin sheet p1. The resin sheet p1 is then sucked onto the front edge portion of the suction part 23g by the suction action of the suction holes 23g1 of the suction part 23g. In this regard, since the first split mold 21 is also moving forward in the same manner, the upper and lower suction parts 21A also contact the resin sheet p1, as illustrated in FIG. 27. The resin sheet p1 is then sucked onto the front edge portion of the suction part 21A by the suction action of the suction holes 21B of the suction part 21A. As a result, a closed space SD1 is formed between the resin sheet p1, the first split mold 21 and the movable portion 23, as illustrated in FIG. 29.

As illustrated in FIG. 27 to FIG. 29, the outer frame 32 moves forward and the outer frame 32 contacts the resin sheet p2. The resin sheet p2 is then sucked onto the front end surface of the outer frame 32 by the suction action of the suction holes 32a in the outer frame 32. As illustrated in FIG. 27, the outer frame 31 moves forward in the same manner. The resin sheet p2 is sucked onto the front end face of the outer frame 31 by the suction action of the suction holes 31*a* of the outer frame 31. As a result, a closed space SD2 is formed between the resin sheet p2, the second split mold 22 and the outer frames 31, 32, as illustrated in FIG. 29.

2-3-4. Shaping Step

As illustrated in FIG. 30, in the shaping step, air in the closed spaces SD1, SD2 is suctioned through the decompression suction holes h1 of the first and second split molds 21, 22 and the suction part 23*c* of the movable portion 23 to generate a reduced pressure, and the resin sheets p1, p2 are shaped along the first and second split molds 21, 22 and the movable portion 23. In the shaping step, the outer frames 31, 32, which has been advanced in the suction step, are moved backward. Specifically, the outer frames 31, 32 are moved backward so that the front edge portion of the outer frames 31, 32 matches a position of the rear edge portion 22*ab* of the chamfer portion 22*a*4.

As the outer frames 31, 32 move backward, the resin sheet p2 is shaped into a shape along the surface of the second split mold 22. Here, since the second split mold 22 has the chamfer portion 22*a*4, when the resin sheet p2 moves with the outer frames 31, 32, the resin sheet p2 is smoothly placed along the chamfer portion 22*a*4. This prevents the resin sheet p2 from peeling off from the second split mold 22 and the outer frames 31, 32, thereby avoiding molding defects.

For example, if the second split mold 22 does not have the chamfer portions 22*a*4 and instead has right-angled corners, when the outer frames 31, 32 move backward from the position of these corners, the resin sheet p1 will be extended so that the resin sheet p2 will bend at a right angle starting from these corners. However, depending on physical properties of the resin sheet p2, the resin sheet p2 may not follow the retracting movement of the outer frames 31, 32 well, and the resin sheet p2 may separate (peel off) from the outer frames 31, 32 and the second split mold 22 at these corners and its surrounding portions. In other words, the resin sheet p2 is forcibly stretched at the corners mentioned above, and the resin sheet p2 cannot follow the retracting movement of the outer frames 31, 32 well, causing the resin sheet p2 to peel off from the outer frames 31, 32 and the second split mold 22. In such a case, the resin sheet p2 is not properly shaped with reduced pressure, leading to leakage of the closed space SD2.

However, in the embodiment, the second split mold 22 has the chamfer portion 22*a*4, so when the outer frames 31, 32 are moved backward and the resin sheet p1 moves with the outer frames 31, 32, the resin sheet p1 follows along the chamfer portion 22*a*4, and peeling of the resin sheet p1 from the second split mold 22 is avoided. In this regard, a method of improving the tracking of the resin sheet p1 by slowing down the retracting speed of the outer frames 31, 32 could be considered, but such a method has the disadvantage that it not only increases the molding time of the molded body 5, but also creates restrictions on the manufacturing conditions in the other steps. However, in the manufacturing method of the embodiment, there is no need to slow down the retracting speed of the outer frames 31, 32, which avoids lengthening the time to mold the molded body 5, and also avoids creating restrictions on the manufacturing conditions.

In this regard, the timing of starting the suction to generate the reduced pressure and the timing of starting the moving the outer frames 31, 32 backward may be simultaneous or may be different from each other.

The resin sheets p1, p2 may be shaped at different times, for example, the resin sheet p2 may be shaped after the core member welding step, or the resin sheet p2 may be shaped in the mold clamping step. The suction part 23*c* may become reduced pressure after the molding step described below.

2-3-5. Core Member Welding Step

As illustrated in FIG. 30 and FIG. 31, the insertion apparatus 19 has the skin material 4 attached to the first split mold 21, so the core member 3 is left in the insertion apparatus 19. In this state, the core member 3 can be welded to the resin sheet p1 by moving the insertion apparatus 19 toward the resin sheet p1. Since this step is similar to the "2-3-4. Core Member Welding Step" of the first and second viewpoints, the description is omitted hereafter.

2-3-6 Molding Step

In the molding step, the first and second split molds 21, 22 are closed. As a result, the resin sheets p1, p2 are squashed and welded together at the portions corresponding to the pinch-off portion 21*d* and the pinch-off portion 22*d* to form the molded body 5 illustrated in FIG. 15.

In this regard, in the state where the molding step is completed, at least a part of the movable portion 23 (the suction portion 23*g* in the embodiment) is positioned closer to the outer frame 32 than the position of the front edge portion 22*af* of the chamfer portion 22*a*4. The same is true for the suction part 21A, which is omitted in the figure, and the suction part 21A is positioned closer to the outer frame 31 than the position of the front edge portion 22*af* of the chamfer portion 22*a*4. Since the outer frames 31, 32 are appropriately moved backward during the shaping step, contact between the members is avoided.

2-3-8. First Cutting Step, Molded Body Removal Step, Second Cutting Step, and Post Process These steps are the same as "2-3-7. First cutting step" through "2-3-10. Post Process" in the first and second viewpoints, so the description is omitted.

3. Other Embodiments

The chamfer portion 22*a*4 is not limited to a tapered surface. The chamfer portion 22*a*4 can be shaped so that the distance between the chamfer portion 22*a*4 and the resin sheet P2 widens in the direction from the outer pinch-off portion 22*d*2 to the outer frame 32. For example, the chamfer portion 22*a*4 may include a plurality of tapered surfaces (a plurality of slope surfaces) with different slope angles.

In the embodiment, the tapered surface of the chamfer portion 22*a*4 is formed in a flat shape, but it may be formed in a curved shape, or the flat and curved surfaces may be combined.

If the distance between the chamfer portion 22*a*4 and the resin sheet p2 widens in the direction from the outer pinch-off portion 22*d*2 to the outer frame 32, the chamfer portion 22*a*4 may have one or more stepped portions (portions formed in the form of steps).

In the embodiment, the second split mold 22 is described as having four chamfer portions 22*a*4, but it is not limited to this. For example, the second split mold 22 may be provided with only the left and right chamfer portions 22*a*4 and without the upper and lower chamfer portions 22*a*4, or vice versa. Furthermore, the second split mold 22 may be configured with only one of the four chamfer portions 22*a*4 on the top, bottom, left and right sides.

In the embodiment, the molding machine 10 is described as having the movable portion 23, but it is not limited to this and may not have the movable portion 23.

In the embodiment, an example is given of the configuration in which a pair of the movable portions 23 are arranged on the left and right sides of the first split mold 21, but the embodiment is not limited to this configuration. In addition to the movable portions 23 on the left and right sides of the first split mold 21, the movable portions 23 may be further disposed at the bottom of the first split mold 21. The movable portions 23 may be disposed at the bottom of the first split mold 21 instead of the movable portions 23 on the left and right sides of the first split mold 21.

Fourth Viewpoint

1. Configuration of Panel

Figure 35A:
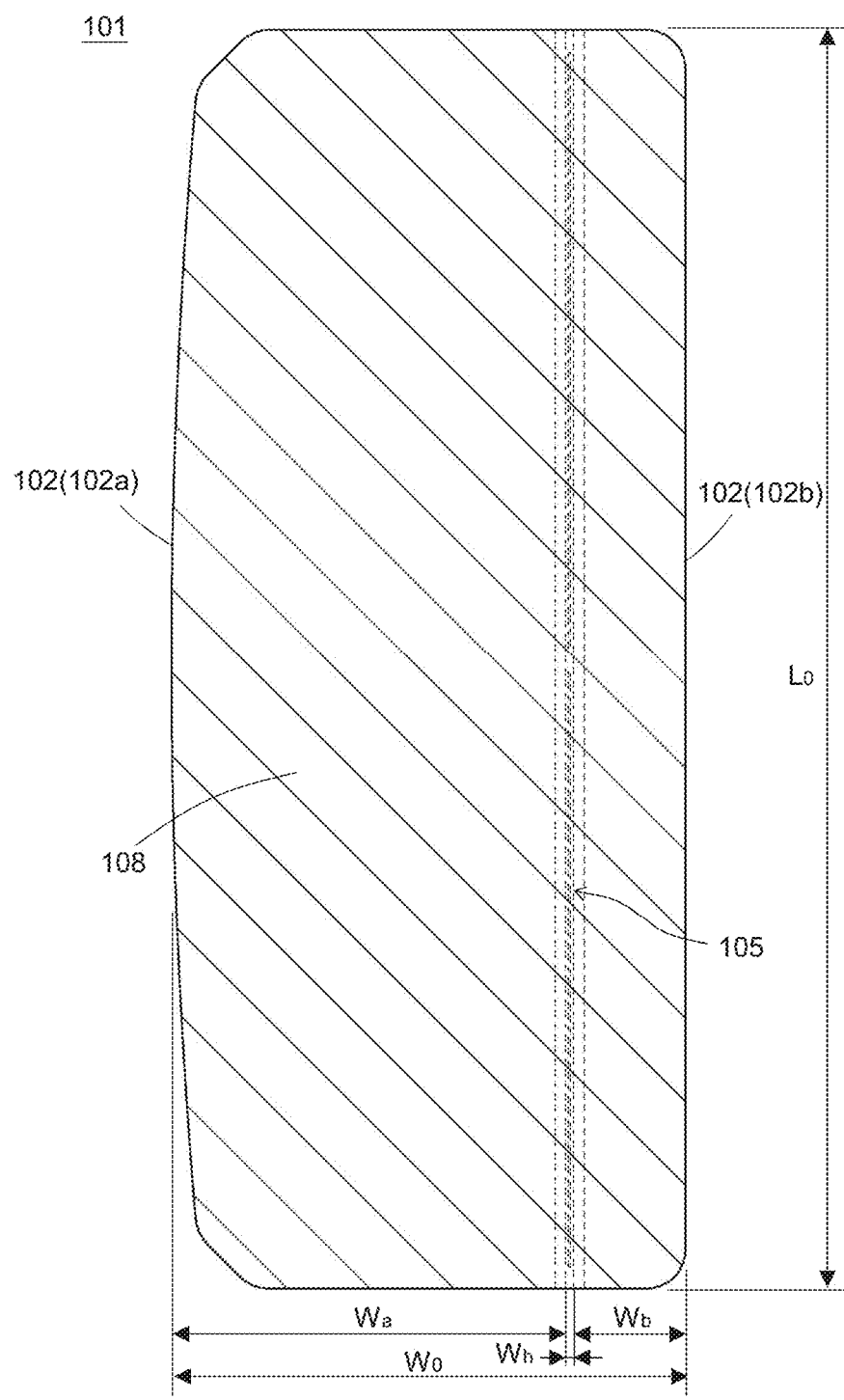
FIG. 35A is a plan view of a panel viewed from a front surface side (i.e. skin material side)
Figure 35B:
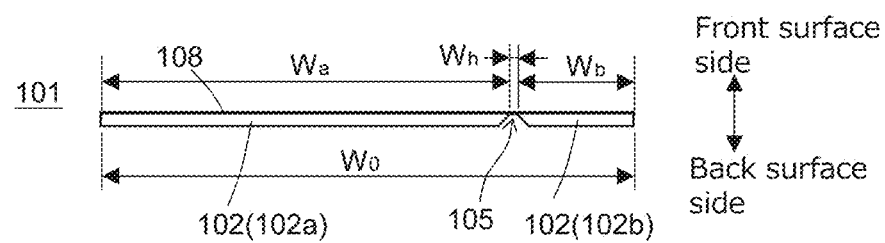
FIG. 35B is a side view of the panel.

A configuration of a panel 101 is described using FIG. 35A through FIG. 38. As illustrated in FIG. 35A and FIG. 35B, the panel 101 has a resin panel body 102 and a skin material 108. The resin panel body 102 is formed by integrating a first body portion 102a, a second body portion 102b, and a hinge 105. FIG. 35a illustrates the front surface side (front side) of the resin panel body 102, and the skin material 108 is attached to cover the entirety of the front surface of the resin panel body 102. The skin material 108 is adhered to the first body portion 102a and the second body portion 102b across the hinge 105. The back surface of the resin panel body 102 is exposed.

The panel 101 is a rectangular flat panel with an overall length $L_0$ and a width Wo. In the embodiment, as an example, the first body portion 102a, the second body portion 102b, and the hinge 105 have the same overall length as each other, and all of them have the same overall length $L_0$ as the panel 101. In the embodiment, as an example, the first body portion 102a has a width $W_a$ and the second body portion 102b has a width $W_b$ (wherein, $W_b < W_a$). Including the width of the hinge 105 ($W_h$ in FIG. 38), $W_0 = W_a + W_b + W_h$.

Figure 36A:
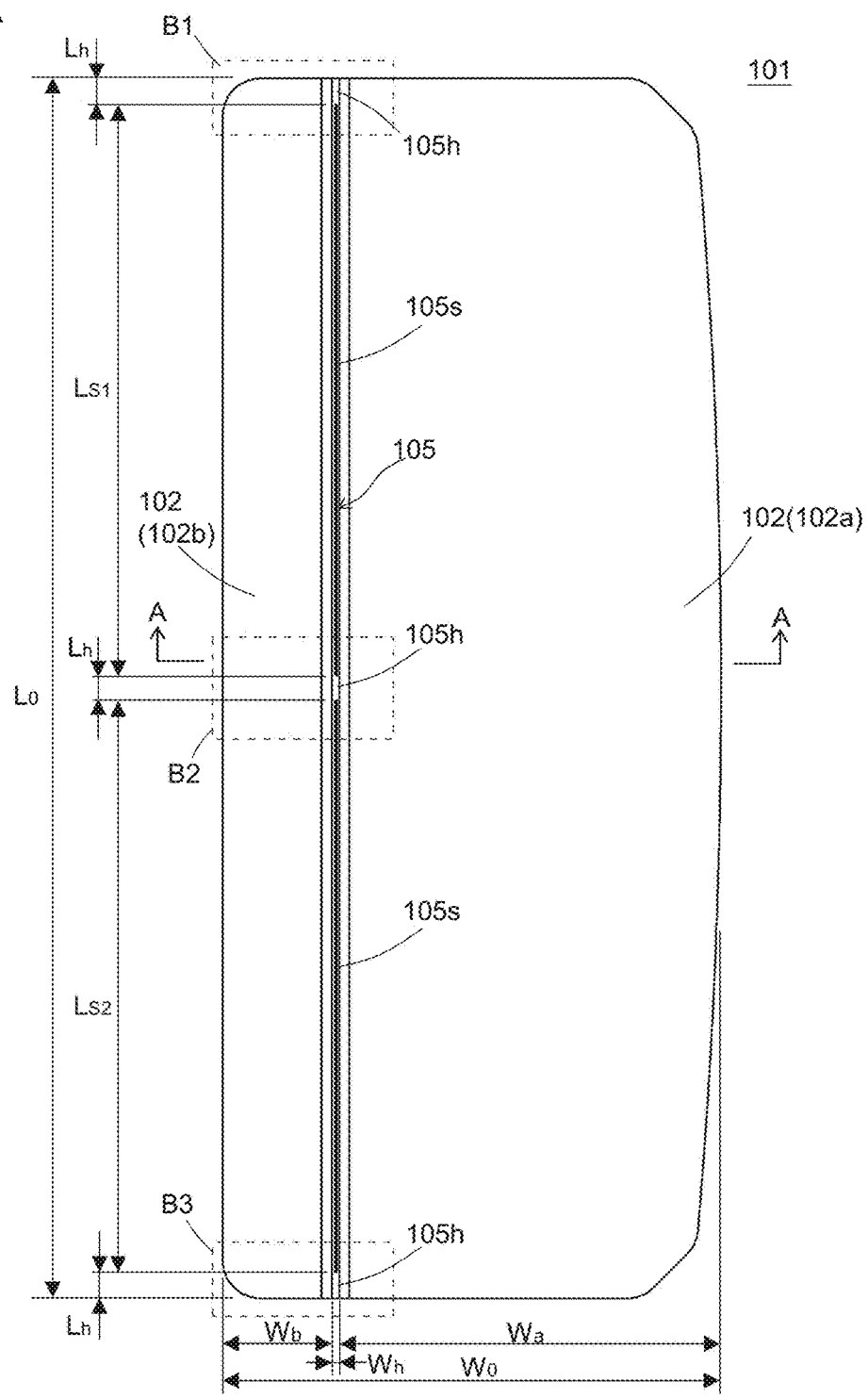
FIG. 36A is a plan view of the panel as viewed from a back surface side.
Figure 36B:
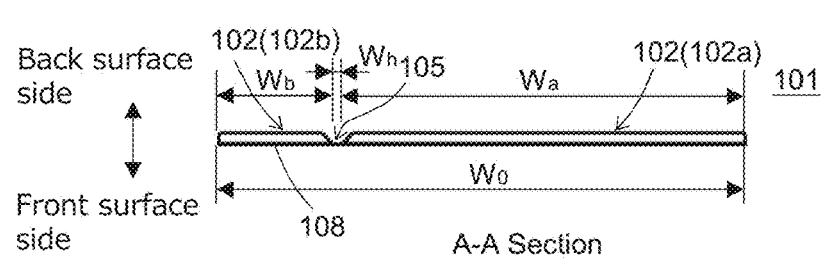
FIG. 36B is a cross-sectional view along the A-A line.

As illustrated in FIG. 36A, the hinge 105 extends between the first body portion 102a and the second body portion 102b. In the embodiment, as an example, the hinge 105 has three hinge portions 105h and two slits 105s. In the example of FIG. 36A, each length $L_h$ of the hinge portions 105h is very small relative to the total length $L_0$ of the hinge 105. The three hinge portions 105h rotatably connect the first body portion 102a and the second body portion 102b. The slit 105s is provided adjacent to the hinge portion 105h to separate the first body portion 102a from the second body portion 102b. The slit 105s improves the bendability of the hinge 105.

Figure 37:
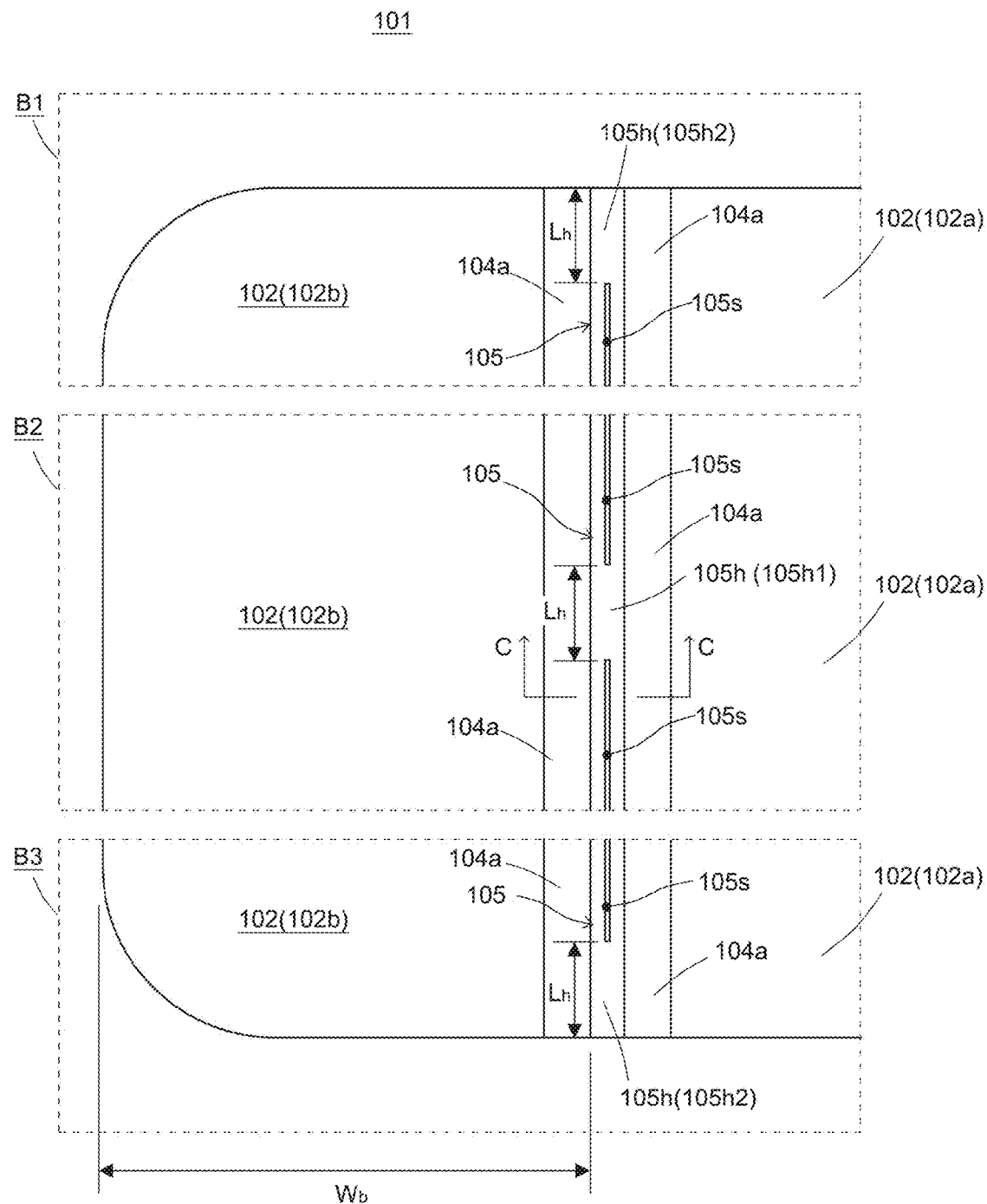
FIG. 37 is an enlarged plan view of portions B1 to B3 of FIG. 36 on the back side of the panel.

FIG. 37 is an enlarged view of portions B1-B3 of FIG. 36A. As an example, the hinge portion 105h has one middle hinge portion 105h1 and two extremity hinge portions 105h2. The two extremity hinge portions 105h2 are provided at both ends of the hinge 105, respectively. The middle hinge portion 105h1 is provided on the inner side of the hinge 105 than at the ends of the hinge 105. As an example in the embodiment, the middle hinge portion 105h1 is provided just in the middle of the hinge 105 (i.e., centered by $L_0/2$ from the end of the hinge 105).

Figure 38:
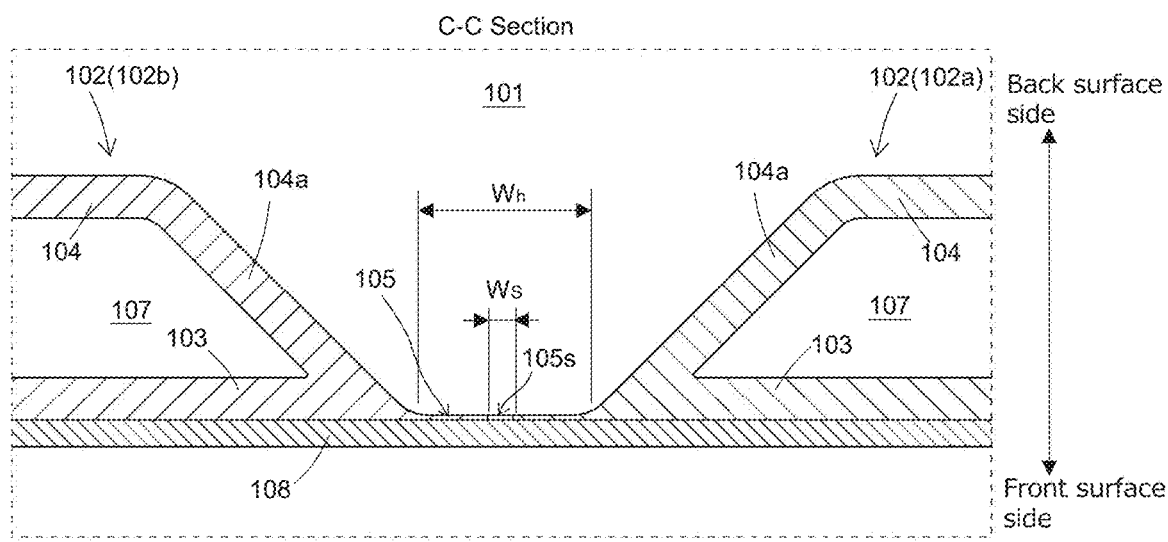
FIG. 38 is a cross-sectional view along the C-C line of FIG. 37.

FIG. 38 illustrates a cross-section along the C-C line of FIG. 37. The resin panel body 102 has a front wall 103 and a back wall 104. The front wall 103 and the back wall 104 are spaced apart and facing each other. A hollow 107 is provided between the front wall 103 and the back wall 104. In this regard, the front wall 103 and the back wall 104 are connected by a peripheral wall (not shown). A surface of the front wall 103 is flat. The back wall 104 is recessed toward the front wall 103 to form the hinge 105. The back wall 104 has a slope portion 104a adjacent to the hinge 105. In the slope portion 104a, the distance between the front wall 103 and the back wall 104 becomes narrower the closer to the hinge 105.

The hinge 105 has the width Wh. The slit 105s may be a cutout along a single line, or may be a slot created by opening through the hinge 105. The width (or thickness) of the slit 105s is also referred to as a slit width $W_S$. If the slit 105s is the cutout along a single-line, the slit width $W_S$ is substantially zero. As an example, when a ratio $W_S/W_h$ between the width $W_S$ of the slit 105s and the width $W_h$ of the hinge is defined, $W_S/W_h$ may be, for example, 0 to 1, specifically, 0, 0.1, 0.2, 0.3, 0.4, 0.5, 0.6, 0.7, 0.8, 0.9, 1, or may be within a range between any two of the values exemplified here. The slit width $W_S$ may be $W_S < W_h$ as an example, however, the slit width may be so thick that $W_S = W_h$. In this regard, the width of the hinge portion 105h is the same width $W_h$ as the hinge 105. In this regard, when the slit width WS is large, a part of the skin material 108 is exposed through the slit 105s.

As illustrated in FIG. 38, the skin material 108 is provided on the front wall 103 side of the panel 101. The skin material 108 is provided from the first body portion 102a to the second body portion 102b across the hinge 105. The skin material 108 may be made of an air-permeable carpet-like material, such as a non-woven fabric.

Each thickness of the front wall 103 and the back wall 104 in the first body portion 102a and the second body portion 102b is, for example, 0.5 to 2 mm, specifically 0.5, 1.0, 1.5, and 2.0 mm, and may be within a range between any two of the values exemplified here.

As illustrated in FIG. 36A, the hinge portion 105h alternates with the slit 105s along the direction in which the hinge 105 extends. The two slits 105s have slit lengths $L_{S1}$ and $L_{S2}$, respectively. In the embodiment, $L_{S1} = L_{S2}$ as an example. The three hinge portions 105h have the same length $L_h$ as an example in the embodiment. Therefore, $L_0 = 3L_h + L_{S1} + L_{S2}$. In this regard, "LS1+LS2" is also referred to as a total slit length $L_S$.

The thickness of the hinge portion 105h is, for example, 0.001 to 1.0 mm, specifically, for example, 0.001, 0.01, 0.1, 0.2, 0.3, 0.4, 0.5, 0.6, 0.7, 0.8, 0.9, 1.0 mm, or may be within a range between any two of the values exemplified here. The width $W_h$ of the hinge portion 105h (i.e., the width $W_h$ of the hinge 105) is, for example, 1 to 8 mm, specifically, 1.0, 1.5, 2.0, 2.5, 3.0, 3.5, 4.0, 4.5, 5.0, 5.5, 6.0, 6.5, 7.0, 7.5, 8.0 mm, or may be within a range between any two of the values exemplified here.

In this regard, the thickness of the hinge 105 (i.e., the thickness of the hinge portion 105h) means the thickness excluding the thickness of the skin material 108. In addition, the values of thickness and width, etc. of the various members mean average values unless otherwise specified.

The total length L0 of the hinge 105 is the length over both ends of the hinge 105. The total slit length LS is the sum of the lengths of the slits 105s. The larger the ratio $L_S/L_0$ is, the larger the proportion of the slits 105s in the hinge 105 becomes, and the smaller the proportion of the hinge portions 105h in the hinge 105 (i.e., the total of the lengths $L_h$ of the plurality of the hinge portions 105h) correspondingly becomes. $L_S/L_0$ may be, for example, 0.50 to 0.99, for example, 0.70 to 0.97. $L_S/L_0$ may be, specifically, 0.50, 0.55, 0.60, 0.65, 0.70, 0.75, 0.80, 0.85, 0.86, 0.87, 0.88, 0.89, 0.90, 0.91, 0.92, 0.93, 0.94, 0.95, 0.96, 0.97, 0.98, 0.99, or may be within a range between any two of the values exemplified here.

The length $L_h$ of each hinge portion 105h can be arbitrarily determined. As an example, the length $L_h$ of the hinge portion 105h may be 10 mm, but is not limited to this, for example, 5 to 15 mm, or even 2 to 100 mm, for example. The length $L_h$ is specifically 2, 3, 4, 5, 6, 7, 8, 9, 10, 11, 12, 13, 14, 15, 16, 17, 18, 19, 20, 21, 22, 23, 24, 25, 26, 27, 28, 29, 30, 35, 40, 45, 50, 55, 60, 70, 80, 90, 100 mm for example, or may be within a range between any two of the values exemplified here. The length $L_h$ may be increased to some extent to ensure a certain level of strength.

The number of the hinge portions 105h in the hinge 105 is not limited to three, but may be two, or may be four or more. The number of the hinge portions 105h may be specifically 5, 6, 7, 8, 9, or 10, for example. The number of the hinge portions 105h may also be within a range between any two of the numbers exemplified here. The plurality of the hinge portions 105h may all have the same length Lh, or they may have different lengths from one another. For example, $L_{h1}<L_{h2}$ or $L_{h1}>L_{h2}$ may be satisfied when comparing a length $L_{h1}$ of one middle hinge portion 105h1 with a length $L_{h2}$ of one extremity hinge portion 105h2. Within the aforementioned numerical range, one length $L_h$ of one hinge portion 105h may differ from another length $L_h$ of another hinge portion 105h.

The interval at which the hinge portion 105h is provided is determined by the length of each of the slits 105s. The lengths of the plurality of the slits 105s may be the same, or may be different from each other. If the slits 105s are shortened so that the hinge portions 105h are closer together, strength can be increased. On the other hand, if the slits 105s are lengthened so that the hinge portions 105h are set farther apart from each other, the bendability of the hinge 105 can be increased.

The slit 105s improves the bendability. Since the bendability can be adjusted with the slit 105s, the hinge portion 105h does not have to be made too thin, which has the advantage of suppressing pinch-off and preventing the hinge portion 105h from shredding, etc. In addition, the skin material 108 is provided in the embodiment, so that the first body portion 102a and the second body portion 102b can be rotatably connected by both the hinge portion 105h and the skin material 108. High strength can be achieved if the skin material 108 is made of a sufficiently thick material.

Figure 39:
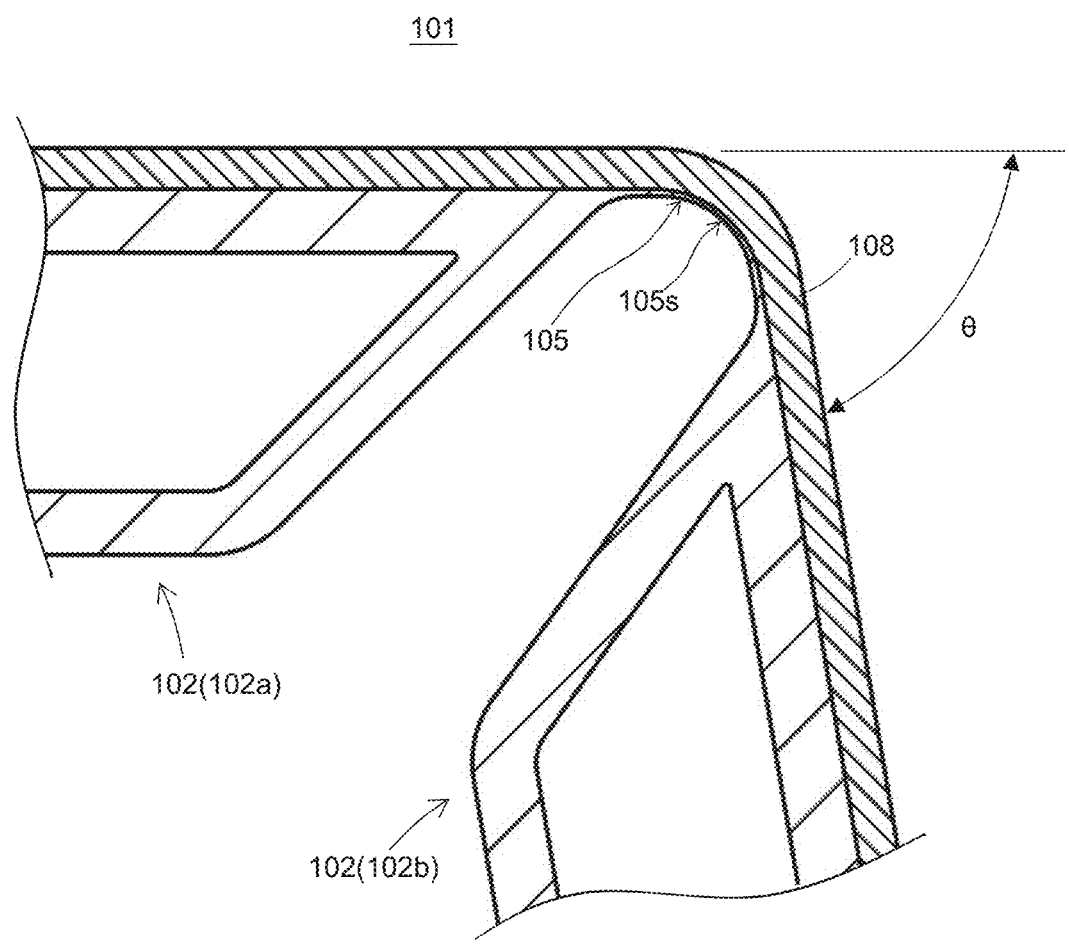
FIG. 39 is a cross-sectional view illustrating an example of how a hinge bends.

The bendability of the hinge 105 can be controlled in various ways, and the number, length, width, and, at least, the depth or thickness of the slits 105s and hinge portion 105h can be changed as desired, depending on the degree of bendability (flexibility) required. FIG. 39 shows an example of a bending angle θ of the hinge 105. The bending angle θ caused by a self-weight of the second body portion 102b may be, for example, 45° or more, 60° or more, 70° or more, or 85° or more. The bending angle θ caused by the self-weight of the second body portion 102b may specifically be, for example, 45°, 50°, 55°, 60°, 65°, 70°, 75°, 80°, 85° or 90°, or may be within a range between any two of the values exemplified here.

However, although the hinge 105 may easily bend by the self-weight of the second body portion 102b, the configuration of the hinge 105 is not limited to this. The hinge 105 may not bend at all by the self-weight of the second body portion 102b (i.e., θ in FIG. 39 due to the self-weight may be substantially 0°), or may bend only slightly (e.g., 0°<θ≤15° or 0°<θ≤30°, or 0°<θ≤45° or the like). Even in these cases, the slit 105s may be provided so that the hinge 105 can be easily bent when a force is applied to the second body portion 102b.

In this regard, the total length L0 of the panel 101 may be within a range from 500 to 1300 mm as an example. The total length L0 may specifically be 500, 600, 700, 800, 900, 1000, 1100, 1200, 1300 mm, for example, and may be within a range between any two of the values exemplified here. The panel 101 may be provided, for example, as a luggage board, a deck board, or a cargo floor board, etc. for automobiles.

The relationship between the width Wa of the first body portion 102a and the width Wb of the second body portion 102b described in FIG. 35a, etc. can be set arbitrarily. If the width Wb of the second body portion 102b is large, the hinge 105 tends to bend by the self-weight of the second body portion 102b. Therefore, when Wb<Wa, the width ratio Wb/Wa may be, for example, 0.20 to 0.80, or for example, 0.40 to 0.60. The width ratio Wb/Wa may be specifically 0.20, 0.25, 0.30, 0.35, 0.40, 0.45, 0.50, 0.55, 0.60, 0.65, 0.70, 0.75, 0.80, 0.85, 0.90, 0.95, or may be within a range between any two of the values exemplified here. However, it is not limited to the above numerical values and may be Wb=Wa (i.e., Wb/Wa=1.0) or Wb>Wa.

Any two or more of the various modifications described above may be used in combination with each other.

2. Manufacturing Method of Panel 101

The following is an example of a method for manufacturing the panel 101. This method includes a preparation step, a slit forming step, and an attaching step. Specifically, first, the resin panel body 102 is prepared in the preparation step, before the slit is formed. The slit 105s is formed and the skin material 108 is attached to the resin panel body 102.

2-1. Configuration of Molding Machine

Figure 40:
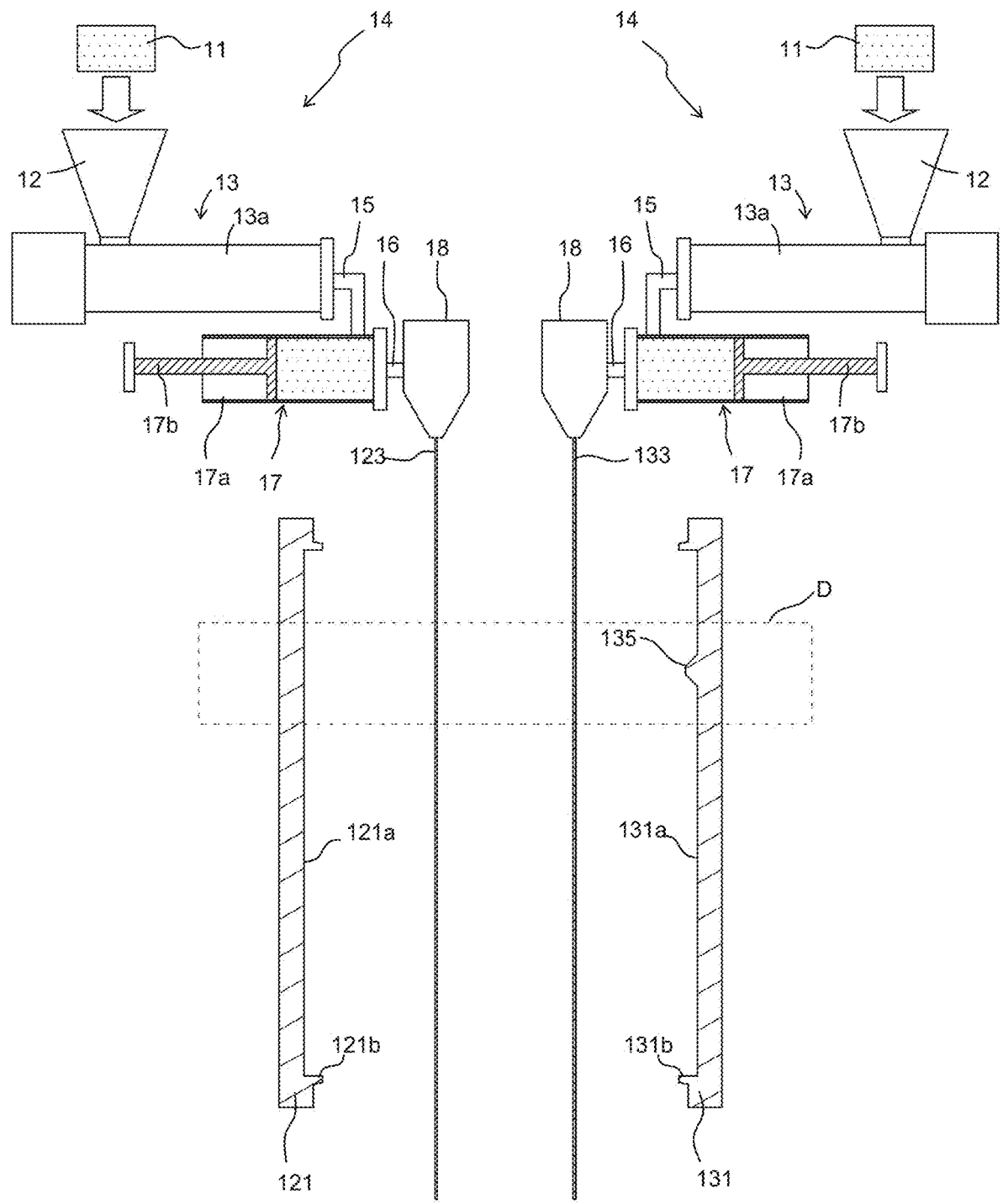
FIG. 40 is a configuration diagram of the molding machine 10 that can be used to manufacture a panel (a longitudinal sectional view for molds 121, 131 and their nearby components).

First, FIG. 40 is used to describe the molding machine 10 that can be used to implement the method of manufacturing the resin panel body 102. The molding machine 10 is equipped with the pair of the sheet forming devices 14 and molds 121, 131. Each sheet forming device 14 has the hopper 12, the extruder 13, the accumulator 17, and the T-die 18. The extruder 13 and the accumulator 17 are connected via the connecting tube 15. The accumulator 17 and the T-die 18 are connected via the connecting tube 16.

In the embodiments of the fourth viewpoint illustrated in FIG. 40, the sheet forming device 14 and resin used therein are the same as the sheet forming device 14 and the resin used therein in the embodiments of the first and second viewpoints (see "2-1-1. Configuration of Sheet Forming Device 14" in the first and second viewpoints). Therefore, the explanation is omitted.

<Molds 121, 131>

The molds 121, 131 can be opened and closed, and when the molds 121, 131 are opened, resin sheets 123, 133 are extruded therebetween. As illustrated in FIG. 40, the molds 121, 131 include cavity surfaces 121a, 131a and pinch-off portions 121b, 131b surrounding the cavity surfaces 121a, 131a, respectively. Decompression suction holes (not shown) are formed in the cavity surfaces 121a, 131a, and through the decompression suction holes, the resin sheets 123, 133 can be suctioned under reduced pressure and shaped into a shape along the cavity surfaces 121a, 131a. The thickness of the resin sheets 123, 133 is, for example, within a range from 0.5 to 2 mm. The thickness of the resin sheets 123, 133 is specifically, for example, 0.5, 1.0, 1.5, and 2.0 mm, and may be within a range between any two of the values exemplified here.

The mold 131 is provided with a projecting stripe 135 to form the hinge 105. The projecting stripe 135 is an elongated projection. The projecting stripe 135 is preferably configured so that the longitudinal direction of the projecting stripe 135 is non-parallel to the extrusion direction of the resin sheets 123, 133. Even more preferably, the projecting stripe 135 is configured so that the longitudinal direction of the projecting stripe 135 is perpendicular to the extrusion direction of the resin sheets 123, 133. This can achieve the suppression of thickness variation in the resin sheets 123, 133 along the longitudinal direction of the hinge 105.

2-2. Preparation Step (Manufacturing Process of Panel Main Body)

In the preparation step, the resin panel body 102 is prepared prior to the formation of the slit 105s. The preparation step in the embodiments includes, in more detail, an extrusion step, a shaping step, and a mold closing step.

In the extrusion step, the resin sheets 123, 133 are extruded between the molds 121, 131, as illustrated in FIG. 40. The resin sheet 133 is placed between the resin sheet 123 and the mold 131.

Next, in the shaping step, the resin sheets 123, 133 are shaped along the cavity surfaces 121a, 131a of the molds 121, 131, respectively. This step can be implemented by suctioning the resin sheets 123, 133 under the reduced pressure using the molds 121, 131.

Figure 41:
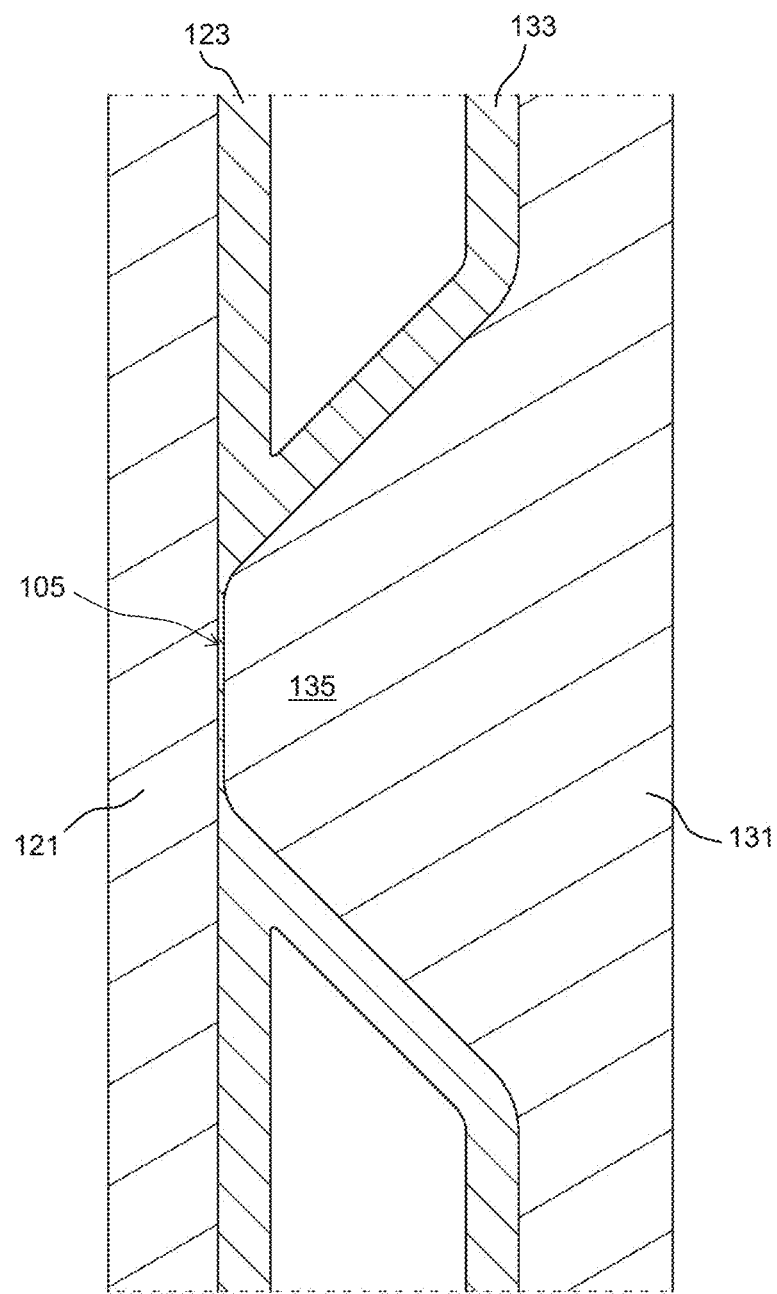
FIG. 41 is a cross-sectional view illustrating how the mold is closed at a position in the dashed line D in FIG. 40.

Next, the molds 121, 131 are closed in the mold closing step. As the molds 121, 131 are closed, the resin sheets 123, 133 are welded to each other along the pinch-off portions 121b, 131b to obtain the resin panel body 102 shaped along the inner surface of the cavity formed by the pair of the molds 121, 131. Between the projecting stripe 135 and the mold 121, the resin sheets 123, 133 are compressed to form the hinge 105 (see FIG. 41). Outer portions outside the pinch-off portions 121b, 131b become burrs. After this, the molds 121, 131 are opened and the panel 101 is removed, and the burrs are removed to obtain the resin panel body 102 before the slits 105s are formed.

2-3. Slit Forming Step

Next, the slits 105s of a predetermined number and length are provided in the hinge 105 of the resin panel body 102. There is no limitation on the specific means of forming the slits 105s, for example, a press, an ultrasonic cutter, or a knife may be used.

2-4. Attaching Step of Skin Material 108

Next, the panel 101 is provided by attaching the skin material 108 to the resin panel body 102 with adhesive. Since this post-attachment process is performed, there is no limitation on the material of the skin material 108 in the embodiments. Since the post-attachment does not require breathability, this provides the advantage of a rich variation of available skin material 108. For example, the skin material 108 need not be a non-woven fabric, but may be nonbreathable skin material such as synthetic leather, for example.

As explained above, according to the embodiments, the bendability of the hinge 105 can be improved by the novel approach of providing the slit 105s. In particular, according to the embodiments, properly designing the slit 105s and the hinge portion 105h in accordance with the variations in various embodiments can provide the advantage of both controlling the bendability of the hinge 105, ensuring durability, and mass production. In other words, since the hinge portion 105h connects the first body portion 102a and the second body portion 102b, the first body portion 102a and the second body portion 102b are not separated into separate parts. This makes it easier to perform the post-attachment process of the skin material 108, and also suppresses undesirable manufacturing variations in the size (width WO) of the panel 101. It is also easier to control the bendability of the hinge unit 105 to the desired degree by adjusting the length Lh of the hinge portion 105h.

3. Modifications

Various modifications may be applied to the above described embodiments. For example, the skin material 108 may be omitted from the panel 101.

The structure of the resin panel body 102 is an example, and various structures may be applied to the first body portion 102a and the second body portion 102b. As an example, a core member made of a foamed body may be provided in the hollow unit 107. The distance between the front wall 103 and the back wall 104 in the hollow 107 can be secured using the foamed body as the core member, and also increases the strength and thermal insulation of the panel 101. To provide the core member, an insert step may be performed between the shaping step and the mold closing step. In the insert step, a foamed body having a thinner recess at the position of the projecting stripe 135 can be placed between the resin sheets 123, 133, and then proceed to the mold closing step. As another example, the first body portion 102a and the second body portion 102b may be constructed of a foam resin sheet that does not have the hollow 107. As another example, reinforcing ribs may be provided at predetermined intervals at any position in the width direction in the first body portion 102a and the second body portion 102b. A plurality of the reinforcing ribs may be provided by depressing portions of the back wall 104 toward the front wall 103 and welding them to the inner surface of the front wall 103, which may increase the rigidity and strength of the resin panel body 102.

REFERENCE SIGNS LIST

First to Third Viewpoints

1: resin panel, 2: resin molded body, 3: core member, 3a: base member, 3a1: recessed portion, 3b: base body, 3b1: recessed portion, 3c: reinforcing member, 3c1: upper wall, 3c11: projection, 3c2: bottom wall, 3c21: projection, 3c3: pillar portion, 4: skin material, 5: molded body, 5a: molded main body, 5b: large burr portion, 5bb: bottom burr portion, 5bc1: inner burr portion, 5bc2: outer burr portion, 5bu: upper burr portion, 5c: cutting line, 5cb: bottom line, 5cl: left line, 5cr: right line, 5cu: upper line, 5d: molded member, 5e: small burr portion, 5f: parting line, 5fb: bottom line, 5fl: left line, 5fr: right line 5fu: upper line, 9a: base, 9b: suction pad, 10: molding machine, 11: raw material resin, 11a: molten resin, 12: hopper, 13: extruder, 13a: cylinder, 14: sheet forming device, 15: connecting tube, 16: connecting tube, 17: accumulator, 17a: cylinder, 17b: piston, 18: T-die, 19: insertion apparatus, 19a: base, 19b: suction pad, 19c: female projection, 21: first split mold, 21A: suction part, 21B: suction hole, 21C: slope surface, 21a1: main body, 21a2: first outer portion, 21a3: end face portion, 21b: inner surface, 21d: pinch-off portion, 21d1: inner pinch-off portion 21d2: outer pinch-off portion, 21dd: pinch-off portion, 21e: male projection, 21f: supporting portion, 22: second split mold, 22a: rear edge portion, 22a1: main body, 22a2: second outer portion, 22a3: opposing portion, 22a4: chamfer portion, 22ab: rear edge portion, 22af: front edge portion, 22b: inner surface, 22d: pinch-off portion, 22d1: inner pinch-off portion, 22d2: outer pinch-off portion, 22dd: pinch-off portion, 23: movable portion, 23*a*: opposing surface portion, 23*b*: butting surface portion, 23*c*: suction part, 23*d*: engaging portion, 23*e*: sealing member, 23*f*: supported portion, 23*g*: suction part, 23*g*1: suction hole, 23*g*2: slope surface, 24: drive mechanism, 24*a*: upper drive mechanism, 24*b*: lower drive mechanism, 31: outer frame, 31*a*: suction hole 32: outer frame, 32*a*: suction hole, A: area, Ar: arrow, B: area, C1: arrow, C2: arrow, Dr: thickness direction, PL: parting line, SD1: closed space, SD2: closed space, cvt: cavity, h1: decompression suction hole, p1: resin sheet, p2: resin sheet, sp: space, w1: width dimension, w2: depth dimension, t1: distance, t2: projection amount, w3: backward distance Fourth Viewpoint

101: panel, 102: resin panel body, 102*a*: first body portion, 102*b*: second body portion, 103: front wall, 104: back wall, 104*a*: slope portion, 105: hinge, 105*h*: hinge portion, 105*h*1: middle hinge portion, 105*h*2: extremity hinge portion, 105*s*: slit, 107: hollow, 108: skin material, 10: molding machine, 11: raw material resin, 12: hopper, 13: extruder, 13*a*: cylinder, 17: accumulator, 17*a*: cylinder, 17*b*: piston, 18: T-die, 14: sheet forming device, 121: mold, 121*a*: cavity surface, 121*b*: pinch-off portion, 123: resin sheet, 15: connecting tube, 16: connecting tube, 131: mold, 131*a*: cavity surface, 131*b*: pinch-off portion, 133: resin sheet, 135: projecting stripe, $L_O$: total length of hinge, $L_S$: total length of slit(s), $L_{S1}$, $L_{S2}$: slit length, $L_h$: length of hinge portion, $W_S$: slit width

The invention claimed is:

1. A method for manufacturing a structure, comprising:
a molding step;
a burr portion shaping step; and
a cutting step,
wherein, in the molding step, a molded body is molded using a mold,
the mold includes a movable portion and a pair of first and second split molds,
each of the first and second split molds includes a cavity and a pinch-off portion,
the movable portion is provided to be movable relative to the first and second split molds, and the movable portion includes a suction part and an engaging portion,
the molded body includes a molded main body, a cutting line, and a burr portion,
the molded main body is molded in the cavity in the molding step,
the cutting line is squashed by the pinch-off portion in the molding step; and
the burr portion is connected to the molded main body via the cutting line, and is provided on the movable portion,
in the burr portion shaping step, the burr portion is shaped along the engaging portion by suctioning the burr portion to the engaging portion via the suction part,
in the cutting step, the burr portion is cut from the molded main body along the cutting line by moving the movable portion relative to the first and second split molds with the burr portion shaped along the engaging portion.

2. The method of claim 1,
wherein the first split mold includes an end face portion, the movable portion includes a butting surface portion, and
in the burr portion shaping step, the butting surface portion is butted against the end face portion.

3. The method of claim 2,
wherein the mold further includes a sealing member, and the sealing member is attached to the end face portion or the butting surface portion.

4. The method of claim 2,
wherein the first split mold includes a first outer portion, the pinch-off portion of the first split mold is formed on the first outer portion, and the end face portion is formed on the first outer portion,
the second split mold includes a second outer portion, and the pinch-off portion of the second split mold is formed on the second outer portion, and the second outer portion is positioned to face the first outer portion in a direction in which the first and second split molds open and close.

5. The method of claim 1,
wherein the molded body includes a resin sheet and a skin material, and
the skin material is disposed on an outer side of the resin sheet.

6. The method according to claim 5,
wherein each of the first and second split molds includes a reduced pressure suction hole,
the reduced pressure suction hole communicates with the cavity, and the reduced pressure suction hole is formed to shape the resin sheet along the first and second split molds,
with the first and second split molds shaping the resin sheet, the skin material in the cavity is provided along the first split mold, and
the reduced pressure suction hole is not formed in the first outer portion of the first split mold.

7. The method of claim 6,
wherein a skin material escape space is formed between the first outer portion and the second outer portion, and
in the molding step, an edge of the skin material is disposed in the skin material escape space.

8. A method for manufacturing a structure, comprising:
a molding step;
an engaging step; and
a cutting step,
wherein, in the molding step, a molded body is molded using a mold,
the mold includes a movable portion and a pair of first and second split molds,
each of the first and second split molds includes a cavity, an inner pinch-off portion, and an outer pinch-off portion,
the inner pinch-off portion is connected to the cavity,
the outer pinch-off portion is located further away from the cavity than the inner pinch-off portion,
the movable portion is provided to be movable relative to the first and second split molds, and the movable portion includes an engaging portion,
the molded body includes a molded main body, an outer line portion, and an outer burr portion,
the molded main body includes an inner line portion and an inner burr portion,
the molded main body is molded in the cavity in the molding step,
the inner line portion is squashed by the inner pinch-off portion in the molding step,
the inner burr portion is formed between the inner line portion and the outer line portion, the outer line portion is squashed by the outer pinch-off portion in the molding step, the outer burr portion is connected to the outer line portion, in the engaging step, the outer burr portion is engaged with the engaging portion of the movable portion, and in the cutting step, the outer burr portion is cut from the inner burr portion along the outer line portion by moving the movable portion relative to the first and second split molds with the outer burr portion engaged with the engaging portion;

wherein the movable portion further includes a suction part, and in the engaging step, the outer burr portion is suctioned to the engaging portion via the suction part, the outer burr portion is shaped along the engaging portion, and thereby the outer burr portion is engaged along the engaging portion.

9. The method of claim 8,
wherein, when the first split mold and the movable portion are viewed in plain view, the outer pinch-off portion is formed along the engaging portion.

10. The method of claim 8,
wherein, a surface of a top portion of the outer pinch-off portion is aligned with the surface of a top portion of the engaging portion.

11. The method of claim 8,
wherein the first split mold includes an end face portion,
the movable portion includes a butting surface portion, and
in the engaging step, with the butting surface portion butted against the end face portion, the outer burr portion is suctioned to the engaging portion via the suction part.

12. The method of claim 11,
wherein the mold further includes a sealing member, and
the sealing member is attached to the end face portion or the butting surface portion.

13. The method of claim 11,
wherein the first split mold includes a first outer portion, the first outer portion includes the inner pinch-off portion and the outer pinch-off portion of the first split mold, and the first outer portion includes the end face portion,
the second split mold includes a second outer portion, and the second outer portion includes the inner pinch-off portion and the outer pinch-off portion of the second split mold, and the second outer portion is positioned to face the first outer portion in a direction in which the first and second split molds open and close.

14. The method of claim 8,
wherein the molded body includes a resin sheet and a skin material, and
the skin material is disposed on an outer side of the resin sheet.

15. The method according to claim 14,
wherein each of the first and second split molds includes a reduced pressure suction hole,
the reduced pressure suction hole communicates with the cavity, and the reduced pressure suction hole is formed to shape the resin sheet along the first and second split molds, with the first and second split molds shaping the resin sheet, the skin material in the cavity is provided along the first split mold, and the reduced pressure suction hole is not formed in the first outer portion of the first split mold.

16. A method for manufacturing a structure using a mold and an outer frame, the method comprising:
a hanging step;
a suction step, and
a shaping step,
wherein, in the hanging step, a molten resin sheet is hung in front of the mold,
the mold includes a cavity, a pinch-off portion, and a chamfer portion,
the chamfer portion is provided between the outer frame and the pinch-off portion and is formed so that the distance between the chamfer portion and the hung resin sheet increases in a direction from the pinch-off portion to the outer frame, in the suction step, the outer frame is advanced and the resin sheet is suctioned by the outer frame to form a closed space between the outer frame, the resin sheet, and the mold, the outer frame is positioned around the mold and is configured to suck the resin sheet, in the shaping step, the outer frame is backed and the closed space is depressurized to shape the resin sheet by the cavity, and the resin sheet moves with the outer frame as the outer frame is backed and is positioned along the chamfer portion.

17. The method of claim 16,
wherein the chamfer portion includes a tapered surface.

18. The method of claim 16,
wherein, in the shaping step, the outer frame is backed up to a position of a rear edge portion of the chamfer portion.

19. The method of claim 16,
wherein the method further using a movable portion, and the method further comprises a molding step,
the mold includes first and second split molds,
the movable portion is configured to move relative to the first split mold to cut a portion of the resin sheet, and is provided around the first split mold,
the second split mold includes the chamfer portion, and the outer frame is positioned around the second split mold, and
in the molding step, the first and second split molds are closed, and when the molding step is completed, at least a portion of the movable portion is positioned closer to the outer frame than a position of a front edge portion of the chamfer portion.

* * * * *